US011896540B2

(12) United States Patent
Mason et al.

(10) Patent No.: US 11,896,540 B2
(45) Date of Patent: Feb. 13, 2024

(54) METHOD AND SYSTEM FOR IMPLEMENTING AN EXERCISE PROTOCOL FOR OSTEOGENESIS AND/OR MUSCULAR HYPERTROPHY

(71) Applicant: REHAB2FIT TECHNOLOGIES, INC., Longmont, CO (US)

(72) Inventors: Steven Mason, Las Vegas, NV (US); Eric Mundt, Highlands Ranch, CO (US)

(73) Assignee: REHAB2FIT TECHNOLOGIES, INC., Longmont, CO (US)

( * ) Notice: Subject to any disclaimer, the term of this patent is extended or adjusted under 35 U.S.C. 154(b) by 264 days.

(21) Appl. No.: 16/907,666

(22) Filed: Jun. 22, 2020

(65) Prior Publication Data

US 2020/0397639 A1 Dec. 24, 2020

Related U.S. Application Data

(60) Provisional application No. 62/865,847, filed on Jun. 24, 2019.

(51) Int. Cl.

*A61H 1/02* (2006.01)
*A63B 24/00* (2006.01)

(52) U.S. Cl.

CPC ......... *A61H 1/0255* (2013.01); *A61H 1/0285* (2013.01); *A63B 24/0087* (2013.01);
(Continued)

(58) Field of Classification Search

CPC ................ A61H 1/0255; A61H 1/0285; A61H 2201/1207; A61H 2201/1635;
(Continued)

(56) References Cited

U.S. PATENT DOCUMENTS

| | | | |
|---|---|---|---|
| 1,820,372 | A | 8/1931 | Blomquist |
| 3,017,180 | A | 1/1962 | Aronsohn |

(Continued)

FOREIGN PATENT DOCUMENTS

| | | | |
|---|---|---|---|
| CA | 3193419 | A1 | 3/2022 |
| CN | 2885238 | Y | 4/2007 |

(Continued)

OTHER PUBLICATIONS

Malloy, Online Article "AI-enabled EKGs find difference between numerical age and biological age significantly affects health, longevity", Website: https://newsnetwork.mayoclinic.org/discussion/ai-enabled-ekgs-find-difference-between-numerical-age-and-biological-age-significantly-affects-health-longevity/, Mayo Clinic News Network, May 20, 2021, retrieved: Jan. 23, 2023, p. 1-4.

(Continued)

*Primary Examiner* — Garrett K Atkinson
(74) *Attorney, Agent, or Firm* — Dickinson Wright PLLC; Stephen A. Mason; Jonathan H. Harder

(57) ABSTRACT

A method and system for implementing an exercise protocol for osteogenesis and/or muscular hypertrophy are disclosed. A method may include initiating, based on the exercise protocol, a warmup session for a first exercise, where the warmup session specifies applying a first target load threshold for a first period of time. The method includes determining the warmup session is complete after the first period of time elapses. Responsive to determining the warmup session is complete, the method includes initiating, based on the exercise protocol, a resting session specifying not applying loads for a second period of time. The method includes determining the resting session is complete after the second period of time elapses. Responsive to determining the resting session is complete, the method includes initiating, based on the exercise protocol, an exercise session specify- (Continued)

ing applying a second target load threshold for a third period of time.

20 Claims, 28 Drawing Sheets

(52) U.S. Cl.
CPC ................ *A61H 2201/1207* (2013.01); *A61H 2201/164* (2013.01); *A61H 2201/1635* (2013.01); *A61H 2201/5043* (2013.01); *A61H 2201/5097* (2013.01); *A61H 2203/0425* (2013.01); *A63B 2024/009* (2013.01); *A63B 2024/0093* (2013.01)

(58) Field of Classification Search
CPC ...... A61H 2201/164; A61H 2201/5043; A61H 2201/5097; A61H 2203/0425; A61H 1/00; A63B 24/0087; A63B 2024/009; A63B 2024/0093; A63B 21/0023; A63B 21/4029; A63B 21/4034; A63B 21/4035; A63B 21/4045; A63B 21/4049; A63B 23/0405; A63B 23/1209; A63B 24/0062; A63B 24/0075; A63B 71/0622; A63B 2024/0068; A63B 2071/0625; A63B 2071/065; A63B 2071/0655; A63B 2208/0204; A63B 2208/0233; A63B 2220/51; A63B 2225/09; A63B 2225/093; A63B 2225/10; A63B 2225/20; A63B 2225/50; A63B 2230/01; A63B 2230/085
See application file for complete search history.

(56) References Cited

U.S. PATENT DOCUMENTS 3,213,852 A 10/1965 Zent
3,572,699 A 3/1971 Nies
4,222,376 A 9/1980 Martin
4,519,604 A 5/1985 Arzounian
4,538,804 A 9/1985 Zibell
4,572,501 A 2/1986 Durham et al.
4,618,141 A 10/1986 Ashworth
4,824,132 A 4/1989 Moore
4,860,763 A 8/1989 Schminke
5,139,255 A 8/1992 Sollami
5,184,991 A 2/1993 Brangi
5,474,083 A * 12/1995 Church .................. A61B 5/486
600/595
5,857,943 A 1/1999 Murray
5,980,431 A 11/1999 Miller
6,001,046 A 12/1999 Chang
6,007,459 A 12/1999 Burgess
6,013,007 A * 1/2000 Root .................. A63B 69/0028
482/902
6,036,623 A 3/2000 Mitchell
6,162,189 A 12/2000 Girone et al.
6,347,290 B1 * 2/2002 Bartlett ................. G06F 1/1626
715/863
6,450,923 B1 9/2002 Vatti
6,514,085 B2 2/2003 Slattery et al.
6,601,016 B1 7/2003 Brown et al.
6,613,000 B1 9/2003 Reinkensmeyer et al.
6,626,800 B1 9/2003 Casler
6,902,513 B1 6/2005 McClure
6,902,515 B2 6/2005 Howell et al.
6,960,155 B2 11/2005 Chien
7,058,453 B2 6/2006 Nelson et al.
7,063,643 B2 6/2006 Arai
7,510,512 B1 3/2009 Taggett
7,628,730 B1 * 12/2009 Watterson .......... A63B 71/0622
482/4
7,713,176 B1 5/2010 Farney
7,789,800 B1 * 9/2010 Watterson ............ A63B 22/025
7,837,472 B1 * 11/2010 Elsmore ................. G16H 50/20
434/236
7,969,315 B1 6/2011 Ross et al.
8,012,107 B2 9/2011 Einav et al.
8,021,270 B2 9/2011 D'Eredita
8,029,415 B2 * 10/2011 Ashby ................ A63B 22/0605
482/49
8,038,578 B2 10/2011 Olrik et al.
8,113,991 B2 2/2012 Kutliroff
8,177,732 B2 5/2012 Einav et al.
8,298,123 B2 10/2012 Hickman
8,371,990 B2 2/2013 Shea
8,409,060 B2 4/2013 Hsu
8,444,534 B2 5/2013 Mckee
8,607,465 B1 12/2013 Edwards
8,818,496 B2 8/2014 Dziubinski et al.
8,845,493 B2 9/2014 Watterson et al.
8,849,681 B2 9/2014 Hargrove et al.
8,893,287 B2 11/2014 Gjonej et al.
9,028,368 B2 * 5/2015 Ashby ................ A63B 22/0023
482/4
9,272,186 B2 3/2016 Reich
9,308,417 B2 * 4/2016 Grundy .................... A61B 5/11
9,474,935 B2 10/2016 Abbondanza et al.
9,486,382 B1 11/2016 Boss
9,514,277 B2 12/2016 Hassing et al.
9,530,325 B2 * 12/2016 Hall ....................... G09B 5/065
9,640,057 B1 5/2017 Ross
9,707,147 B2 7/2017 Levital et al.
D794,142 S 8/2017 Zhou
9,802,081 B2 10/2017 Ridgel et al.
9,813,239 B2 11/2017 Chee et al.
9,827,445 B2 11/2017 Marcos et al.
9,849,337 B2 12/2017 Roman et al.
9,868,028 B2 1/2018 Shin
9,977,587 B2 5/2018 Mountain
9,987,188 B1 6/2018 Diao
9,993,181 B2 6/2018 Ross
10,004,946 B2 6/2018 Ross
D826,349 S 8/2018 Oblamski
10,052,518 B2 * 8/2018 Lagree ............... A63B 22/0087
10,055,550 B2 8/2018 Goetz
10,058,473 B2 8/2018 Oshima et al.
10,089,443 B2 10/2018 Miller et al.
10,111,643 B2 10/2018 Schulhauser et al.
10,130,311 B1 11/2018 De Sapio et al.
10,137,328 B2 11/2018 Baudhuin
10,143,395 B2 12/2018 Chakravarthy et al.
10,173,094 B2 1/2019 Gomberg et al.
10,173,095 B2 1/2019 Gomberg et al.
10,173,096 B2 1/2019 Gomberg et al.
10,173,097 B2 1/2019 Gomberg et al.
10,198,928 B1 2/2019 Ross et al.
10,226,663 B2 3/2019 Gomberg et al.
10,231,664 B2 3/2019 Ganesh
10,244,990 B2 4/2019 Hu et al.
10,258,823 B2 4/2019 Cole et al.
10,278,883 B2 5/2019 Walsh
10,369,021 B2 8/2019 Zoss et al.
10,380,866 B1 8/2019 Ross et al.
D866,957 S 11/2019 Ross et al.
10,468,131 B2 11/2019 Macoviak et al.
10,475,323 B1 11/2019 Ross
10,475,537 B2 11/2019 Purdie et al.
10,492,977 B2 12/2019 Kapure et al.
10,507,358 B2 12/2019 Kinnunen et al.
10,532,000 B1 1/2020 De Sapio
10,532,785 B2 1/2020 Stillman
10,646,746 B1 5/2020 Gomberg et al.
10,716,969 B2 * 7/2020 Hoang ............... A63B 21/0058
D899,605 S 10/2020 Ross et al.
10,867,695 B2 12/2020 Neagle
10,881,911 B2 1/2021 Kwon et al.
10,946,239 B2 3/2021 Berry
10,987,176 B2 4/2021 Poltaretskyi et al.
10,991,463 B2 4/2021 Kutzko et al.
11,065,170 B2 7/2021 Yang et al.
11,093,904 B2 8/2021 Humble

(56) References Cited

U.S. PATENT DOCUMENTS

| | | | | |
|---|---|---|---|---|
| 11,179,596 | B2 * | 11/2021 | Karys | A63B 21/0442 |
| D939,096 | S | 12/2021 | Lee | |
| D939,644 | S | 12/2021 | Ach et al. | |
| D940,891 | S | 1/2022 | Lee | |
| 11,278,766 | B2 | 3/2022 | Lee | |
| 11,311,772 | B1 | 4/2022 | Bowers et al. | |
| 11,386,176 | B2 | 7/2022 | Galitsky | |
| 11,422,841 | B2 | 8/2022 | Jeong | |
| 11,433,276 | B2 * | 9/2022 | Bissonnette | A63B 23/16 |
| 11,458,354 | B2 | 10/2022 | Bissonnette et al. | |
| 11,458,363 | B2 | 10/2022 | Powers et al. | |
| 11,495,355 | B2 | 11/2022 | McNutt et al. | |
| 11,508,258 | B2 | 11/2022 | Nakashima et al. | |
| 11,524,210 | B2 | 12/2022 | Kim et al. | |
| 11,527,326 | B2 | 12/2022 | McNair et al. | |
| 11,532,402 | B2 | 12/2022 | Farley et al. | |
| 11,534,654 | B2 | 12/2022 | Silcock et al. | |
| D976,339 | S | 1/2023 | Li | |
| 11,636,944 | B2 | 4/2023 | Hanrahan et al. | |
| 11,663,673 | B2 | 5/2023 | Pyles | |
| 11,701,548 | B2 | 7/2023 | Posnack et al. | |
| 2001/0011025 | A1 * | 8/2001 | Ohki | H04B 1/086 455/344 |
| 2002/0143279 | A1 | 10/2002 | Porter et al. | |
| 2003/0013072 | A1 | 1/2003 | Thomas | |
| 2003/0036683 | A1 | 2/2003 | Kehr et al. | |
| 2003/0083596 | A1 | 5/2003 | Kramer et al. | |
| 2004/0204959 | A1 | 10/2004 | Moreano et al. | |
| 2004/0259693 | A1 | 12/2004 | Chien | |
| 2004/0263473 | A1 * | 12/2004 | Cho | G06F 3/014 345/156 |
| 2005/0101463 | A1 | 5/2005 | Chen | |
| 2006/0079817 | A1 | 4/2006 | Dewald | |
| 2006/0122039 | A1 | 6/2006 | Lee et al. | |
| 2006/0135325 | A1 | 6/2006 | Holness | |
| 2006/0229164 | A1 | 10/2006 | Einav | |
| 2006/0252607 | A1 | 11/2006 | Holloway | |
| 2006/0258520 | A1 | 11/2006 | Bowser | |
| 2007/0021277 | A1 | 1/2007 | Kuo | |
| 2007/0099766 | A1 | 5/2007 | Pyles | |
| 2007/0118389 | A1 | 5/2007 | Shipon | |
| 2007/0149364 | A1 | 6/2007 | Blau | |
| 2007/0194939 | A1 | 8/2007 | Alvarez et al. | |
| 2007/0243980 | A1 | 10/2007 | Bowser | |
| 2007/0271065 | A1 | 11/2007 | Gupta et al. | |
| 2008/0082356 | A1 | 4/2008 | Friedlander et al. | |
| 2008/0119333 | A1 | 5/2008 | Bowser | |
| 2008/0139975 | A1 | 6/2008 | Einav | |
| 2008/0161733 | A1 | 7/2008 | Einav et al. | |
| 2008/0281633 | A1 | 11/2008 | Burdea et al. | |
| 2008/0318738 | A1 | 12/2008 | Chen | |
| 2009/0070138 | A1 | 3/2009 | Langheier et al. | |
| 2009/0221407 | A1 | 9/2009 | Hauk | |
| 2009/0239714 | A1 | 9/2009 | Sellers | |
| 2009/0270227 | A1 * | 10/2009 | Ashby | G16H 20/30 482/8 |
| 2009/0287503 | A1 | 11/2009 | Angell et al. | |
| 2009/0299766 | A1 | 12/2009 | Friedlander et al. | |
| 2010/0022354 | A1 | 1/2010 | Fisher | |
| 2010/0029445 | A1 | 2/2010 | Lee | |
| 2010/0035726 | A1 | 2/2010 | Fisher | |
| 2010/0035729 | A1 | 2/2010 | Pandozy | |
| 2010/0076786 | A1 | 3/2010 | Dalton et al. | |
| 2010/0121160 | A1 | 5/2010 | Stark et al. | |
| 2010/0152629 | A1 | 6/2010 | Haas | |
| 2010/0216168 | A1 | 8/2010 | Heinzman et al. | |
| 2010/0234184 | A1 | 9/2010 | Le Page et al. | |
| 2010/0261585 | A1 | 10/2010 | Hauk | |
| 2010/0298102 | A1 | 11/2010 | Bosecker et al. | |
| 2010/0331144 | A1 | 12/2010 | Rindfleisch | |
| 2011/0010188 | A1 | 1/2011 | Yoshikawa et al. | |
| 2011/0071003 | A1 * | 3/2011 | Watterson | H04L 67/12 702/160 |
| 2011/0118084 | A1 | 5/2011 | Tsai et al. | |
| 2011/0119212 | A1 | 5/2011 | De Bruin et al. | |
| 2011/0165995 | A1 | 7/2011 | Paulus | |
| 2011/0172058 | A1 | 7/2011 | Deaconu | |
| 2011/0256983 | A1 | 10/2011 | Malack | |
| 2011/0275486 | A1 | 11/2011 | Hsu | |
| 2011/0306846 | A1 | 12/2011 | Osorio | |
| 2012/0004932 | A1 | 1/2012 | Sorkey et al. | |
| 2012/0040799 | A1 | 2/2012 | Jaquish | |
| 2012/0041771 | A1 | 2/2012 | Cosentino et al. | |
| 2012/0220427 | A1 * | 8/2012 | Ashby | A63B 71/0622 482/4 |
| 2012/0232438 | A1 | 9/2012 | Cataldi et al. | |
| 2012/0259648 | A1 | 10/2012 | Mallon et al. | |
| 2012/0296455 | A1 | 11/2012 | Ohnemus et al. | |
| 2012/0323346 | A1 * | 12/2012 | Ashby | A63B 24/0003 700/91 |
| 2013/0029808 | A1 | 1/2013 | Kuo | |
| 2013/0029809 | A1 | 1/2013 | Spevak | |
| 2013/0116094 | A1 | 5/2013 | Chen | |
| 2013/0211281 | A1 | 8/2013 | Ross et al. | |
| 2013/0253943 | A1 | 9/2013 | Lee et al. | |
| 2013/0274069 | A1 | 10/2013 | Watterson et al. | |
| 2013/0345604 | A1 | 12/2013 | Nakamura | |
| 2014/0031173 | A1 | 1/2014 | Huang | |
| 2014/0087341 | A1 * | 3/2014 | Hall | G09B 19/0092 434/258 |
| 2014/0089836 | A1 | 3/2014 | Damani et al. | |
| 2014/0113768 | A1 | 4/2014 | Lin et al. | |
| 2014/0113776 | A1 | 4/2014 | Jaguan | |
| 2014/0195103 | A1 | 7/2014 | Nassef | |
| 2014/0228649 | A1 | 8/2014 | Rayner et al. | |
| 2014/0243160 | A1 | 8/2014 | Lim | |
| 2014/0274564 | A1 | 9/2014 | Greenbaum | |
| 2014/0330186 | A1 * | 11/2014 | Hyde | A61F 2/70 602/19 |
| 2015/0025816 | A1 | 1/2015 | Ross | |
| 2015/0065303 | A1 | 3/2015 | Born | |
| 2015/0065305 | A1 | 3/2015 | Dalton | |
| 2015/0094192 | A1 | 4/2015 | Skwortsow et al. | |
| 2015/0099458 | A1 | 4/2015 | Weisner et al. | |
| 2015/0099952 | A1 | 4/2015 | Lain et al. | |
| 2015/0141200 | A1 | 5/2015 | Murray et al. | |
| 2015/0165263 | A1 | 6/2015 | Golen | |
| 2015/0238817 | A1 * | 8/2015 | Watterson | A63B 23/0476 482/8 |
| 2015/0257679 | A1 | 9/2015 | Ross | |
| 2015/0258365 | A1 | 9/2015 | Neill et al. | |
| 2015/0265209 | A1 | 9/2015 | Zhang | |
| 2015/0328496 | A1 | 11/2015 | Eder | |
| 2015/0351664 | A1 | 12/2015 | Ross | |
| 2015/0351665 | A1 | 12/2015 | Ross | |
| 2015/0360069 | A1 | 12/2015 | Marti et al. | |
| 2015/0379430 | A1 | 12/2015 | Dirac et al. | |
| 2016/0096073 | A1 | 4/2016 | Rahman et al. | |
| 2016/0136483 | A1 | 5/2016 | Reich | |
| 2016/0143593 | A1 | 5/2016 | Fu et al. | |
| 2016/0166881 | A1 | 6/2016 | Ridgel et al. | |
| 2016/0184634 | A1 | 6/2016 | Yanev | |
| 2016/0193306 | A1 | 7/2016 | Rabovsky et al. | |
| 2016/0220867 | A1 * | 8/2016 | Flaherty | G16H 20/30 |
| 2016/0271438 | A1 | 9/2016 | Weisz | |
| 2016/0271452 | A1 * | 9/2016 | Lagree | G06Q 10/0639 |
| 2016/0287166 | A1 | 10/2016 | Tran | |
| 2016/0317860 | A1 | 11/2016 | Baudhuin et al. | |
| 2017/0003311 | A1 | 1/2017 | Lay | |
| 2017/0004260 | A1 | 1/2017 | Moturu et al. | |
| 2017/0021827 | A1 | 1/2017 | Seagraves | |
| 2017/0036055 | A1 | 2/2017 | Fleming | |
| 2017/0065849 | A1 | 3/2017 | Konishi | |
| 2017/0065873 | A1 * | 3/2017 | Hall | G09B 5/065 |
| 2017/0100628 | A1 | 4/2017 | Wilt | |
| 2017/0100637 | A1 | 4/2017 | Princen et al. | |
| 2017/0132947 | A1 | 5/2017 | Maeda et al. | |
| 2017/0148297 | A1 | 5/2017 | Ross | |
| 2017/0172466 | A1 * | 6/2017 | Eriksson | A61B 5/0022 |
| 2017/0235882 | A1 | 8/2017 | Orlov et al. | |
| 2017/0235906 | A1 | 8/2017 | Dorris et al. | |
| 2017/0262604 | A1 | 9/2017 | Francois | |
| 2017/0283508 | A1 | 10/2017 | Demopulos et al. | |
| 2017/0323481 | A1 | 11/2017 | Tran et al. | |

(56) References Cited

U.S. PATENT DOCUMENTS

| | | | | |
|---|---|---|---|---|
| 2017/0347923 | A1 | 12/2017 | Roh | |
| 2017/0361165 | A1 | 12/2017 | Miller | |
| 2018/0001181 | A1 | 1/2018 | Prellwitz et al. | |
| 2018/0036593 | A1 | 2/2018 | Ridgel et al. | |
| 2018/0060494 | A1 | 3/2018 | Dias et al. | |
| 2018/0064991 | A1 | 3/2018 | Yanev | |
| 2018/0096111 | A1 | 4/2018 | Wells et al. | |
| 2018/0111034 | A1 | 4/2018 | Watterson | |
| 2018/0154240 | A1* | 6/2018 | Hall | A63B 71/0622 |
| 2018/0177612 | A1 | 6/2018 | Trabish et al. | |
| 2018/0177664 | A1 | 6/2018 | Choi et al. | |
| 2018/0178059 | A1 | 6/2018 | Hyungsoon et al. | |
| 2018/0236307 | A1 | 8/2018 | Hyde et al. | |
| 2018/0263535 | A1 | 9/2018 | Cramer | |
| 2018/0263552 | A1 | 9/2018 | Graman et al. | |
| 2018/0264312 | A1 | 9/2018 | Pompile et al. | |
| 2018/0290017 | A1 | 10/2018 | Fung | |
| 2018/0296143 | A1 | 10/2018 | Anderson et al. | |
| 2018/0326243 | A1 | 11/2018 | Badi et al. | |
| 2018/0353812 | A1 | 12/2018 | Lannon et al. | |
| 2019/0009135 | A1 | 1/2019 | Wu | |
| 2019/0019163 | A1 | 1/2019 | Batey et al. | |
| 2019/0019573 | A1 | 1/2019 | Lake et al. | |
| 2019/0046794 | A1 | 2/2019 | Goodall et al. | |
| 2019/0060699 | A1 | 2/2019 | Frederick et al. | |
| 2019/0080802 | A1 | 3/2019 | Ziobro et al. | |
| 2019/0090744 | A1 | 3/2019 | Mahfouz | |
| 2019/0118038 | A1 | 4/2019 | Tana et al. | |
| 2019/0183715 | A1 | 6/2019 | Kapure et al. | |
| 2019/0192912 | A1 | 6/2019 | Radow | |
| 2019/0223797 | A1 | 7/2019 | Tran | |
| 2019/0247718 | A1 | 8/2019 | Blevins | |
| 2019/0262655 | A1 | 8/2019 | Lentine | |
| 2019/0275368 | A1 | 9/2019 | Maroldi | |
| 2019/0282857 | A1* | 9/2019 | Hapola | A63B 71/0622 |
| 2019/0290965 | A1 | 9/2019 | Oren | |
| 2019/0314681 | A1 | 10/2019 | Yang | |
| 2019/0336815 | A1 | 11/2019 | Hsu | |
| 2019/0344123 | A1 | 11/2019 | Rubin et al. | |
| 2019/0362242 | A1 | 11/2019 | Pillai et al. | |
| 2020/0006639 | A1 | 1/2020 | Wu et al. | |
| 2020/0038703 | A1 | 2/2020 | Cleary et al. | |
| 2020/0085300 | A1 | 3/2020 | Kwatra et al. | |
| 2020/0086163 | A1* | 3/2020 | Karys | A63B 21/0442 |
| 2020/0114207 | A1 | 4/2020 | Weldemariam | |
| 2020/0151595 | A1 | 5/2020 | Jayalath et al. | |
| 2020/0303063 | A1 | 9/2020 | Sharma et al. | |
| 2020/0365256 | A1 | 11/2020 | Hayashitani et al. | |
| 2020/0410893 | A1 | 12/2020 | Ridington | |
| 2020/0411162 | A1 | 12/2020 | Lien et al. | |
| 2021/0005224 | A1 | 1/2021 | Rothschild et al. | |
| 2021/0005319 | A1 | 1/2021 | Otsuki et al. | |
| 2021/0035674 | A1 | 2/2021 | Volosin et al. | |
| 2021/0113877 | A1 | 4/2021 | Chin | |
| 2021/0245003 | A1 | 8/2021 | Turner | |
| 2021/0268335 | A1 | 9/2021 | Mizukura | |
| 2021/0272677 | A1 | 9/2021 | Barbee | |
| 2021/0343384 | A1 | 11/2021 | Purushothaman et al. | |
| 2021/0361514 | A1 | 11/2021 | Choi et al. | |
| 2021/0398668 | A1 | 12/2021 | Chock et al. | |
| 2022/0000556 | A1 | 1/2022 | Casey et al. | |
| 2022/0001232 | A1 | 1/2022 | DeForest | |
| 2022/0016480 | A1 | 1/2022 | Bissonnette et al. | |
| 2022/0016485 | A1 | 1/2022 | Bissonnette et al. | |
| 2022/0020469 | A1 | 1/2022 | Tanner | |
| 2022/0044806 | A1 | 2/2022 | Sanders et al. | |
| 2022/0072362 | A1 | 3/2022 | Hopson | |
| 2022/0105390 | A1 | 4/2022 | Yuasa | |
| 2022/0118218 | A1 | 4/2022 | Bense et al. | |
| 2022/0133576 | A1 | 5/2022 | Choi et al. | |
| 2022/0176039 | A1 | 6/2022 | Lintereur et al. | |
| 2022/0181004 | A1 | 6/2022 | Zilca et al. | |
| 2022/0238222 | A1 | 7/2022 | Neuberg | |
| 2022/0262504 | A1 | 8/2022 | Bratty et al. | |
| 2022/0266094 | A1 | 8/2022 | Mason et al. | |
| 2022/0273985 | A1 | 9/2022 | Jeong et al. | |
| 2022/0300787 | A1 | 9/2022 | Wall et al. | |
| 2022/0304881 | A1 | 9/2022 | Choi et al. | |
| 2022/0304882 | A1 | 9/2022 | Choi | |
| 2022/0305328 | A1 | 9/2022 | Choi et al. | |
| 2022/0323826 | A1 | 10/2022 | Khurana | |
| 2022/0327714 | A1 | 10/2022 | Cook et al. | |
| 2022/0327807 | A1 | 10/2022 | Cook et al. | |
| 2022/0330823 | A1 | 10/2022 | Janssen | |
| 2022/0338761 | A1 | 10/2022 | Maddahi et al. | |
| 2022/0339052 | A1 | 10/2022 | Kim | |
| 2022/0395232 | A1 | 12/2022 | Locke | |
| 2022/0401783 | A1 | 12/2022 | Choi | |
| 2022/0415469 | A1 | 12/2022 | Mason | |
| 2022/0415471 | A1 | 12/2022 | Mason | |
| 2023/0001268 | A1* | 1/2023 | Bissonnette | A63B 24/0062 |
| 2023/0013530 | A1 | 1/2023 | Mason | |
| 2023/0014598 | A1 | 1/2023 | Mason et al. | |
| 2023/0029639 | A1 | 2/2023 | Roy | |
| 2023/0048040 | A1 | 2/2023 | Hacking et al. | |
| 2023/0051751 | A1 | 2/2023 | Hacking et al. | |
| 2023/0058605 | A1 | 2/2023 | Mason | |
| 2023/0060039 | A1 | 2/2023 | Mason | |
| 2023/0072368 | A1 | 3/2023 | Mason | |
| 2023/0078793 | A1 | 3/2023 | Mason | |
| 2023/0119461 | A1 | 4/2023 | Mason | |
| 2023/0190100 | A1 | 6/2023 | Stump | |
| 2023/0201656 | A1 | 6/2023 | Hacking et al. | |
| 2023/0207097 | A1 | 6/2023 | Mason | |
| 2023/0207124 | A1 | 6/2023 | Walsh et al. | |
| 2023/0215539 | A1 | 7/2023 | Rosenberg et al. | |
| 2023/0215552 | A1 | 7/2023 | Khotilovich et al. | |
| 2023/0245747 | A1 | 8/2023 | Rosenberg et al. | |
| 2023/0245748 | A1 | 8/2023 | Rosenberg et al. | |
| 2023/0245750 | A1 | 8/2023 | Rosenberg et al. | |
| 2023/0245751 | A1 | 8/2023 | Rosenberg et al. | |
| 2023/0253089 | A1 | 8/2023 | Rosenberg et al. | |
| 2023/0255555 | A1 | 8/2023 | Sundaram et al. | |
| 2023/0263428 | A1 | 8/2023 | Hull et al. | |
| 2023/0274813 | A1 | 8/2023 | Rosenberg et al. | |
| 2023/0282329 | A1 | 9/2023 | Mason et al. | |

FOREIGN PATENT DOCUMENTS

| | | | |
|---|---|---|---|
| CN | 101964151 | A | 2/2011 |
| CN | 201889024 | U | 7/2011 |
| CN | 102670381 | A | 9/2012 |
| CN | 103263336 | A | 8/2013 |
| CN | 103390357 | A | 11/2013 |
| CN | 103473631 | A | 12/2013 |
| CN | 103501328 | A | 1/2014 |
| CN | 103721343 | A | 4/2014 |
| CN | 203677851 | U | 7/2014 |
| CN | 103136447 | B | 8/2016 |
| CN | 205626871 | U | 10/2016 |
| CN | 106236502 | A | 12/2016 |
| CN | 106621195 | A | 5/2017 |
| CN | 107551475 | A | 1/2018 |
| CN | 107930021 | A | 4/2018 |
| CN | 208224811 | A | 12/2018 |
| CN | 109191954 | A | 1/2019 |
| CN | 109363887 | A | 2/2019 |
| CN | 110201358 | A | 9/2019 |
| CN | 110322957 | A | 10/2019 |
| CN | 110808092 | A | 2/2020 |
| CN | 110931103 | A | 3/2020 |
| CN | 110993057 | A | 4/2020 |
| CN | 111111110 | A | 5/2020 |
| CN | 111460305 | A | 7/2020 |
| CN | 111790111 | A | 10/2020 |
| CN | 212141371 | U | 12/2020 |
| CN | 112289425 | A | 1/2021 |
| CN | 212624809 | U | 2/2021 |
| CN | 213190965 | U | 5/2021 |
| CN | 113384850 | A | 9/2021 |
| CN | 113499572 | A | 10/2021 |
| CN | 215136488 | U | 12/2021 |
| CN | 113885361 | A | 1/2022 |
| CN | 114049961 | A | 2/2022 |

(56) References Cited

FOREIGN PATENT DOCUMENTS

| | | | |
|---|---|---|---|
| CN | 114203274 | A | 3/2022 |
| CN | 216258145 | U | 4/2022 |
| CN | 114632302 | A | 6/2022 |
| CN | 114694824 | A | 7/2022 |
| CN | 114898832 | A | 8/2022 |
| CN | 114983760 | A | 9/2022 |
| CN | 217472652 | U | 9/2022 |
| CN | 110270062 | B | 10/2022 |
| CN | 218420859 | U | 2/2023 |
| CN | 115954081 | A | 4/2023 |
| EP | 0383137 | A2 | 8/1990 |
| EP | 1159989 | A1 | 12/2001 |
| EP | 1391179 | A1 | 2/2004 |
| EP | 1968028 | | 9/2008 |
| EP | 1909730 | B1 | 4/2014 |
| EP | 2815242 | A4 | 12/2014 |
| EP | 2869805 | A | 5/2015 |
| EP | 2997951 | A1 | 3/2016 |
| EP | 2688472 | B1 | 4/2016 |
| EP | 3671700 | A1 | 6/2020 |
| EP | 3984508 | A1 | 4/2022 |
| EP | 3984509 | A1 | 4/2022 |
| EP | 3984510 | A1 | 4/2022 |
| EP | 3984511 | A1 | 4/2022 |
| EP | 3984512 | A1 | 4/2022 |
| EP | 3984513 | A1 | 4/2022 |
| EP | 4054699 | A1 | 9/2022 |
| EP | 4112033 | A1 | 1/2023 |
| FR | 3127393 | A1 | 3/2023 |
| GB | 2512431 | A | 10/2014 |
| GB | 2591542 | B | 3/2022 |
| IN | 201811043670 | A | 7/2018 |
| JP | 2000005339 | A | 1/2000 |
| JP | 2005227928 | A | 8/2005 |
| JP | 2005227928 | A1 | 8/2005 |
| JP | 2009112336 | A | 5/2009 |
| JP | 3193662 | U | 10/2014 |
| JP | 5804063 | B2 | 11/2015 |
| JP | 2019028647 | A | 2/2019 |
| JP | 6871379 | B2 | 5/2021 |
| JP | 2022521378 | A | 4/2022 |
| JP | 3238491 | U | 7/2022 |
| JP | 7198364 | B2 | 12/2022 |
| JP | 7202474 | B2 | 1/2023 |
| JP | 7231750 | B2 | 3/2023 |
| JP | 7231751 | B2 | 3/2023 |
| JP | 7231752 | B2 | 3/2023 |
| KR | 200276919 | Y1 | 5/2002 |
| KR | 100582596 | B1 | 5/2006 |
| KR | 101042258 | B1 | 6/2011 |
| KR | 101258250 | B1 | 4/2013 |
| KR | 20140128630 | A | 11/2014 |
| KR | 20150078191 | A | 7/2015 |
| KR | 101580071 | B1 | 12/2015 |
| KR | 101647620 | B1 | 8/2016 |
| KR | 20180004928 | A | 1/2018 |
| KR | 20190029175 | A | 3/2019 |
| KR | 101969392 | B1 | 8/2019 |
| KR | 102055279 | B1 | 12/2019 |
| KR | 102088333 | B1 | 3/2020 |
| KR | 20200029180 | A | 3/2020 |
| KR | 102121586 | B1 | 6/2020 |
| KR | 20200119665 | A | 10/2020 |
| KR | 102246049 | B1 | 4/2021 |
| KR | 102246050 | B1 | 4/2021 |
| KR | 102246051 | B1 | 4/2021 |
| KR | 102246052 | B1 | 4/2021 |
| KR | 20210052028 | A | 5/2021 |
| KR | 102352602 | B1 | 1/2022 |
| KR | 102352603 | B1 | 1/2022 |
| KR | 102352604 | B1 | 1/2022 |
| KR | 102387577 | B1 | 4/2022 |
| KR | 102421437 | B1 | 7/2022 |
| KR | 20220102207 | A | 7/2022 |
| KR | 102427545 | B1 | 8/2022 |
| KR | 102467495 | B1 | 11/2022 |
| KR | 102467496 | B1 | 11/2022 |
| KR | 102469723 | B1 | 11/2022 |
| KR | 102471990 | B1 | 11/2022 |
| KR | 20220145989 | A | 11/2022 |
| KR | 20220156134 | A | 11/2022 |
| KR | 102502744 | B1 | 2/2023 |
| KR | 20230019349 | A | 2/2023 |
| KR | 20230019350 | A | 2/2023 |
| KR | 20230026556 | A | 2/2023 |
| KR | 20230026668 | A | 2/2023 |
| KR | 20230040526 | | 3/2023 |
| KR | 20230050506 | A | 4/2023 |
| KR | 20230056118 | A | 4/2023 |
| KR | 102528503 | B1 | 5/2023 |
| KR | 102531930 | B1 | 5/2023 |
| KR | 102532766 | B1 | 5/2023 |
| KR | 102539190 | B1 | 6/2023 |
| RU | 2014131288 | A | 2/2016 |
| TW | 200910231 | A | 3/2009 |
| TW | M474545 | U | 3/2014 |
| TW | 201531278 | A | 8/2015 |
| TW | M638437 | U | 3/2023 |
| WO | 2001056465 | A1 | 8/2001 |
| WO | 02062211 | A2 | 8/2002 |
| WO | 02093312 | A2 | 11/2002 |
| WO | 2005018453 | A1 | 3/2005 |
| WO | 2007102709 | A1 | 9/2007 |
| WO | 2009008968 | A1 | 1/2009 |
| WO | 2011025322 | A2 | 3/2011 |
| WO | 2012128801 | A1 | 9/2012 |
| WO | 2013002568 | A2 | 1/2013 |
| WO | 2023164292 | A1 | 3/2013 |
| WO | 2013122839 | A1 | 8/2013 |
| WO | 2014011447 | A1 | 1/2014 |
| WO | 2014163976 | A1 | 10/2014 |
| WO | 2015026744 | A1 | 2/2015 |
| WO | 2015065298 | A1 | 5/2015 |
| WO | 2015082555 | A1 | 6/2015 |
| WO | 2015112945 | A1 | 7/2015 |
| WO | 2017030781 | A1 | 2/2017 |
| WO | 2017166074 | A1 | 5/2017 |
| WO | 2017091691 | A1 | 6/2017 |
| WO | 2017165238 | A1 | 9/2017 |
| WO | 2018081795 | A1 | 5/2018 |
| WO | 2019075185 | A1 | 4/2019 |
| WO | 2019143940 | A1 | 7/2019 |
| WO | 2020229705 | A1 | 11/2020 |
| WO | 2021022003 | A1 | 2/2021 |
| WO | 2021090267 | A1 | 5/2021 |
| WO | 2022047006 | A1 | 3/2022 |
| WO | 2022092493 | A1 | 5/2022 |
| WO | 2022092494 | A1 | 5/2022 |
| WO | 2022212883 | A1 | 10/2022 |
| WO | 2022212921 | A1 | 10/2022 |
| WO | 2023008680 | A1 | 2/2023 |
| WO | 2023008681 | A1 | 2/2023 |
| WO | 2023022319 | A1 | 2/2023 |
| WO | 2023022320 | A1 | 2/2023 |
| WO | 2023052695 | A1 | 4/2023 |
| WO | 2023091496 | A1 | 5/2023 |

OTHER PUBLICATIONS

U.S. Appl. No. 16/812,462, filed Mar. 9, 2020, and titled "System, Method and Apparatus for Adjustable Pedal Crank", by Peter Arn, et al.

U.S. Appl. No. 16/813,158, filed Mar. 9, 2020, and titled "System, Method and Apparatus for a Rehabilitation Machine With a Simulated Flywheel", by S. Adam Hacking, et al.

U.S. Appl. No. 16/813,303, filed Mar. 9, 2020, and titled "Control System for a Rehabilitation and Exercise Electromechanical Device", by S. Adam Hacking, et al.

U.S. Appl. No. 16/813,224, filed Mar. 9, 2020, and titled "System, Method and Apparatus for Electrically Actuated Pedal for an Exercise or Rehabilitation Machine", by S. Adam Hacking, et al.

Jeong et al., "Computer-assisted upper extremity training using

(56) References Cited

OTHER PUBLICATIONS interactive biking exercise (iBikE) platform," Sep. 2012, pp. 1-5, 34th Annual International Conference of the IEEE EMBS.
Website for "Esino 2022 Physical Therapy Equipments Arm Fitness Indoor Trainer Leg Spin Cycle Machine Exercise Bike for Elderly," https://www.made-in-china.com/showroom/esinogroup/product-detailYdZtwGhCMKVR/China-Esino-2022-Physical-Therapy-Equipments-Arm-Fitness-Indoor-Trainer-Leg-Spin-Cycle-Machine-Exercise-Bike-for-Elderly.html, retrieved on Aug. 29, 2023, 5 pages.
Abedtash, "An Interoperable Electronic Medical Record-Based Platform For Personalized Predictive Analytics", ProQuest LLC, Jul. 2017, 185 pages.
Alcaraz et al., "Machine Learning as Digital Therapy Assessment for Mobile Gait Rehabilitation," 2018 IEEE 28th International Workshop on Machine Learning for Signal Processing (MLSP), Aalborg, Denmark, 2018, 6 pages.
Androutsou et al., "A Smartphone Application Designed to Engage the Elderly in Home-Based Rehabilitation," Frontiers in Digital Health, Sep. 2020, vol. 2, Article 15, 13 pages.
Silva et al., "SapoFitness: A mobile health application for dietary evaluation", 2011 IEEE 13th International Conference on U e-Health Networking, Applications and Services, Columbia, MO, USA, 2011, 6 pages.
Wang et al., "Interactive wearable systems for upper body rehabilitation: a systematic review," Journal of NeuroEngineering and Rehabilitation, 2017, 21 pages.
Marzolini et al., "Eligibility, Enrollment, and Completion of Exercise-Based Cardiac Rehabilitation Following Stroke Rehabilitation: What Are the Barrier?, " Physical Therapy, vol. 100, No. 1, 2019, 13 pages.
Nijjar et al., "Randomized Trial of Mindfulness-Based Stress Reduction in Cardiac Patients Eligble for Cardiac Rehabilitation," Scientific Reports, 2019, 12 pages.
Lara et al., "Human-Robot Sensor Interface for Cardiac Rehabilitation," IEEE International Conference on Rehabilitation Robotics, Jul. 2017, 8 pages.
Ishraque et al., "Aritficial Intelligence-Based Rehabilitation Therapy Exercise Recommendation System," 2018 IEEE MIT Undergraduate Research Technology Conference (URTC), Cambridge, MA, USA, 2018, 5 pages.
Zakari et al., "Are There Limitations to Exercise Benefits in Peripheral Arterial Disease?, " Frontiers in Cardiovascular Medicine, Nov. 2018, vol. 5, Article 173, 12 pages.
You et al., "Including Blood Vasculature into a Game-Theoretic Model of Cancer Dynamics," Games 2019, 10, 13, 22 pages.
Jeong et al., "Computer-assisted upper extremity training using interactive biking exercise (iBkE) platform," Sep. 2012, 34th Annual International Conference of the IEEE EMBS, 5 pages.

* cited by examiner

METHOD AND SYSTEM FOR IMPLEMENTING AN EXERCISE PROTOCOL FOR OSTEOGENESIS AND/OR MUSCULAR HYPERTROPHY

CROSS-REFERENCES TO RELATED APPLICATIONS

This application claims priority to and the benefit of U.S. Provisional Application Patent Ser. No. 62/865,847 filed Jun. 24, 2019, the entire disclosure of which is hereby incorporated by reference.

TECHNICAL FIELD

This disclosure relates to exercise machines. More specifically, this disclosure relates to a therapeutic method and system for an exercise protocol for osteogenesis and/or muscular hypertrophy.

BACKGROUND

Osteogenic isometric exercise and/or rehabilitation and/or strength training equipment is used to facilitate isometric exercises. A user may perform an exercise (e.g., bench press, pull down, arm curl, etc.) using the osteogenic isometric exercise and/or rehabilitation and/or strength training equipment to improve osteogenesis, bone growth, bone density, muscular hypertrophy, or some combination thereof. The isometric exercise and/or rehabilitation and/or strength training equipment may include non-movable portions onto which the user adds load. For example, to perform a leg-press-style exercise, the user may sit in a seat, place each of their feet on a respective foot plate, and push on the feet plate with their feet while the feet plate remain in the same position.

SUMMARY

Representative embodiments set forth herein disclose a therapeutic method and system for a single exercise protocol for osteogenesis and/or muscular hypertrophy. As used herein, the term "exercise machine" and "isometric exercise and rehabilitation assembly" may be used interchangeably. The term "exercise machine" and the term "isometric exercise and rehabilitation assembly" may also refer to an osteogenic, strength training, isometric exercise, and/or rehabilitation assembly.

In one embodiment, a method is disclosed for implementing an exercise protocol by using an exercise machine. The method includes initiating, based on the exercise protocol, a warmup session for a first exercise. The warmup session includes providing a first indication to be presented in a user interface, and the first indication instructs a user to add a first target load threshold, for a first period of time, to one or more portions of the exercise machine. The one or more portions are associated with the first exercise. The method also includes determining the warmup session is complete after the first period of time elapses, and responsive to determining the warmup session is complete, initiating, based on the exercise protocol, a resting session for the first exercise, such that the resting session includes providing a second indication to be presented on the user interface. The second indication instructs the user to not add any load, for a second period of time, to the one or more portions. The method also includes determining the resting session is complete after the second period of time elapses, and responsive to determining the resting session is complete, initiating, based on the exercise protocol, an exercise session for the first exercise, such that the exercise session includes providing a third indication to be presented on the user interface. The third indication instructs the user to add a second target load threshold, for a third period of time, to the one or more portions, wherein the second target load threshold is greater than the first target load threshold.

In one embodiment, a method is disclosed for presenting a user interface to facilitate performance of an exercise protocol by using an exercise machine. The method includes presenting a first indication on the user interface. The first indication indicates a warmup session for the exercise protocol is initiated for a first exercise, and the first indication instructs a user to add a first target load threshold, for a first period of time, to one or more portions of the exercise machine. The one or more portions are associated with the first exercise. The method also includes presenting a second indication on the user interface. The second indication indicates a resting session for the exercise protocol is initiated for the first exercise, and the second indication instructs the user to not add any load, for a second period of time, to the one or more portions of the exercise machine. The method also includes presenting a third indication on the user interface. The third indication indicates an exercise session of the exercise protocol is initiated for the first exercise, and the third indication instructs the user to add a second target load threshold, for a third period of time, to the one or more portions, wherein the second target load threshold is greater than the first target load threshold.

In one embodiment, a system comprises a memory device storing instructions and a processing device operatively coupled to the memory device, wherein the processing device is configured to execute the instructions to initiate, based on an exercise protocol, a warmup session for a first exercise, such that the warmup session includes providing a first indication to be presented in a user interface, and the first indication instructs a user to add a first target load threshold, for a first period of time, to one or more portions of the exercise machine. The one or more portions are associated with the first exercise. The processing device is configured to determine the warmup session is complete after the first period of time elapses. Responsive to determining the warmup session is complete, the processing device is configured to initiate, based on the exercise protocol, a resting session for the first exercise, such that the resting session comprises providing a second indication to be presented on the user interface, and the second indication instructs the user to not add any load, for a second period of time, to the one or more portions. The processing device is configured to determine the resting session is complete after the second period of time elapses. Responsive to determining the resting session is complete, the processing device is configured to initiate, based on the exercise protocol, an exercise session for the first exercise, such that the exercise session includes providing a third indication to be presented on the user interface, and the third indication instructs the user to add a second target load threshold, for a third period of time, to the one or more portions. The second target load threshold is greater than the first target load threshold. Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
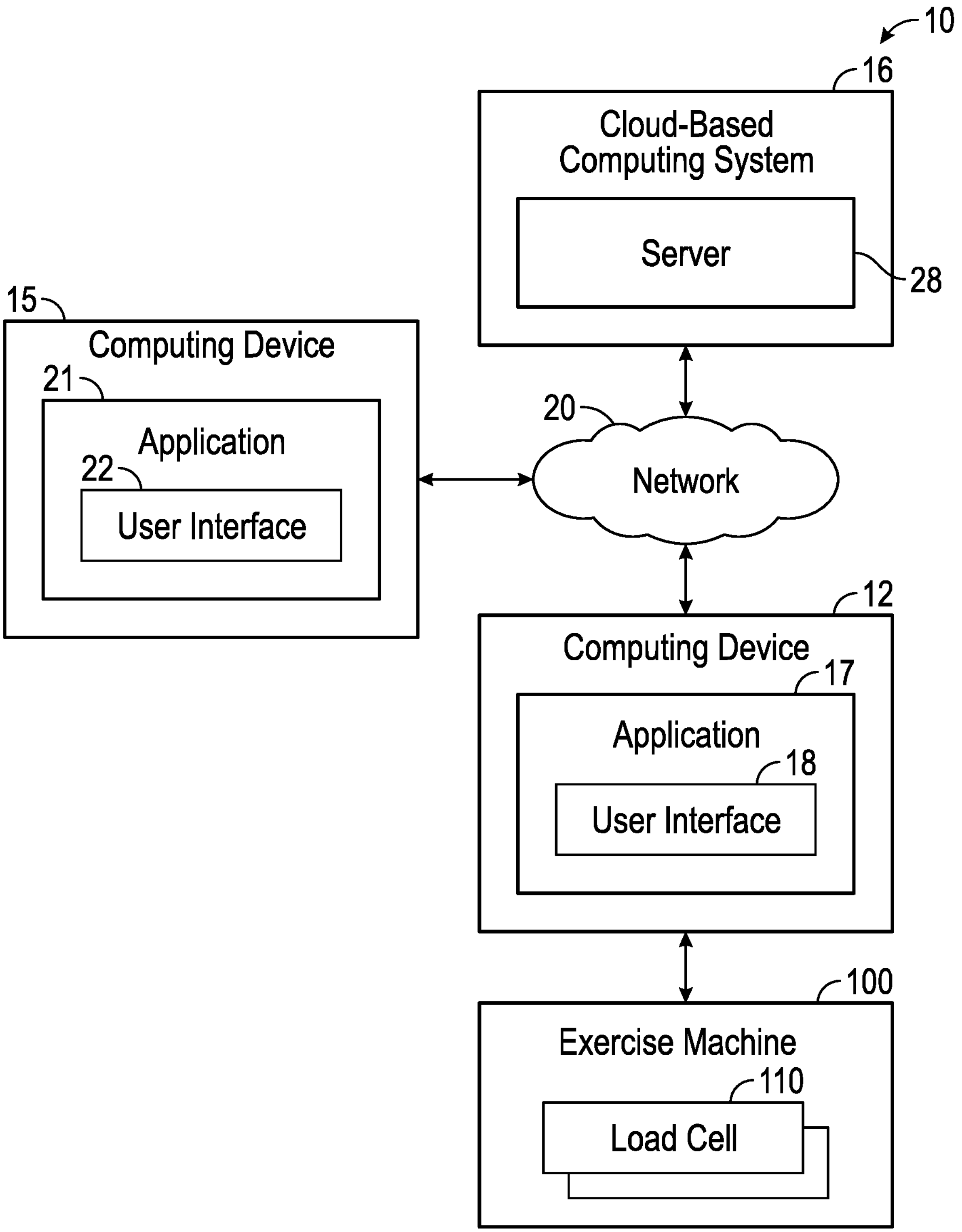
FIG. 1 illustrates a high-level component diagram of an illustrative system architecture according to certain embodiments of this disclosure.
Figure 2:
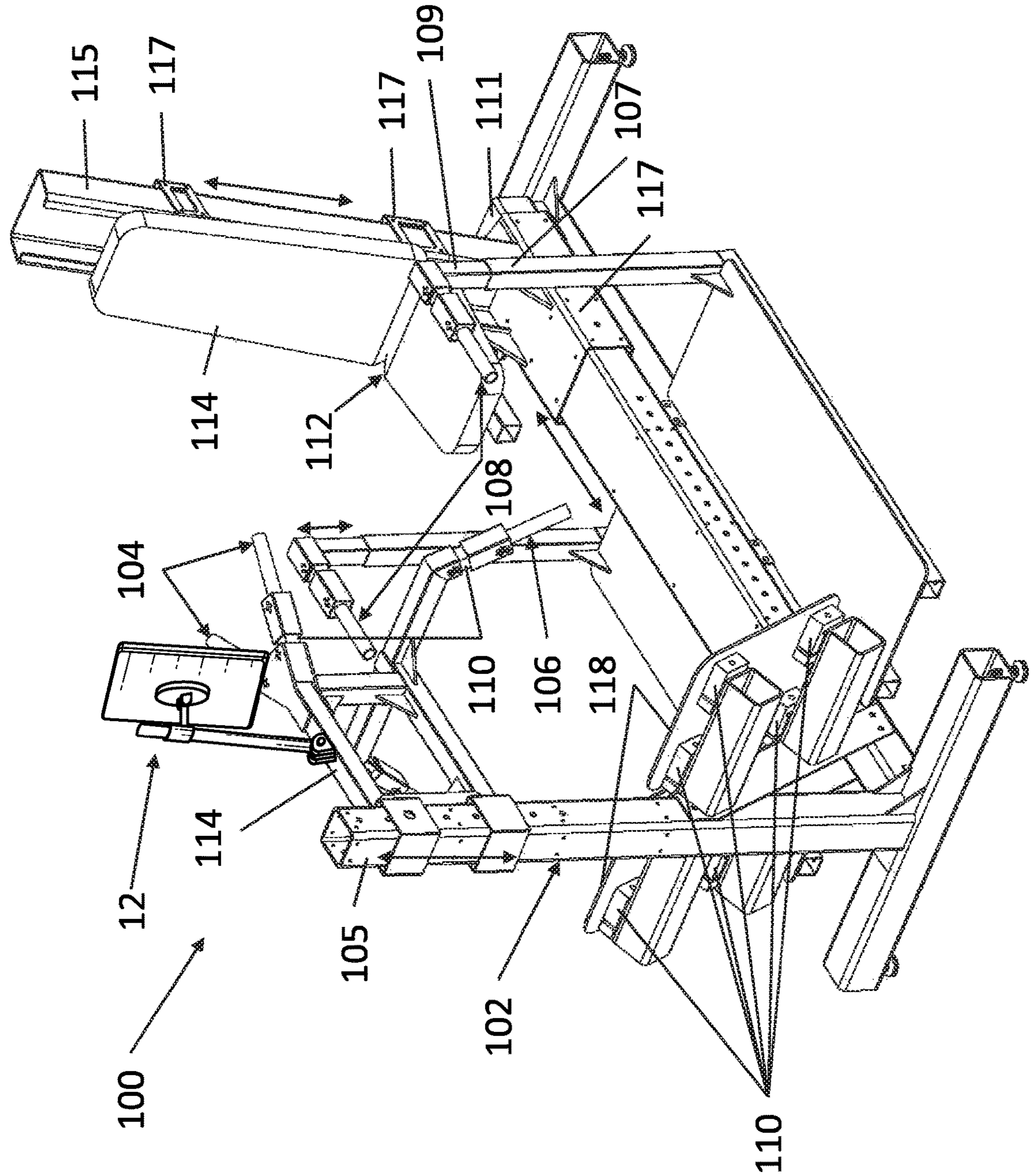
FIG. 2 illustrates an elevated perspective view of one embodiment of an isometric exercise and rehabilitation assembly.
Figure 3:
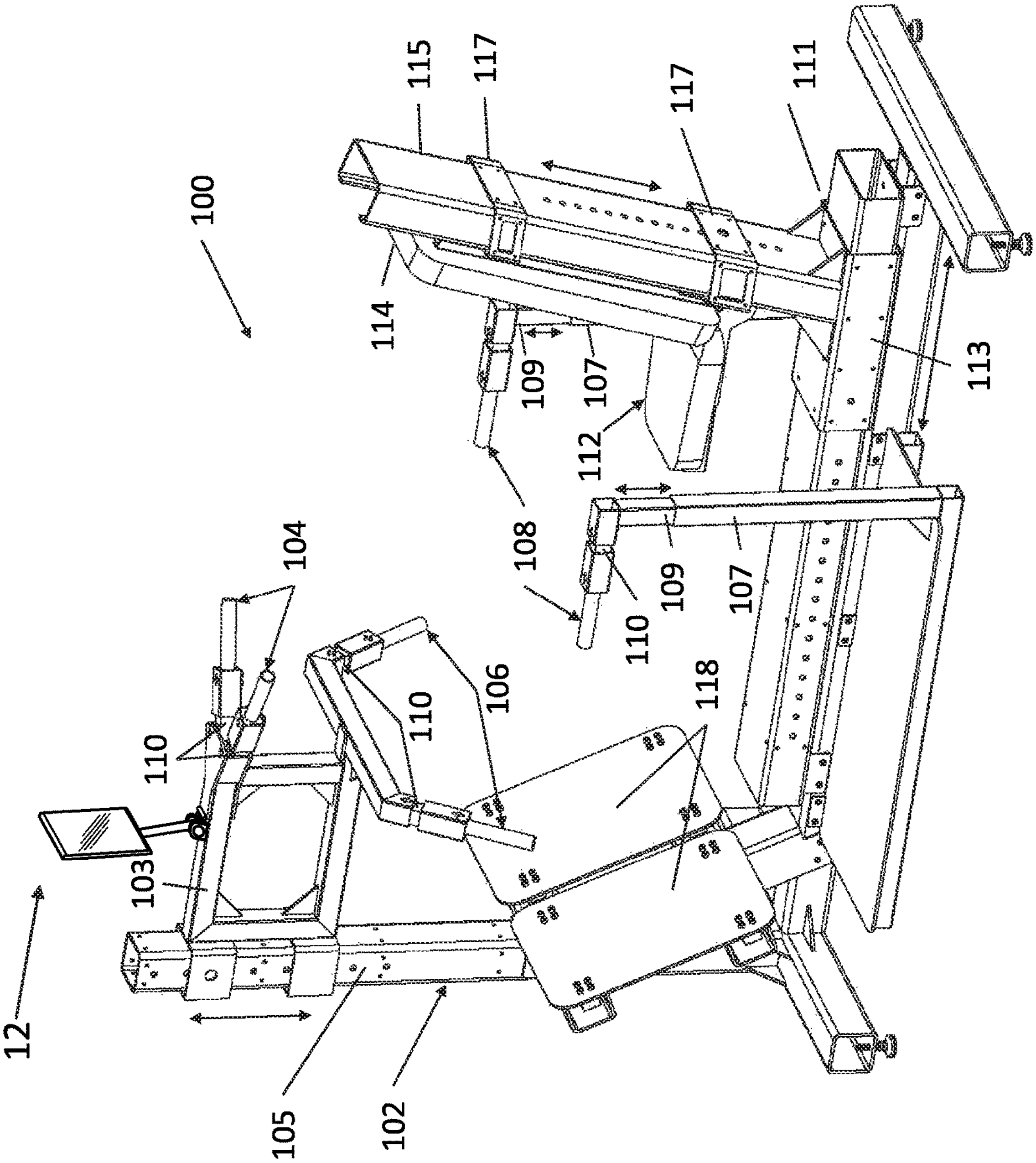
FIG. 3 illustrates a perspective view of the isometric exercise and rehabilitation assembly.
Figure 4:
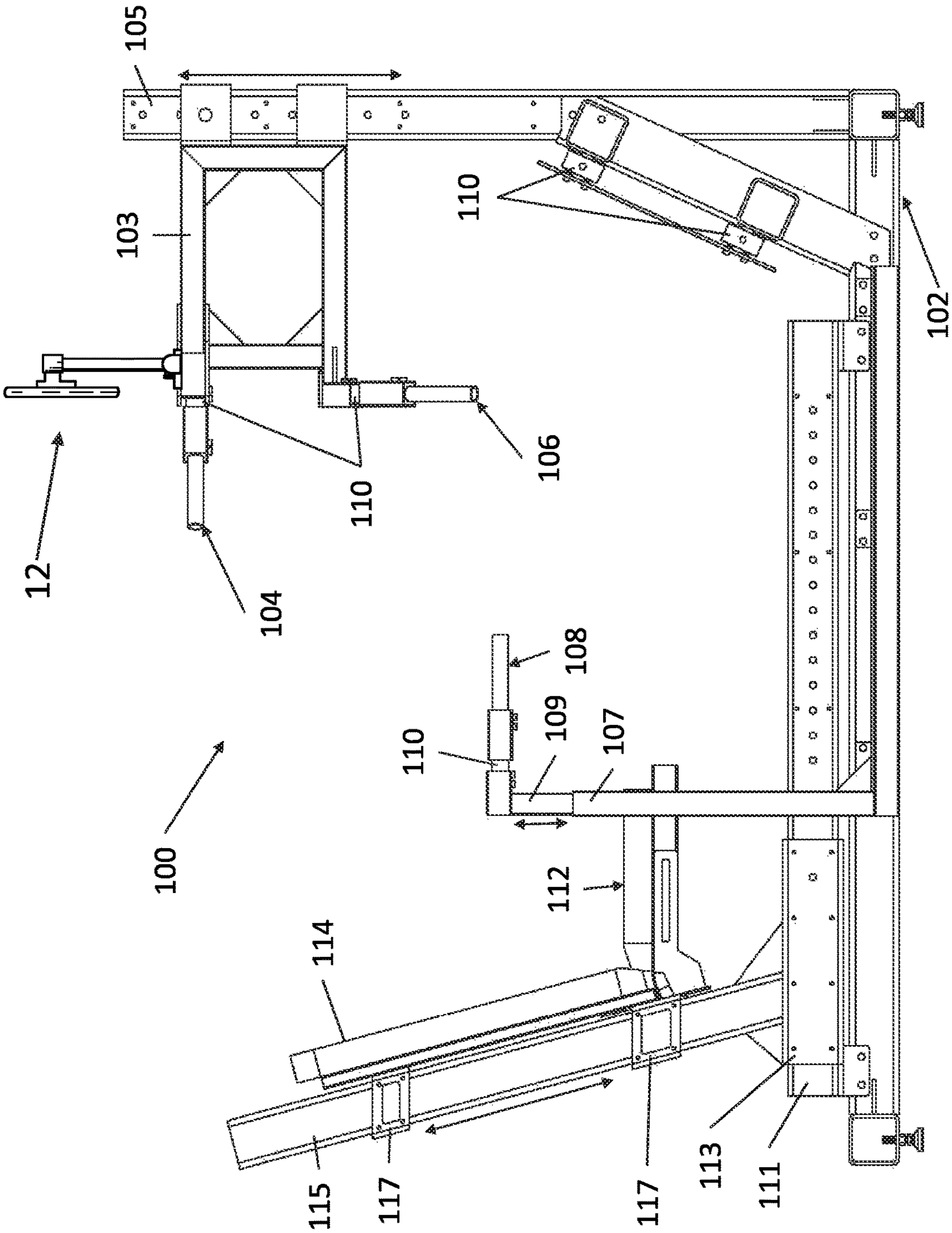
FIG. 4 illustrates a side view of the isometric exercise and rehabilitation assembly.
Figure 5:
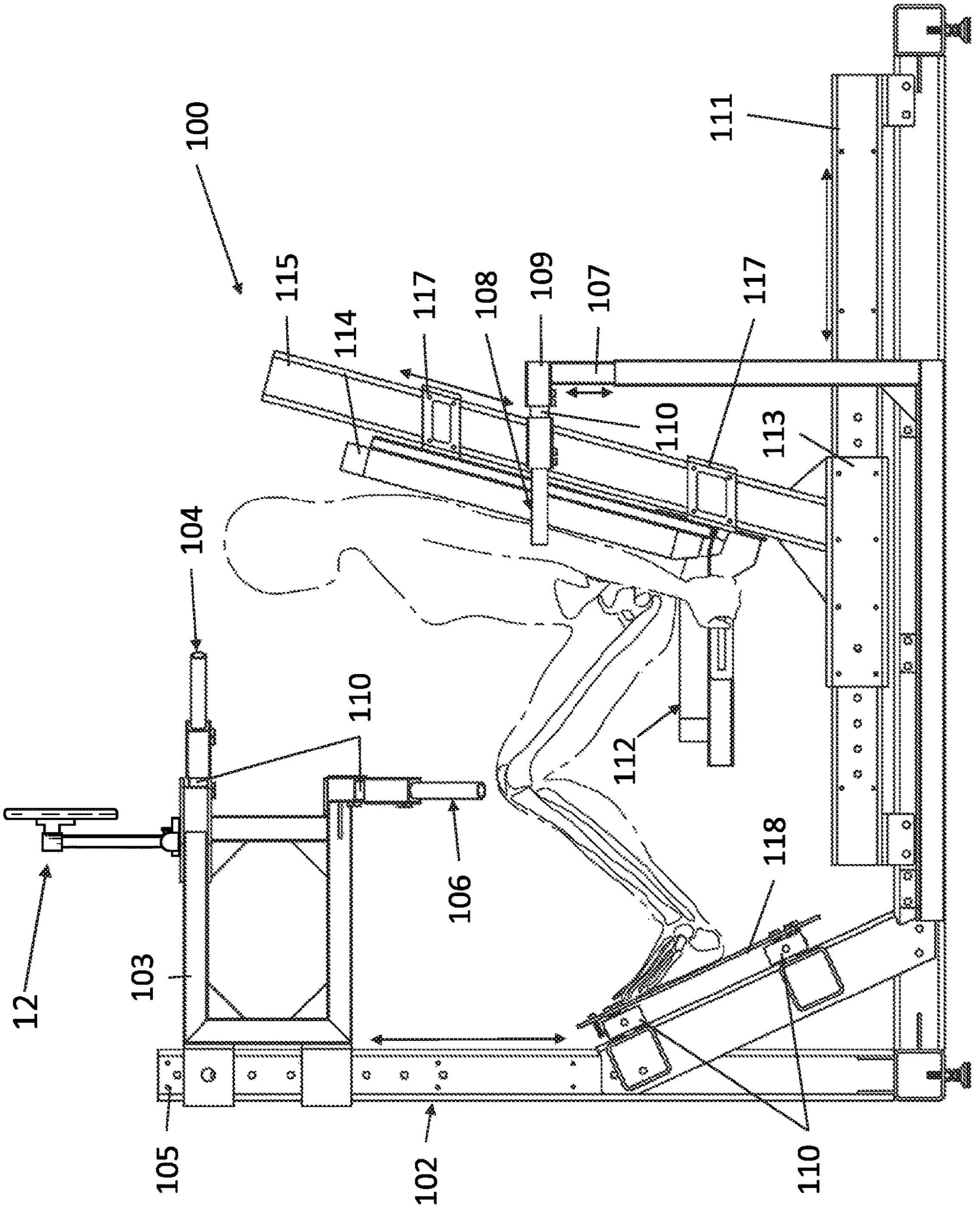
FIG. 5 illustrates a side view of the isometric exercise and rehabilitation assembly with a user performing a leg-press-style exercise.
Figure 6:
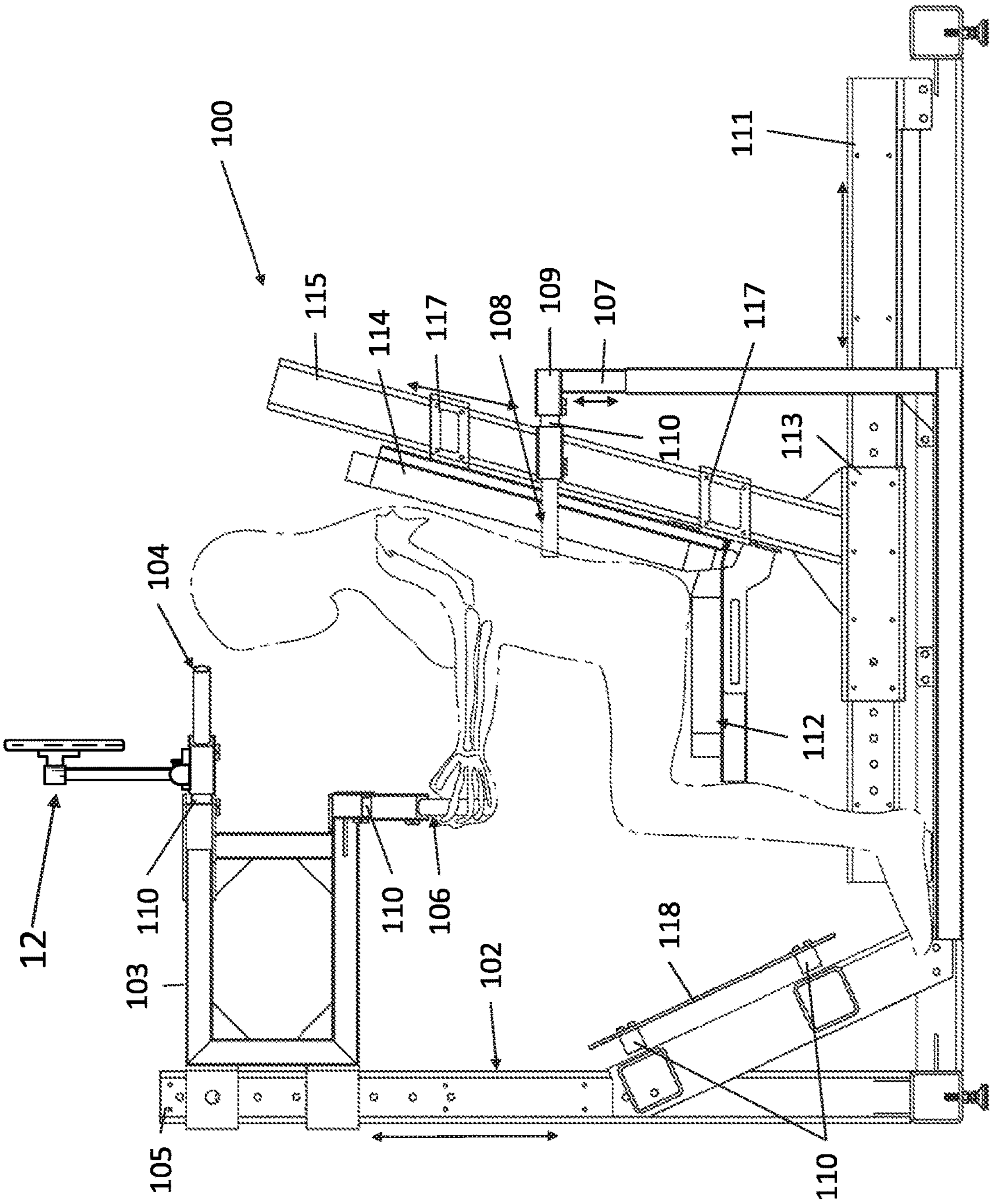
FIG. 6 illustrates a side view of the isometric exercise and rehabilitation assembly with a user performing a chest-press-style exercise.
Figure 7:
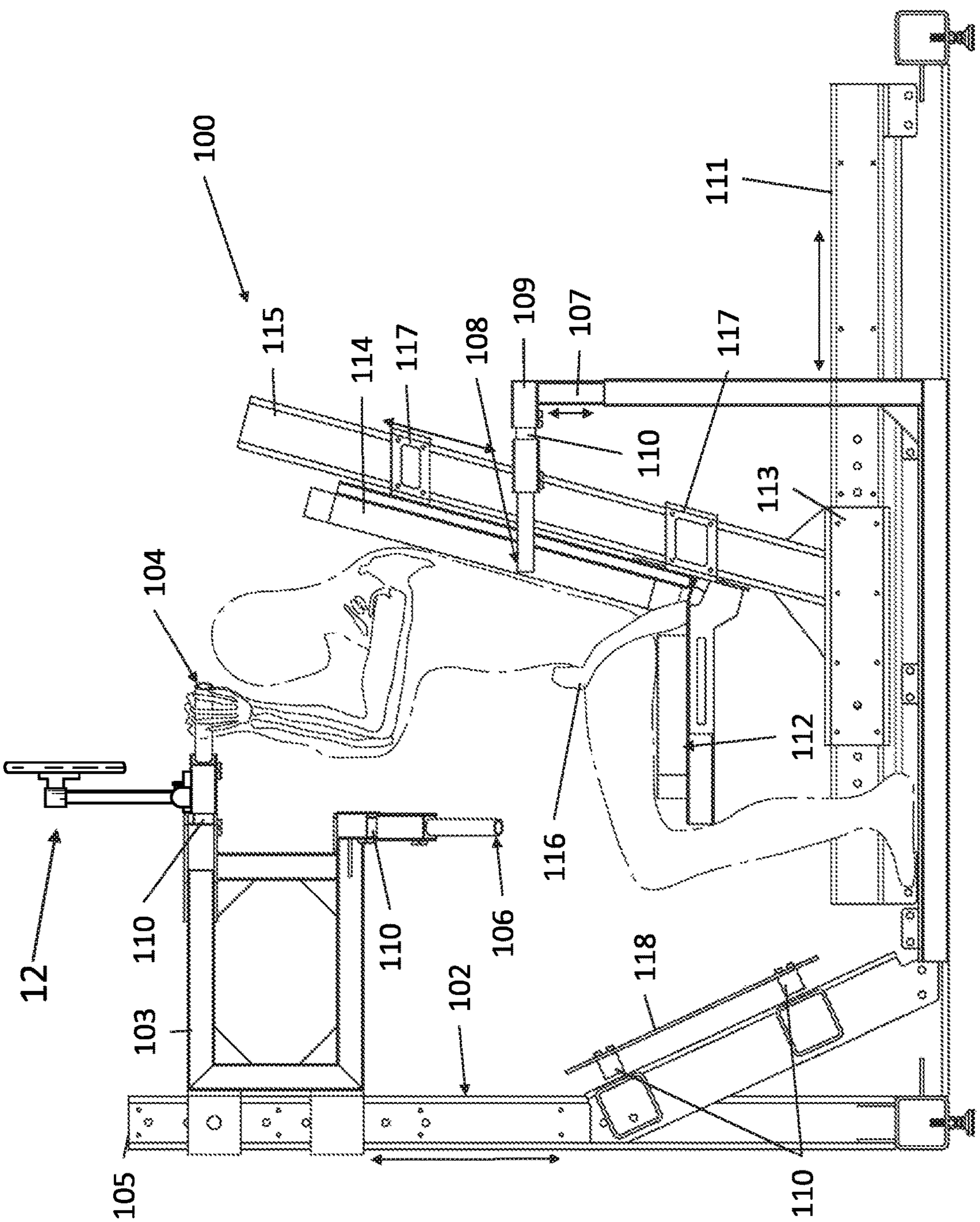
FIG. 7 illustrates a side view of the isometric exercise and rehabilitation assembly with a user performing a core-pull-style exercise.
Figure 8:
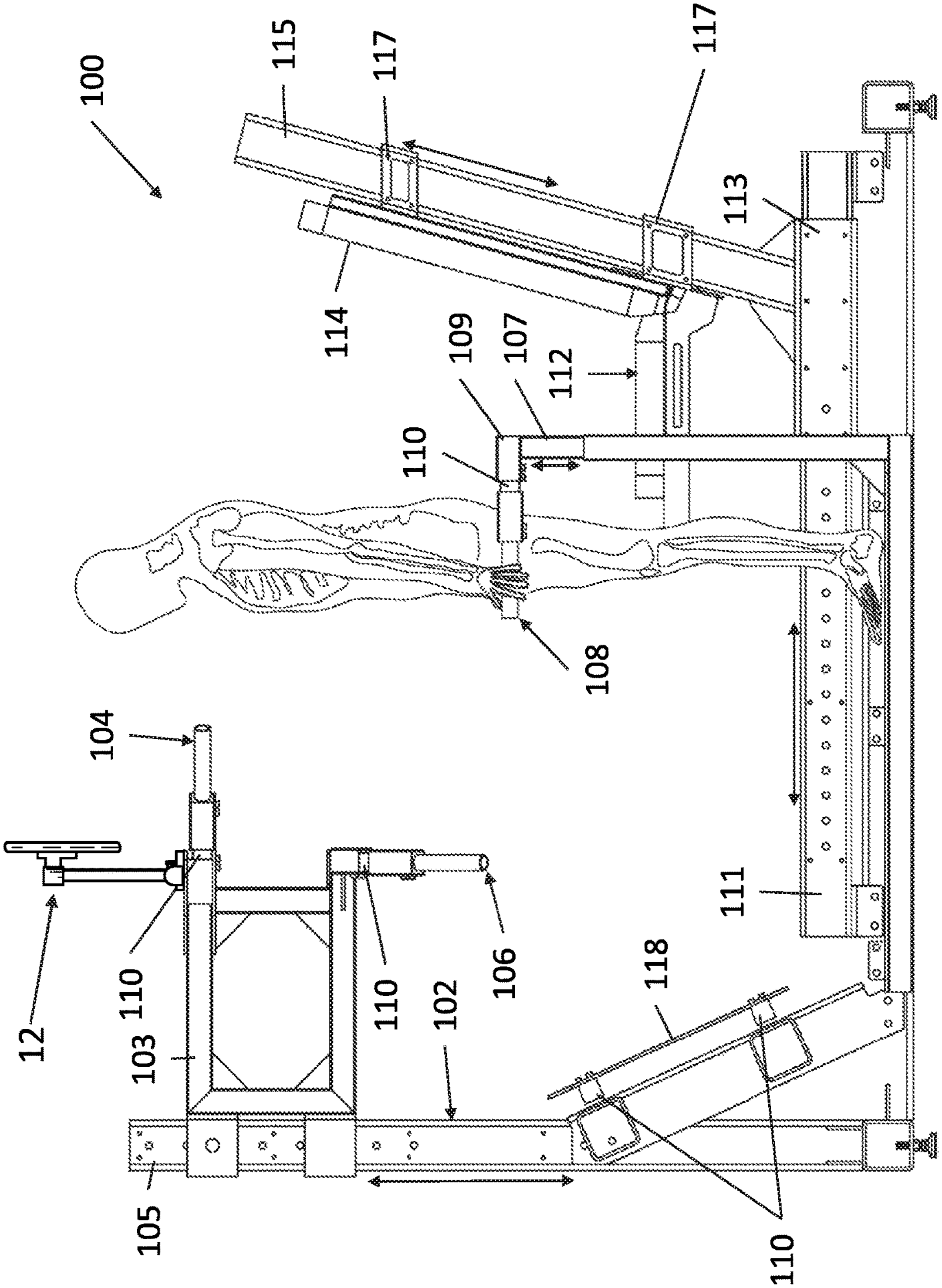
FIG. 8 illustrates a side view of the isometric exercise and rehabilitation assembly with a user performing a suitcase-lift-style exercise.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase “one or more” when used with a list of items means there may be one item or any suitable number of items exceeding one.

Spatially relative terms, such as “inner,” “outer,” “beneath,” “below,” “lower,” “above,” “upper,” “top,” “bottom,” and the like, may be used herein. These spatially relative terms can be used for ease of description to describe one element’s or feature’s relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptions used herein interpreted accordingly.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms “exercise machine” and “isometric exercise and rehabilitation assembly” may be used interchangeably herein.

The term “session” when used in the context of an exercise protocol refers to a segment of the exercise protocol.

As used herein, “one-repetition” as applied to a type of exercise (e.g., isometric) refers to performing a single repetition of that type of exercise to increase a maximum strength of the muscles affected by the exercise.

The term “one or more portions” when used in the context of an exercise machine refers to one or more areas (e.g., load handles and/or feet plates) of the exercise machine to which one or more loads may be added during a particular exercise. For example, the one or more portions may comprise one or more load handles to which one or more loads are added during a chest press exercise.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The subject matter of each of U.S. Pat. No. 10,226,663, issued Mar. 12, 2019; U.S. Pat. No. 10,173,094, issued Jan. 8, 2019; U.S. Pat. No. 10,173,095, issued Jan. 8, 2019; U.S. Pat. No. 10,173,096, issued Jan. 8, 2019; U.S. Pat. No. 10,173,097, issued Jan. 8, 2019; and U.S. Pat. No. 10,646,746, issued May 12, 2020; and U.S. pending patent application Ser. No. 16/812,462 filed Mar. 9, 2020; Ser. No. 16/813,158 filed Mar. 9, 2020; Ser. No. 16/813,224 filed Mar. 9, 2020; and Ser. No. 16/813,303 filed Mar. 9, 2020, is incorporated herein by reference.

Research has shown there is a correlation between generating increased bone density (e.g., caused by osteogenesis) and increased one-repetition isometric maximum strength (e.g., caused by muscular hypertrophy). Conventional exercise machines do not implement an automated exercise protocol promoting increased bone density and increased one-repetition isometric maximum strength.

Accordingly, some embodiments of the present disclosure implement an exercise protocol for triggering osteogenesis to increase bone density and/or for triggering muscular hypertrophy to increase one-repetition isometric maximum strength. The exercise protocol may be implemented for a number of different exercises performed on an exercise machine. The exercises may include, but are not limited to, chest press, leg press, suitcase lift, arm curl, and/or core pull. One or more of the exercises may be included in an exercise plan. For example, the exercise plan may specify an order (e.g., chest press, leg press, suitcase lift, arm curl, core pull) for performing the exercises. Using the exercise protocol for each of the various exercises in an exercise plan, a user’s bone density and one-repetition maximum isometric strength may be improved for a respective exercised body portion.

The exercise machine may include a control system. For each exercise performed by the user on the exercise machine, the control system may implement an exercise protocol. The exercise protocol may include a therapeutic sequence of sessions for a user to perform to cause osteogenesis and/or muscular hypertrophy. For each exercise, the exercise protocol may include the same sessions (e.g., configuration, warmup, resting, and/or exercise), or, for each exercises, the exercise protocol may include different sessions. The sessions may be associated with differing or the same periods of time specified to be performed, and/or techniques to be employed by the user during the exercise. Further, some of the sessions may include target load thresholds to be applied by the user for the periods of time.

The exercise protocol may include a configuration session specifying precise positions for the user’s body, such that, for a particular exercise, the user is enabled to generate a maximum force on the muscles and the bones involved in that particular exercise. Further, during the configuration session, proper configurations and/or adjustments of moveable parts on the exercise machine may be specified based on one or more characteristics (e.g., height, weight, age, gender, medical condition, etc.) of the user. During the configuration session, the control system may determine whether the exercise machine has been adjusted to properly accommodate the user for the specific exercise being performed.

The exercise protocol may include a warmup session designed to prepare the neuromuscular system and/or bones by performing one repetition of a specific exercise. The warmup session may include, for a first time period (e.g., 5 seconds), instructing the user to add a first target load threshold to one or more portions of the exercise machine. In some embodiments, the first target load threshold may comprise a percentage (e.g., 50 percent) of the maximum force applied by the user to the one or more portions during a previous exercise. A maximum perceived force may be specified when the maximum force has not yet been stored for the user. For example, the maximum force may not be stored when the user performs the exercise for the first time. When used in the context of the warmup session, a percentage of one of the maximum force and a maximum perceived force may be referred to as the "first target load threshold" herein.

Upon completion of the warmup session, the exercise protocol may initiate a resting session. The resting session may include, for a second period of time, instructing the user through the user interface to not add any load to the one or more portions of the exercise machine. The second period of time may be selected such that preparation for osteogenesis is optimized. For example, 30 seconds may be selected for the second period of time, as research has indicated that 30 seconds provides the bone system an optimal amount of rest before the bone system begins the osteogenic process.

Upon completion of the resting session, the exercise protocol may initiate an exercise session. The exercise session may include, for a third period of time (e.g., 5 seconds), instructing the user through the user interface to add a second target load threshold to the one or more portions. In some embodiments, the second target load threshold may comprise a percentage (e.g., 100 percent) of the maximum force. When used in the context of the exercise session, a percentage of one of the maximum force and the maximum perceived force may be referred to as the "second target load threshold" herein.

The second target load threshold may be greater than the first target load threshold. During the exercise session, the amount of force applied by the user may provide a sufficient amount of strain on the user's bones to increase osteogenesis and/or a sufficient amount of load on the muscles to increase muscular hypertrophy.

Load cells may measure the force applied or load added, by the user, to one or more portions of the exercise machine, where the one or more portions are associated with the exercise being performed. The one or more portions may include feet plates and/or handles. If the load measurements are less than a target load threshold (e.g., percentage, fraction, amount, level, etc.), an encouraging message may be presented on the user interface, such that the encouraging message instructs the user to continue adding load to the load cells to reach the target load threshold. The phrase "adding load to the load cells" may refer to adding load in a single action at one time or a series of loads added in a series of actions at different times. In some embodiments, the target load threshold may be a previous maximum amount of weight lifted, pressed, or pulled by the user performing that particular exercise. In some embodiments, the target load threshold may be a percentage of the previous maximum amount of weight lifted, pressed, or pulled by the user performing that particular exercise. During each exercise session, the control system may be configured to encourage the user to achieve a new maximum amount of weight lifted, pressed, or pulled.

Each user may exercise and attempt to exceed these target load thresholds, and as a result, may experience greater osteogenesis. The exercise protocol may guide the user through various sessions tailored to optimize osteogenesis and/or muscular hypertrophy for the user. Accordingly, the disclosed techniques may improve a user experience with the exercise machine and/or using a computing device of the exercise machine by implementing the exercise protocol. Also, the disclosed techniques may improve technology related to exercise machines by implementing an automated exercise protocol for osteogenesis and/or muscular hypertrophy. Further, the disclosed techniques may congratulate or otherwise reward the user or reinforce the user's behavior when the target load thresholds are exceeded.

Osteogenesis

As typically healthy people grow from infants to children to adults, they experience bone growth. Such, growth, however, typically stops at approximately age 30. After that point, without interventions as described herein, bone loss (called osteoporosis), can start to occur. This does not mean that the body stops creating new bone. Rather, it means that the rate at which it creates new bone tends to slow, while the rate at which bone loss occurs tends to increase.

In addition, as people age and/or become less active than they once were, they may experience muscle loss. For example, muscles that are not used often may reduce in muscle mass. As a result, the muscles become weaker. In some instances, people may be affected by a disease, such as muscular dystrophy, that causes the muscles to become progressively weaker and to have reduced muscle mass. To increase the muscle mass and/or reduce the rate of muscle loss, people may exercise a muscle to cause muscular hypertrophy, thereby strengthening the muscle as the muscle grows. Muscular hypertrophy may refer to an increase in a size of skeletal muscle through a growth in size of its component cells. There are two factors that contribute to muscular hypertrophy, (i) sarcoplasmic hypertrophy (increase in muscle glycogen storage), and (ii) myofibrillar hypertrophy (increase in myofibril size). The growth in the cells may be caused by an adaptive response that serves to increase an ability to generate force or resist fatigue.

The rate at which such bone or muscle loss occurs generally accelerates as people age. A net growth in bone can ultimately become a net loss in bone, longitudinally across time. In an average case, but noting that significant individual variations in age do occur, by the time women are over 50 and men are over 70, net bone loss can reach a point where brittleness of the bones is so great that an increased risk of life-altering fractures can occur. Examples of such fractures include fractures of the hip and femur. Of course, fractures can also occur due to participation in athletics or due to accidents. In such cases, it is just as relevant to have a need for bone growth which heals or speeds the healing of the fracture.

To understand why such fractures occur, it is useful to recognize that bone is itself porous, with a somewhat-honeycomb like structure. This structure may be dense and therefore stronger or it may be variegated, spread out and/or sparse, such latter structure being incapable of continuously or continually supporting the weight (load) stresses experienced in everyday living. When such loads exceed the support capability of the structure at a stressor point or points, a fracture occurs. This is true whether the individual had a fragile bone structure or a strong one: it is a matter of physics, of the literal "breaking point."

It is therefore preferable to have a means of mitigating or ameliorating bone loss and of healing fractures; and, further, of encouraging new bone growth, thus increasing the density of the structure described hereinabove, thus increasing the load-bearing capacities of same, thus making first or subsequent fractures less likely to occur, and thus improving the individual's quality of life. The process of bone growth itself is referred to as osteogenesis, literally the creation of bone.

It is also preferable to have a means for mitigating or ameliorating muscle mass loss and weakening of the muscles. Further, it is preferable to encourage muscle growth by increasing the muscle mass through exercise. The increased muscle mass may enable a person to exert more force with the muscle and/or to resist fatigue in the muscle for a longer period of time.

In order to create new bone, at least three factors are necessary. First, the individual must have a sufficient intake of calcium, but second, in order to absorb that calcium, the individual must have a sufficient intake and absorption of Vitamin D, a matter problematic for those who have cystic fibrosis, who have undergone gastric bypass surgery or have other absorption disorders or conditions which limit absorption. Separately, supplemental estrogen for women and supplemental testosterone for men can further ameliorate bone loss. On the other hand, abuse of alcohol and smoking can harm one's bone structure. Medical conditions such as, without limitation, rheumatoid arthritis, renal disease, overactive parathyroid glands, diabetes or organ transplants can also exacerbate osteoporosis. Ethical pharmaceuticals such as, without limitation, hormone blockers, seizure medications and glucocorticoids are also capable of inducing such exacerbations. But even in the absence of medical conditions as described hereinabove, Vitamin D and calcium taken together may not create osteogenesis to the degree necessary or possible; or ameliorate bone loss to the degree necessary or possible.

To achieve such a degree of osteogenesis, therefore, one must add in the third factor: exercise. Specifically, one must subject one's bones to a force at least equal to certain multiple of body weight, such multiples varying depending on the individual and the specific bone in question. As used herein, "MOB" means Multiples of Body Weight. It has been determined through research that subjecting a given bone to a certain threshold MOB (this may also be known as a "weight-bearing exercise"), even for an extremely short period of time, one simply sufficient to exceed the threshold MOB, encourages and fosters osteogenesis in that bone.

Further, a person can achieve muscular hypertrophy by exercising the muscles for which increased muscle mass is desired. Strength training and/or resistance exercise may cause muscle tissue to increase. For example, pushing against or pulling on a stationary object with a certain amount of force may trigger the cells in the associated muscle to change and cause the muscle mass to increase.

The subject matter disclosed herein relates to a machine and methods and apparatuses appurtenant thereto, not only capable of enabling an individual, preferably an older, less mobile individual or preferably an individual recovering from a fracture, to engage easily in osteogenic exercises, but capable of using self-calibrating target load thresholds, such that the person using the machine can be immediately informed through visual and/or other sensorial feedback, that the osteogenic threshold has been exceeded, thus triggering osteogenesis for the subject bone (or bones) and further indicating that the then-present exercise may be terminated, enabling the person to move to a next machine-enabled exercise to enable osteogenesis in a preferably different bone or bones.

For those with any or all of the osteoporosis-exacerbating medical conditions described herein, such a machine can slow the rate of net bone loss by enabling osteogenesis to occur without exertions which would not be possible for someone whose health is fragile, not robust. Another benefit of the disclosed techniques, therefore, is enhancing a rate of healing of fractures in athletically robust individuals.

Last, while this discussion has focused purely on osteogenesis, an additional benefit is that partaking in exercises which focus on osteogenesis may, in certain embodiments, also increase muscle strength and, as a physiological system, musculoskeletal strength.

Hypertrophy

Hypertrophy is defined as an increase in volume or bulk of a tissue or organ produced entirely by enlargement of existing cells. Hypertrophy as described herein specifically refers to muscle hypertrophy. The exercises performed using the disclosed apparatus may involve the following types of muscle contractions: concentric contractions (shorten), eccentric contractions (lengthen), and isometric contractions (remain the same).

Bone Exercises and their Benefits

The following exercises achieve bone strengthening results by exposing relevant parts of a user to isometric forces which are selected multiples of body weight (MOB) of the user, a threshold level above which bone mineral density increases. The specific MOB-multiple threshold necessary to effect such increases will naturally vary from individual to individual and may be more or less for any given individual. "Bone-strengthening," as used herein, specifically includes, without limitation, a process of osteogenesis, whether due to the creation of new bone as a result of an increase in the bone mineral density; or proximately to the introduction or causation of microfractures in the underlying bone. The exercises referred to are as follows.

Leg Press

An isometric leg-press-style exercise to improve muscular strength in the following key muscle groups: gluteals, hamstrings, quadriceps, spinal extensors and grip muscles, as well as to increase resistance to skeletal fractures in leg bones such as the femur. In one example, the leg-press-style exercise can be performed at approximately 4.2 MOB or more of the user.

Chest Press

An isometric chest-press-style exercise to improve muscular strength in the following key muscle groups: pectorals, deltoids, and triceps and grip muscles, as well as to increase resistance to skeletal fractures in the humerus, clavicle, radial, ulnar and rib pectoral regions. In one example, the chest-press-style exercise can be performed at approximately 2.5 MOB or more of the user.

Suitcase Lift

An isometric suitcase-lift-style exercise to improve muscular strength in the following key muscle groups: gluteals, hamstrings, quadriceps, spinal extensors, abdominals, and upper back and grip muscles, as well as to increase resistance to skeletal fractures in the femur and spine. In one example, the suitcase-lift-style exercise can be performed at approximately 2.5 MOB or more of the user.

Arm Curl

An isometric arm-curl-style exercise to improve muscular strength in the following key muscle groups: biceps, brachialis, brachioradialis, grip muscles and trunk, as well as to increase resistance to skeletal fractures in the humerus, ribs and spine. In one example, the arm-curl-style exercise can be performed at approximately 1.5 MOB or more of the user.

Core Pull

An isometric core-pull-style exercise to improve muscular strength in the following key muscle groups: elbow flexors, grip muscles, latissimus dorsi, hip flexors and trunk, as well as to increase resistance to skeletal fractures in the ribs and spine. In one example, the core-pull-style exercise can be performed at approximately 1.5 MOB or more of the user.

Grip Strength

A grip-strengthening-style exercise which may preferably be situated around, or integrated with, a station in an exercise machine, in order to improve strength in the muscles of the hand, forearm, or other gripping extremity. Moreover, measurement of grip strength can be taken prior to, during, and/or after the grip-strengthening-style exercise is performed. Grip strength is medically salient because it has been positively correlated with a better state of health. Accordingly, measurements of grip strength can be used to in conjunction with and/or to guide, assist, or enhance the exercise and rehabilitation of a user. Furthermore, a measurement of grip strength during the grip-strengthening-style exercise can be used to provide real-time-feedback to the user. Such real-time-feedback during the grip-strengthening-style exercise can be used to challenge the user to increase a grip strength to further strengthen the muscles of the hand, forearm, or other gripping extremity.

In some embodiments, a balance board may be communicatively coupled to the control system. For example, the balance board may include a network interface that communicates with the control system via any suitable interface protocol (e.g., Bluetooth, WiFi, cellular). The balance board may include pressure sensors and may obtain measurements of locations and amount of pressure applied to the balance board. The measurements may be transmitted to the control system. The control system may present a game or interactive exercise on a user interface. The game or interactive exercise may modify screens or adjust graphics that are displayed based on the measurements received from the balance board. The balance board may be used by a user to perform any suitable type of plank (e.g., knee plank, regular feet and elbow plank, table plank with elbows, or the like). Accordingly, the balance board may be configured to be used with arms on the balance board, knees on the balance board, and/or feet standing on the balance board. The games or interactive exercises may encourage the user during the game or interactive exercises to increase compliance and neuro-motor control after a surgery, for example.

The exercise machine, balance board, wristband, goniometer, and/or any suitable accessory may be used for various reasons in various markets. For example, users may use the exercise machine, balance board, wristband, goniometer, and/or any suitable accessory in the orthopedic market if the users suffer from chronic musculoskeletal pain (e.g., knees, hips, shoulders, and back). The exercise machine, balance board, wristband, goniometer, and/or any suitable accessory may be used to help with prehabilitation (prehab), as well as optimize post-surgical outcomes. Users may use the exercise machine, balance board, wristband, goniometer, and/or any suitable accessory in the back and neck pain market if the users suffer with chronic back and neck pain and they want to avoid surgery and experience long-term relief, as well as users that are in recovery following surgery. Users may use the exercise machine, balance board, wristband, goniometer, and/or any suitable accessory in the cardiovascular market if they desire to prevent or recover from life-threatening cardiovascular disease, especially heart attacks and stroke. Users may use the exercise machine, balance board, wristband, goniometer, and/or any suitable accessory in the neurological market if they desire to recover from stroke, or have conditions like Parkinson's Disease and/or Multiple Sclerosis, and the users desire to achieve better balance, strength, and muscle symmetry in order to slow progression of the medical condition.

In the following description, details are set forth to facilitate an understanding of the present disclosure. In some instances, certain structures and techniques have not been described or shown in detail in order not to obscure the disclosure.

The following discussion is directed to various embodiments of the present disclosure. Although these embodiments are given as examples, the embodiments disclosed should not be interpreted, or otherwise used, as limiting the scope of the disclosure, including the claims. In addition, one of ordinary skill in the art will understand that the following description has broad application. The discussion of any embodiment is meant only to be exemplary of that embodiment. Thus, the discussion is not intended to intimate that the scope of the disclosure, including the claims, is limited to that embodiment.

Exercise machines can provide isometric exercises to facilitate osteogenesis and muscle hypertrophy. Such exercise machines can include equipment in which there are no moving parts while the user is performing an isometric exercise. While there may be some flexing: (i) under load, (ii) incidental movement resulting from the tolerances of interlocking parts, and (iii) parts that can move while a user performs adjustments on the exercise machines, these flexions and movements can comprise, without limitation, exercise machines capable of isometric exercise and rehabilitation. In addition, such exercise machines may also include equipment or devices including moving parts to provide dynamic exercises to facilitate osteogenesis and muscle hypertrophy. A dynamic exercise can be, but is not limited to, an exercise where a user participates in an activity where the user moves and some resistance or load is provided against the movement of the user.

For each exercise that is performed by the user on the exercise machine, the control system, of the exercise machine, may implement the exercise protocol. For each exercise, the exercise protocol may include the same sessions (e.g., configuration, warmup, resting, and/or exercise), or, for different exercises, the exercise protocol may include different sessions. One or more of the sessions may specify a target load threshold to be added, during the one more sessions, to a portion of the exercise machine. Further, a period of time for the user to continue to apply the force may also be specified by the one or more sessions.

The control system may determine the target load threshold based on the maximum force applied, to the one or more portions of the exercise machine, by the user during a previous exercise. In some embodiments, one or more target load thresholds may be determined (e.g., a left target load threshold for a left side of the body and a right target load threshold for a right side of the body). The control system may cause the target load threshold to be represented on a user interface while the user performs the exercise on the exercise machine.

The control system may receive one or more load measurements associated with forces exerted or loads applied by both the left and right sides on left and right portions (e.g., handles, foot plate or platform) of the exercise machine to enhance osteogenesis, bone growth, bone density improvement, and/or muscle mass. The one or more load measurements may be a left load measurement of a load added to a left load cell on a left portion of the exercise machine and a right load measurement of a load added to a right load cell on a right portion of the exercise machine. The user interface may be provided by the control system that presents visual representations of the separately measured left load and right load when the respective left load and right load are added to the respective left load cell and right load cell at the subject portions of the exercise machine.

The control system may compare the one or more load measurements (e.g., raw load measurements, or averaged load measurements) to the one or more target load thresholds. In some embodiments, a single load measurement may be compared to a single specific target load threshold (e.g., a one-to-one relationship). In some embodiments, a single load measurement may be compared to more than one specific target load threshold (e.g., a one-to-many relationship). In some embodiments, more than one load measurement may be compared to a single specific target load threshold (e.g., a many-to-one relationship). In some embodiments, more than one load measurement may be compared to more than one specific target load threshold (e.g., a many-to-many relationship).

The control system may determine whether the one or more load measurements exceed the one or more target load thresholds. Responsive to determining that the one or more load measurements exceed the one or more target load thresholds, the control system may cause a user interface to present an indication that the one or more target load thresholds have been exceeded and an exercise is complete.

FIG. 1 illustrates a high-level component diagram of an illustrative system architecture 10 according to certain embodiments of this disclosure. In some embodiments, the system architecture 10 may include a computing device 12 communicatively coupled to an exercise machine 100. The computing device 12 may also be communicatively coupled with a computing device 15 and a cloud-based computing system 16. As used herein, a cloud-based computing system refers, without limitation, to any remote or distal computing system accessed over a network link. Each of the computing device 12, computing device 15, and/or the exercise machine 100 may include one or more processing devices, memory devices, and network interface devices. In some embodiments, the computing device 12 may be included as part of the structure of the exercise machine 100. In some embodiments, the computing device 12 may be separate from the exercise machine 100. For example, the computing device 12 may be a smartphone, tablet, laptop, or the like.

The network interface devices may enable communication via a wireless protocol for transmitting data over short distances, such as Bluetooth, ZigBee, near field communication (NFC), etc. In some embodiments, the computing device 12 is communicatively coupled to the exercise machine 100 via Bluetooth. Additionally, the network interface devices may enable communicating data over long distances, and in one example, the computing device 12 may communicate with a network 20. Network 20 may be a public network (e.g., connected to the Internet via wired (Ethernet) or wireless (WiFi)), a private network (e.g., a local area network (LAN), wide area network (WAN), virtual private network (VPN)), or a combination thereof.

The computing device 12 may be any suitable computing device, such as a laptop, tablet, smartphone, or computer. The computing device 12 may include a display that is capable of presenting a user interface 18 of an application 17. The application 17 may be implemented in computer instructions stored on the one or more memory devices of the computing device 12 and executable by the one or more processing devices of the computing device 12. The application 17 may be a stand-alone application that is installed on the computing device 12 or may be an application (e.g., website) that executes via a web browser. The user interface 18 may present various screens to a user that enable the user to login, enter personal information (e.g., health information; age; gender; activity level; bone geometry; weight; height; patient measurements; etc.), view an exercise plan, initiate an exercise in the exercise plan, view visual representations of left load measurements and right load measurements that are received from left load cells and right load cells during the exercise, view a weight in pounds that are pushed, lifted, or pulled during the exercise, view target load thresholds that are based on a maximum force applied by the user in a previous exercise, view an indication when the user has exceeded the target load thresholds, present instructions for various sessions of the exercise protocol, and so forth, as described in more detail below. The computing device 12 may also include instructions stored on the one or more memory devices that, when executed by the one or more processing devices of the computing device 12, perform operations to control the exercise machine 100.

The computing device 15 may execute an application 21. The application 21 may be implemented in computer instructions stored on the one or more memory devices of the computing device 15 and executable by the one or more processing devices of the computing device 15. The application 21 may present a user interface 22 including various screens to a physician, trainer, or caregiver that enable the person to create an exercise plan for a user based on a treatment (e.g., surgery, medical procedure, etc.) the user underwent and/or injury (e.g., sprain, tear, fracture, etc.) the user suffered, view progress of the user throughout the exercise plan, and/or view measured properties (e.g., force exerted on portions of the exercise machine 100) of the user during exercises of the exercise plan. The exercise plan specific to a patient may be transmitted via the network 20 to the cloud-based computing system 16 for storage and/or to the computing device 12 so the patient may begin the exercise plan. The exercise plan may specify one or more exercises that are available at the exercise machine 100.

The exercise machine 100 may be an osteogenic, muscular strengthening, isometric exercise and/or rehabilitation assembly. Solid state, static, or isometric exercise and rehabilitation equipment (e.g., exercise machine 100) can be used to facilitate osteogenic exercises that are isometric in nature and/or to facilitate muscular strengthening exercises. Such exercise and rehabilitation equipment can include equipment in which there are no moving parts while the user is exercising. While there may be some flexing under load, incidental movement resulting from the tolerances of interlocking parts, and parts that can move while performing adjustments on the exercise and rehabilitation equipment, these flexions and movements can comprise, without limitation, exercise and rehabilitation equipment from the field of isometric exercise and rehabilitation equipment.

The exercise machine 100 may include various load cells 110 disposed at various portions of the exercise machine 100. For example, one or more left load cells 110 may be located at one or more left feet plates or platforms, and one or more right load cells may be located at one or more right feet plates or platforms. Also, one or more left load cells may be located at one or more left handles, and one or more right load cells may be located at one or more right handles. Each exercise in the exercise system may be associated with both a left and a right portion (e.g., handle or foot plate) of the exercise machine 100. For example, a leg-press-style exercise is associated with a left foot plate and a right foot plate. The left load cell at the left foot plate and the right load cell at the right foot plate may independently measure a load added onto the left foot plate and the right foot plate, respectively, and transmit the left load measurement and the right load measurement to the computing device 12. The load added onto the load cells 110 may represent an amount of weight added onto the load cells. In some embodiments, the load added onto the load cells 110 may represent an amount of force exerted by the user on the load cells. Accordingly, the left load measurement and the right load measurement may be used to present a left force (e.g., in Newtons) and a right force (e.g., in Newtons). The left force and right force may be totaled and converted into a total weight in pounds for the exercise. Each of the left force, the right force, and/or the total weight in pounds may be presented on the user interface 18.

In some embodiments, the cloud-based computing system 16 may include one or more servers 28 that form a distributed, grid, and/or peer-to-peer (P2P) computing architecture. Each of the servers 28 may include one or more processing devices, memory devices, data storage, and/or network interface devices. The servers 28 may be in communication with one another via any suitable communication protocol. The servers 28 may store profiles for each of the users that use the exercise device 100. The profiles may include information about the users such as one or more maximum forces applied by the user during each exercise that can be performed using the exercise machine 100, exercise plans, a historical performance (e.g., loads applied to the left load cell and right load cell, total weight in pounds, etc.) for each type of exercise that can be performed using the exercise machine 100, health, age, race, credentials for logging into the application 17, and so forth.

FIGS. 2-8 illustrates one or more embodiments of an osteogenic, isometric exercise and rehabilitation assembly. An aspect of the disclosure includes an isometric exercise and rehabilitation assembly 100. The assembly 100 can include a frame 102. The assembly can further include one or more pairs of load handles 104, 106, 108 (e.g., three shown) supported by the frame 102. Each load handle in one of the pairs of load handles 104, 106, 108 can be symmetrically spaced from each other relative to a vertical plane of the assembly 100. For example, the vertical plane can bisect the assembly 100 in a longitudinal direction.

During exercise, a user can grip and apply force to one of the pairs of load handles 104, 106, 108. The term "apply force" can include a single force, more than one force, a range of forces, etc. and may be used interchangeably with "addition of load". Each load handle in the pairs of load handles 104, 106, 108 can include at least one load cell 110 for separately and independently measuring a force applied to, or a load added onto, respective load handles. Further, each foot plate 118 (e.g., a left foot plate and a right foot plate) can include at least one load cell 110 for separately and independently measuring a force applied to, or a load added onto, respective foot plates.

The placement of a load cell 110 in each pair of load handles 104, 106, 108 and/or feet plates 118 can provide the ability to read variations in force applied between the left and right sides of the user. This allows a user or trainer to understand relative strength. This is also useful in understanding strength when recovering from an injury.

In some embodiments, the assembly further can include the computing device 12. One or more of the load cells 110 can be individually in electrical communication with the computing device 12 either via a wired or wireless connection. In some embodiments, the user interface 18 presented via a display of the computing device 12 may indicate how to perform an exercise, how much load is being added, a target load threshold to be exceeded, historical information for the user about how much load was added at prior sessions, comparisons to averages, etc., as well as additional information, recommendations, notifications, and/or indications described herein.

In some embodiments, the assembly further includes a seat 112 supported by the frame 102 in which a user sits while applying force to the load handles and/or feet plates. In some embodiments, the seat 112 can include a support such as a backboard 114. In some embodiments, the position of the seat 112 is adjustable in a horizontal and/or vertical dimension. In some embodiments, the angle of the seat 112 is adjustable. In some embodiments, the angle of the backboard 114 is adjustable. Examples of how adjustments to the seat 112 and backboard 112 can be implemented include, but are not limited to, using telescoping tubes and pins, hydraulic pistons, electric motors, etc. In some embodiments, the seat 112 can further include a fastening system 116 (FIG. 7), such as a seat belt, for securing the user to the seat 112.

In one example, the seat 112 can include a base 113 that is slidably mounted to a horizontal rail 111 of the frame 102. The seat 112 can be selectively repositionable and secured as indicated by the double-headed arrow. In another example, the seat 112 can include one or more supports 117 (e.g., two shown) that are slidably mounted to a substantially vertical rail 115 of the frame 102. The seat 112 can be selectively repositionable and secured as indicated by the double-headed arrow.

In some embodiments, a pair of feet plate 118 can be located angled toward and in front of the seat 112. The user can apply force to the feet plate 118 (FIG. 5) while sitting in the seat 112 during a leg-press-style exercise. The leg-press-style exercise can provide or enable osteogenesis, bone growth or bone density improvement for a portion of the skeletal system of the user. Further, the leg-press-style exercise can provide or enable muscular hypertrophy for one or more muscles of the user. In a leg-press-style exercise, the user can sit in the seat 112, place their feet on respective feet plates 118, and push on the pair of feet plate 118 using their legs.

In some embodiments, adjustments can be made to the position of the pair of feet plate 118. For example, these adjustments can include the height of the pair of feet plate 118, the distance between the pair of feet plate 118 and the seat 112, the distance between each handle of the pair of feet plate 118, the angle of the pair of feet plate 118 relative to the user, etc. In some embodiments, to account for natural differences in limb length or injuries, each foot plate of the pair of feet plate 118 can be adjusted separately.

In some embodiments, a first pair of load handles 104 can be located above and in front of the seat 112. The user can apply force to the load handles 104 (FIG. 7) while being constrained in the seat 112 by the fastening system 116 in a core-pull-style exercise. The core-pull-style exercise can provide or enable osteogenesis, bone growth or bone density improvement for a portion of the skeletal system of the user. Further, the core-pull-style exercise can provide or enable muscular hypertrophy for one or more muscles of the user. In a core-pull-style exercise, while the lower body of the user is restrained from upward movement by the fastening system 116, the user can sit in the seat 112, apply the fastening system 116, hold the first pair of load handles 104, and pull on the first pair of load handles 104 using their arms.

In some embodiments, adjustments can be made to the position of the first pair of load handles 104. For example, these adjustments can include the height of the first pair of load handles 104, the distance between the first pair of load handles 104 and the seat 112, the distance between each handle of the first pair of load handles 104, the angle of the first load handles 104 relative to the user, etc. In some embodiments, to account for natural differences in limb length or injuries, each handle of the first pair of load handles 104 can be adjusted separately.

In one example, the first pair of load handles 104 can include a sub-frame 103 that is slidably mounted to a vertical rail 105 of the frame 102. The first pair of load handles 104 can be selectively repositionable and secured as indicated by the double-headed arrow.

In some embodiments, a second pair of load handles 106 can be spaced apart from and in the front of the seat 112. While seated (FIG. 6), the user can apply force to the second pair of load handles 106 in a chest-press-style exercise. The chest-press-style exercise can provide or enable osteogenesis, bone growth or bone density improvement for another portion of the skeletal system of the user. Further, the chest-press-style exercise can provide or enable muscular hypertrophy for one or more muscles of the user. In a chest-press-style exercise, the user can sit in the seat 112, hold the second pair of load handles 106, and push against the second pair of load handles 106 with their arms.

In some embodiments, adjustments can be made to the position of the second pair of load handles 106. These adjustments can include the height of the second pair of load handles 106, the distance between the second pair of load handles 106 and the seat 112, the distance between each handle of the second pair of load handles 106, the angle of the second load handles 106 relative to the user, etc. In some embodiments, to account for natural differences in limb length or injuries, each handle of the second pair of load handles 106 can be adjusted separately.

In one example, the second pair of load handles 106 can include the sub-frame 103 that is slidably mounted to the vertical rail 105 of the frame 102. The sub-frame 103 can be the same sub-frame 103 provided for the first pair of load handles 104, or a different, independent sub-frame. The second pair of load handles 106 can be selectively repositionable and secured as indicated by the double-headed arrow.

In some embodiments (FIG. 8), a third pair of load handles 108 can be located immediately adjacent the seat 112, such that the user can stand and apply force in a suitcase-lift-style exercise. The suitcase-lift-style exercise can provide or enable osteogenesis, bone growth or bone density improvement for still another portion of the skeletal system of the user. Further, the suitcase-lift-style exercise can provide or enable muscular hypertrophy for one or more muscles of the user. Examples of the third pair of load handles 108 can extend horizontally along a pair of respective axes that are parallel to the vertical plane. The third pair of load handles 108 can be horizontally co-planar, such that a user can apply force to them in a suitcase-lift-style exercise. In the suitcase-lift-style exercise, the user can stand on the floor or a horizontal portion of the frame 102, bend their knees, grip the third pair of load handles 108, and extend their legs to apply an upward force to the third pair of load handles 108.

In some embodiments, adjustments can be made to the position of the third pair of load handles 108. These adjustments can include the height of the third pair of load handles 108, the distance between the third pair of load handles 108 and the seat 112, the distance between each handle of the third pair of load handles 108, the angle of the third load handles 108 relative to the user, etc. In some embodiments, to account for natural differences in limb length or injuries, each handle of the third pair of load handles 108 can be adjusted separately.

In one example, each load handle 108 of the third pair of load handles 108 can include a sub-frame 109 that is slidably mounted in or to a vertical tube 107 of the frame 102. Each load handle 108 of the third pair of load handles 108 can be selectively repositionable and secured as indicated by the double-headed arrows.

In other embodiments (not shown), the third pair of load handles 108 can be reconfigured to be coaxial and located horizontally in front of the user along an axis that is perpendicular to the vertical plane. The user can apply force to the third pair of load handles 108 in a deadlift-style exercise. Like the suitcase-lift-style exercise, the deadlift-style exercise can provide or enable osteogenesis, bone growth or bone density improvement for a portion of the skeletal system of the user. Further, the deadlift-style exercise can provide or enable muscular hypertrophy for one or more muscles of the user. In the deadlift-style exercise, the user can stand on the floor or a horizontal portion of the frame 102, bend their knees, hold the third pair of load handles 108 in front of them, and extend their legs to apply an upward force to the third pair of load handles 108. In some embodiments, the third pair of load handles 108 can be adjusted (e.g., rotated) from the described coaxial position used for the deadlift-style exercise, to the parallel position (FIGS. 7, 8) used for the suitcase lift-style exercise. The third pair of load handles 108, or others, can be used in a grip strengthening-style exercise to improve strength in the muscles of the hand and forearm.

Figure 9:
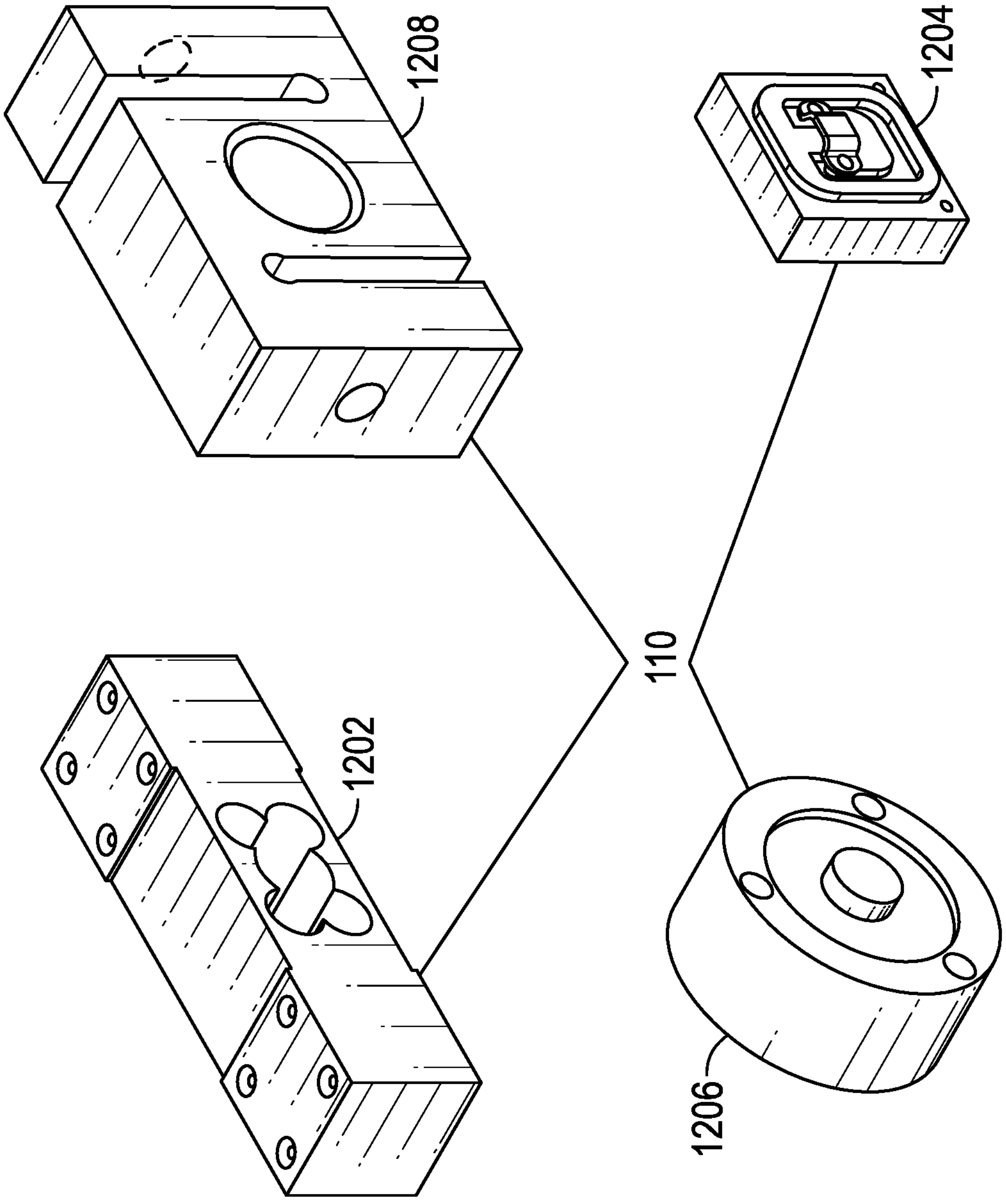
FIG. 9 illustrates four examples of load cells that can be used in the isometric exercise assembly.

FIG. 9 depicts several options for the load cells 110. In some embodiments, the load cells 110 can be piezoelectric load cells, such as PACEline CLP Piezoelectric Subminiature Load Washers. In other embodiments, the load cells 110 can be hydraulic load cells, such as NOSHOK hydraulic load cells. In some versions, the load cells 110 can include strain gauges. Embodiments of the strain gauges can be bending-type strain gauges, such as Omega SGN-4/20-PN 4 mm grid, 20 ohm nickel foil resistors. Other examples of the strain gauges can be double-bending-type strain gauges 1202, such as Rudera Sensor RSL 642 strain gauges. Still other embodiments of the strain gauges can be half-bridge-type strain gauges 1204, such as Onyehn 4pcs 50 kg Human Scale Load Cell Resistance Half-bridge/Amplifier Strain Weight Sensors with 1pcs HX711 AD Weight Modules for Arduino DIY Electronic Scale strain gauges. In some embodiments, the strain gauges can be S-type strain gauges 1206, such as SENSORTRONICS S-TYPE LOAD CELL 60001 strain gauges. Additionally, the strain gauges can be button-type strain gauges 1208, such as Omega LCGB-250 250 lb Capacity Load Cells. Naturally, the load cells 110 can comprise combinations of these various examples. The embodiments described herein are not limited to these examples.

Figure 10:
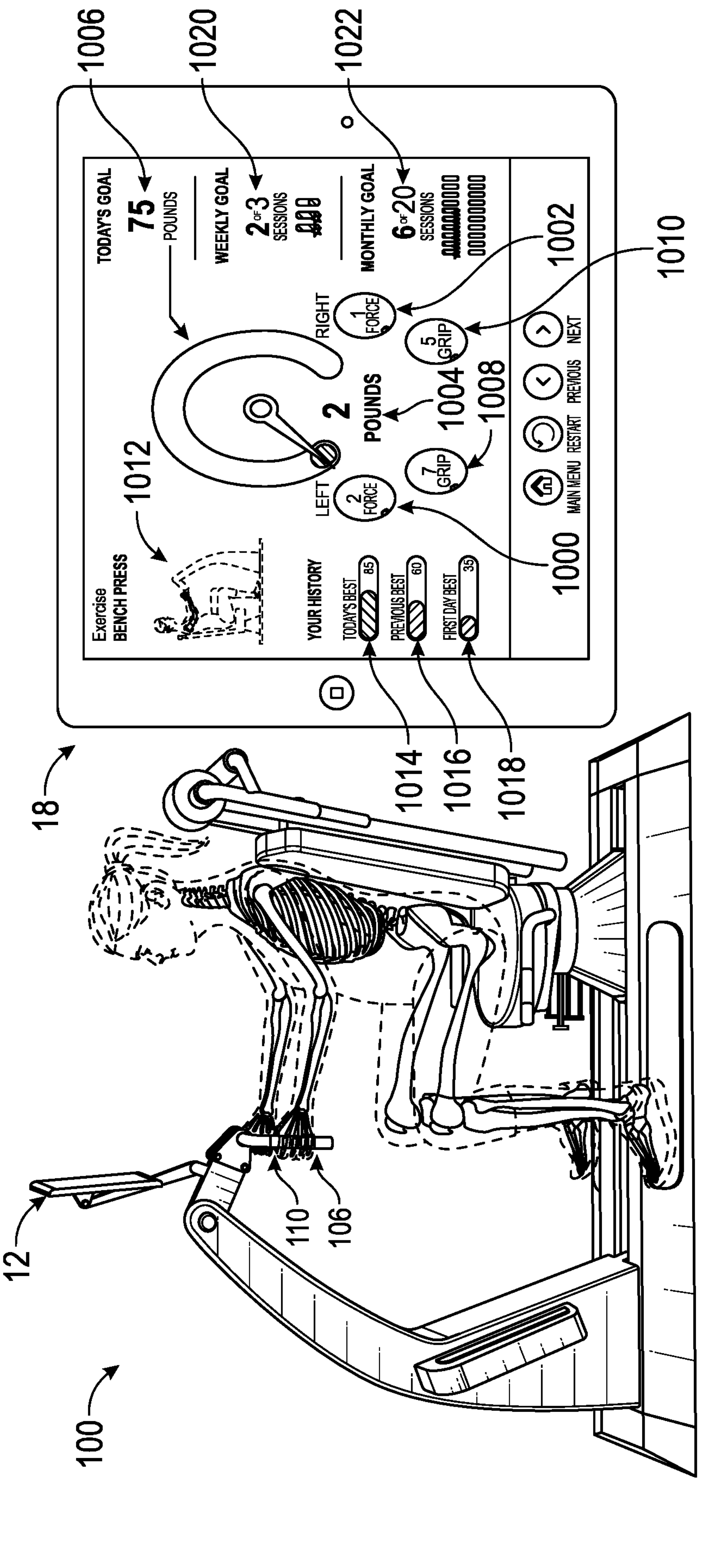
FIG. 10 illustrates a side view of a second embodiment of the isometric exercise and rehabilitation assembly with the user performing a chest-press-style exercise and a user interface presenting information to the user.

FIG. 10-13 illustrate views of a second embodiment of the isometric exercise and rehabilitation assembly 100. FIG. 10 illustrates a side view of the second embodiment of the isometric exercise and rehabilitation assembly 100 with the user performing a chest-press-style exercise and a user interface 18 presenting information to the user. As depicted, the user is the gripping second pair of load handles 106. A left load cell 110 and a right load cell 110 may be located at a left load handle 106 and a right load handle 106, respectively, in the second pair of load handles 106. The user may push on the second pair of load handles 106 to add load to the left load cell 110 and the right load cell 110. The left load cell 110 may transmit a left load measurement to the computing device 102, and the right load cell 110 may transmit a right load measurement to the computing device 102. The computing device 102 may use the load measurements to provide various real-time feedback on the user interface 18 as the user performs the chest-press-style exercise.

In general, the user interface 18 may present real-time visual feedback of the current load measurements or the current forces corresponding to the load measurements, a weight in pounds associated with the load measurements, target load thresholds, and indications when the target load thresholds are exceeded. The control system may provide various visual, audio, and/or haptic feedback when the user exceeds their target load thresholds.

As depicted, the user interface 18 presents a left load measurement 1000 as a left force and a right load measurement 1002 as a right force in real-time or near real-time as the user is pressing on the second pair of handles 106. The values of the forces for the left load measurement 1000 and the right load measurement 1002 are presented. There are separate visual representations for the left load measurement 1000 and the right load measurement 1002. In some embodiments, these load measurements 1000 and 1002 may be represented in a bar chart, line chart, graph, or any suitable visual representation. In some embodiments, a left target load threshold and a right target load threshold for the user may be presented on the user interface 18. In some embodiments, the left and right target load thresholds may be different. For example, if the user fractured their left arm and is rehabilitating the left arm, but the user's right arm is healthy, the left target load threshold may be different from the right target load threshold.

If the left load measurement 1000 exceeds the left target load threshold, an indication (e.g., starburst) may be presented on the user interface 18 indicating that the left target load threshold has been exceeded and/or osteogenesis has been triggered in one or more portions of the body. If the right load measurement 1002 exceeds the right target load threshold, an indication (e.g., starburst) may be presented on the user interface 18 indicating that the right target load threshold has been exceeded and/or osteogenesis has been triggered in another portion of the body. Further, if either or both of the left and right target load thresholds are exceeded, the indication may indicate that the exercise is complete and a congratulatory message may be presented on the user interface 18.

In some embodiments, there may be a single target load threshold to which both the left load measurement and the right load measurement are compared. For example, the target load threshold may be a maximum force applied, as detected, at the portions during a previous exercise, by the load cells 110. If either of the left or right load measurement exceed the single target load threshold, the above-described indication may be presented on the user interface 18.

In some embodiments, more than one target load threshold may be used. For example, a left target load threshold may be a maximum force applied, as detected, at the left portion during a previous exercise, by the load cells 110. A right target load threshold may be a maximum force applied, as detected, at the right portion during a previous exercise, by the load cells 110. If either of the left or right load measurement exceed the left or right target load threshold, respectively, the above-described indication may be presented on the user interface 18.

Further, a total weight 1004 in pounds that is determined based on the left and right load measurements is presented on the user interface 18. The total weight 1004 may dynamically change as the user adds load onto the load cells 110. A target weight 1006 for the exercise for the current day is also presented. This target weight 1006 may be determined based on the user's historical performance for the exercise. If the total weight 1004 exceeds the target weight 1006, an indication (e.g., starburst) may be presented on the user interface 18 indicating that osteogenesis and/or muscular hypertrophy has been triggered. Further, the indication may indicate that the exercise is complete and a congratulatory message may be presented on the user interface 18. In some embodiments, another message may be presented on the user interface 18 that encourages the user to continue adding load to set a new personal maximum record for the exercise.

Additionally, the user interface 18 may present a left grip strength 1008 and a right grip strength 1010. In some embodiments, the left grip strength 1008 and the right grip strength 1010 may be determined based on the left load measurement and the right load measurement, respectively. Numerical values representing the left grip strength 1008 and the right grip strength 1010 are displayed. Any suitable visual representation may be used to present the grip strengths (e.g., bar chart, line chart, etc.). The grip strengths may only be presented when the user is performing an exercise using handles.

The user interface 18 may also present a prompt 1012 that indicates the body position the user should be in to perform the exercise, as well as indicate which body portions will be targeted by performing the exercise. The user interface 18 may present other current and historical information related to the user performing the particular exercise. For example, the user interface 18 may present a visual representation 1014 of the user's maximum weight lifted, pressed, pulled, or otherwise exerted force for the day or a current exercise session. The user interface 18 may present a visual representation 1016 of the user's previous maximum weight lifted, pressed, pulled, or otherwise exerted force. The user interface 18 may present a visual representation 1018 of the user's maximum weight lifted, pressed, pulled, or otherwise exerted force the first time the user performed the exercise. The user interface 18 may present one or more visual representations 1020 for a weekly goal including how many sessions should be performed in the week and progress of the sessions as they are being performed. The user interface 18 may present a monthly goal including how many sessions should be performed in the month and progress of the sessions as they are being performed. Additional information and/or indications (e.g., incentivizing messages, recommendations, warnings, congratulatory messages, etc.) may be presented on the user interface 18, as discussed further below.

Figure 11:
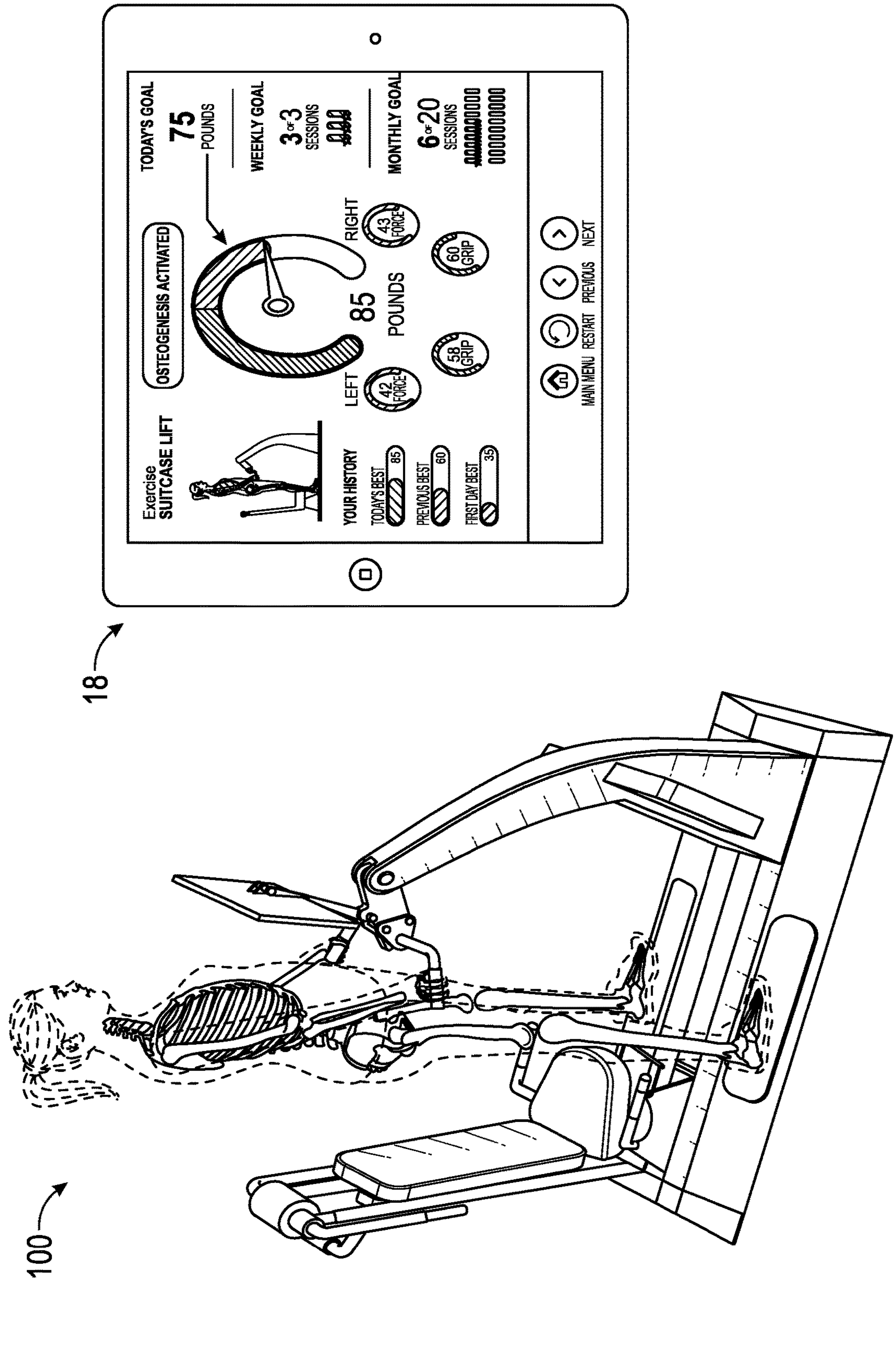
FIG. 11 illustrates a side view of the second embodiment of the isometric exercise and rehabilitation assembly with a user performing a suitcase-lift-style exercise and a user interface presenting information to the user.

FIG. 11 illustrates a side view of the second embodiment of the isometric exercise and rehabilitation assembly 100 with a user performing a suitcase-lift-style exercise and the user interface 18 presenting information to the user. The user interface 18 may present similar types of information as discussed above with regards to FIG. 10, but the information on the user interface 18 in FIG. 11 may be tailored for the suit-case-lift-style exercise.

Figure 12:
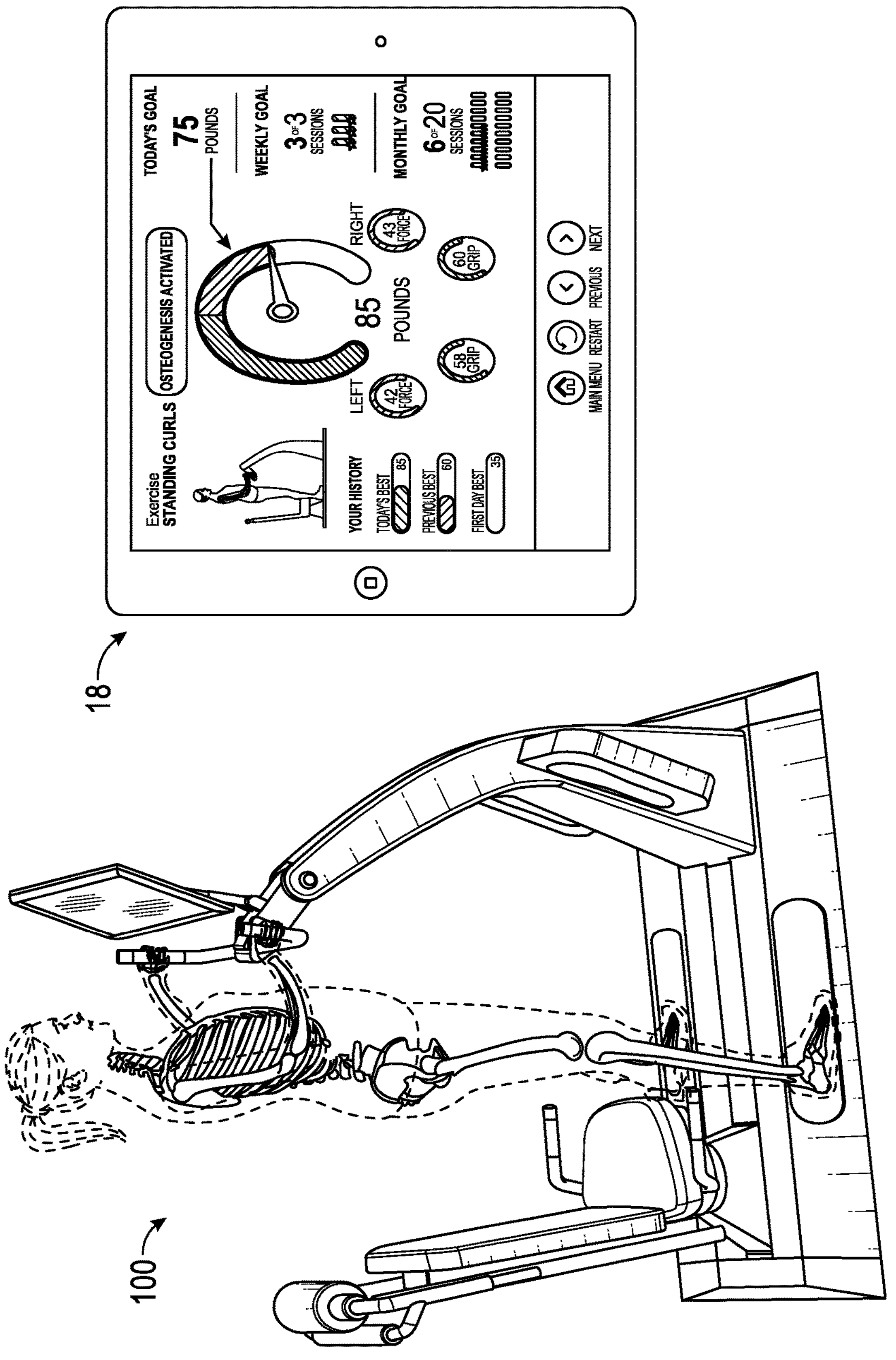
FIG. 12 illustrates a side view of the second embodiment of the isometric exercise and rehabilitation assembly with a user performing an arm-curl-style exercise and a user interface presenting information to the user.

FIG. 12 illustrates a side view of the second embodiment of the isometric exercise and rehabilitation assembly 100 with a user performing an arm-curl-style exercise and a user interface presenting information to the user. The user interface 18 may present similar types information as discussed above with regards to FIG. 10, but the information on the user interface 18 in FIG. 12 may be tailored for the arm-curl-style exercise.

Figure 13:
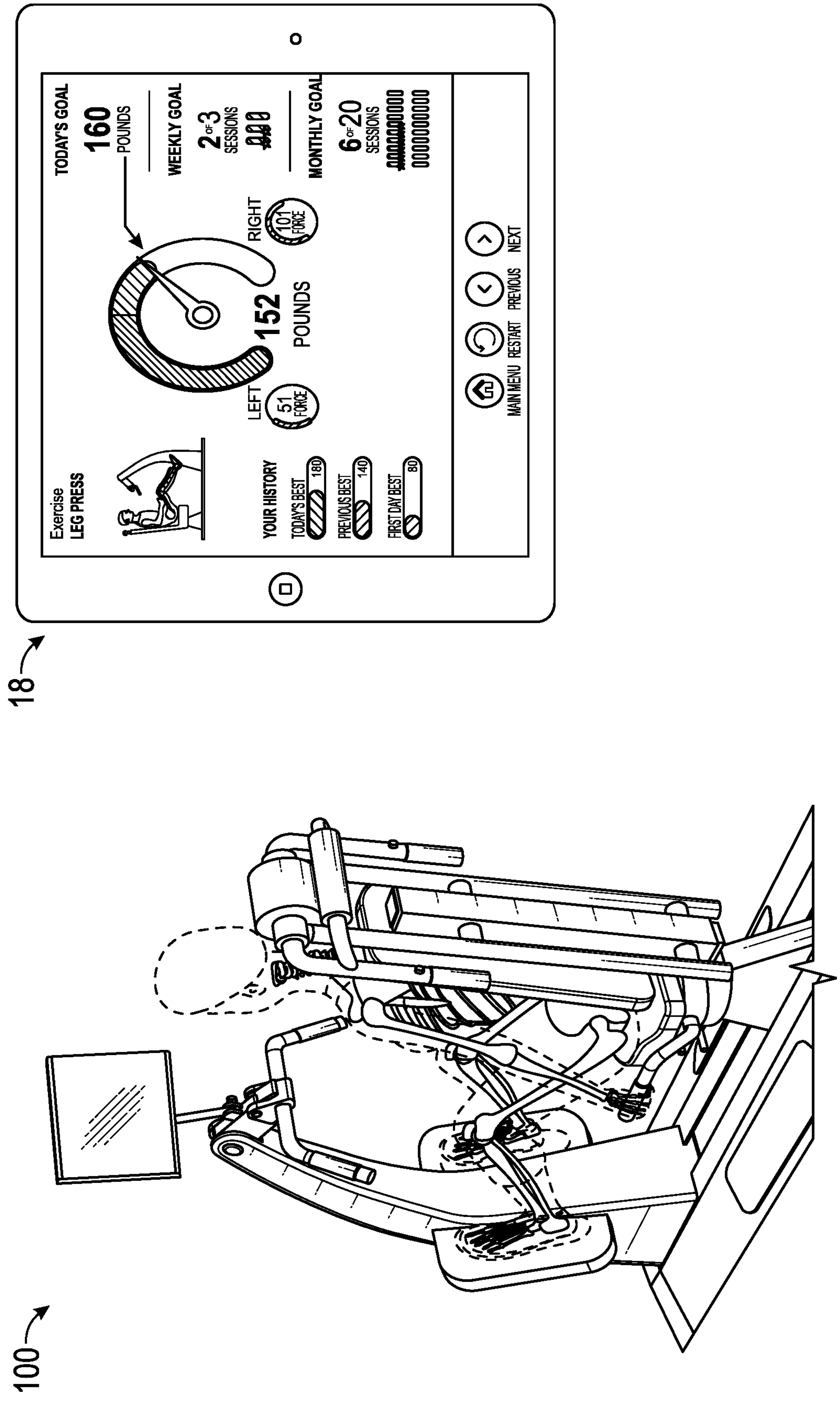
FIG. 13 illustrates a side view of the second embodiment of the isometric exercise and rehabilitation assembly with a user performing a leg-press-style exercise and a user interface presenting information to the user.

FIG. 13 illustrates a side view of the second embodiment of the isometric exercise and rehabilitation assembly 100 with a user performing a leg-press-style exercise and a user interface presenting information to the user. The user interface 18 may present similar types information as discussed above with regards to FIG. 10, but the information on the user interface 18 in FIG. 13 may be tailored for the leg-press-style exercise.

Figure 14:
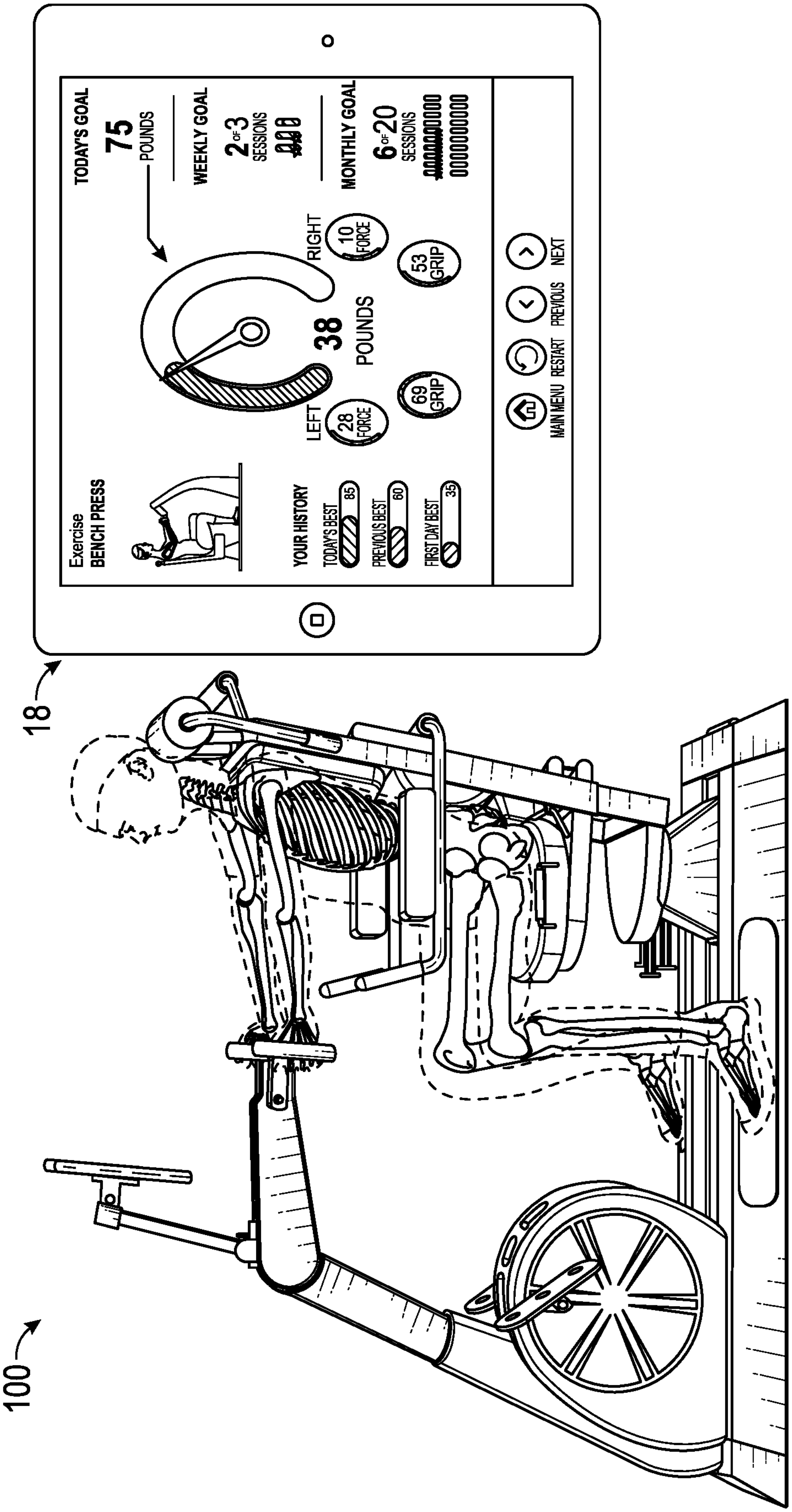
FIG. 14 illustrates a side view of a third embodiment of the isometric exercise and rehabilitation assembly with the user performing a chest-press-style exercise and a user interface presenting information to the user.

FIGS. 14-18 illustrate views of a third embodiment of the isometric exercise and rehabilitation assembly 100. FIG. 14 illustrates a side view of the third embodiment of the isometric exercise and rehabilitation assembly 100 with the user performing a chest-press-style exercise and a user interface 18 presenting information to the user. The user interface 18 in FIG. 14 may present similar types of information as discussed above with regards to FIG. 10.

Figure 15:
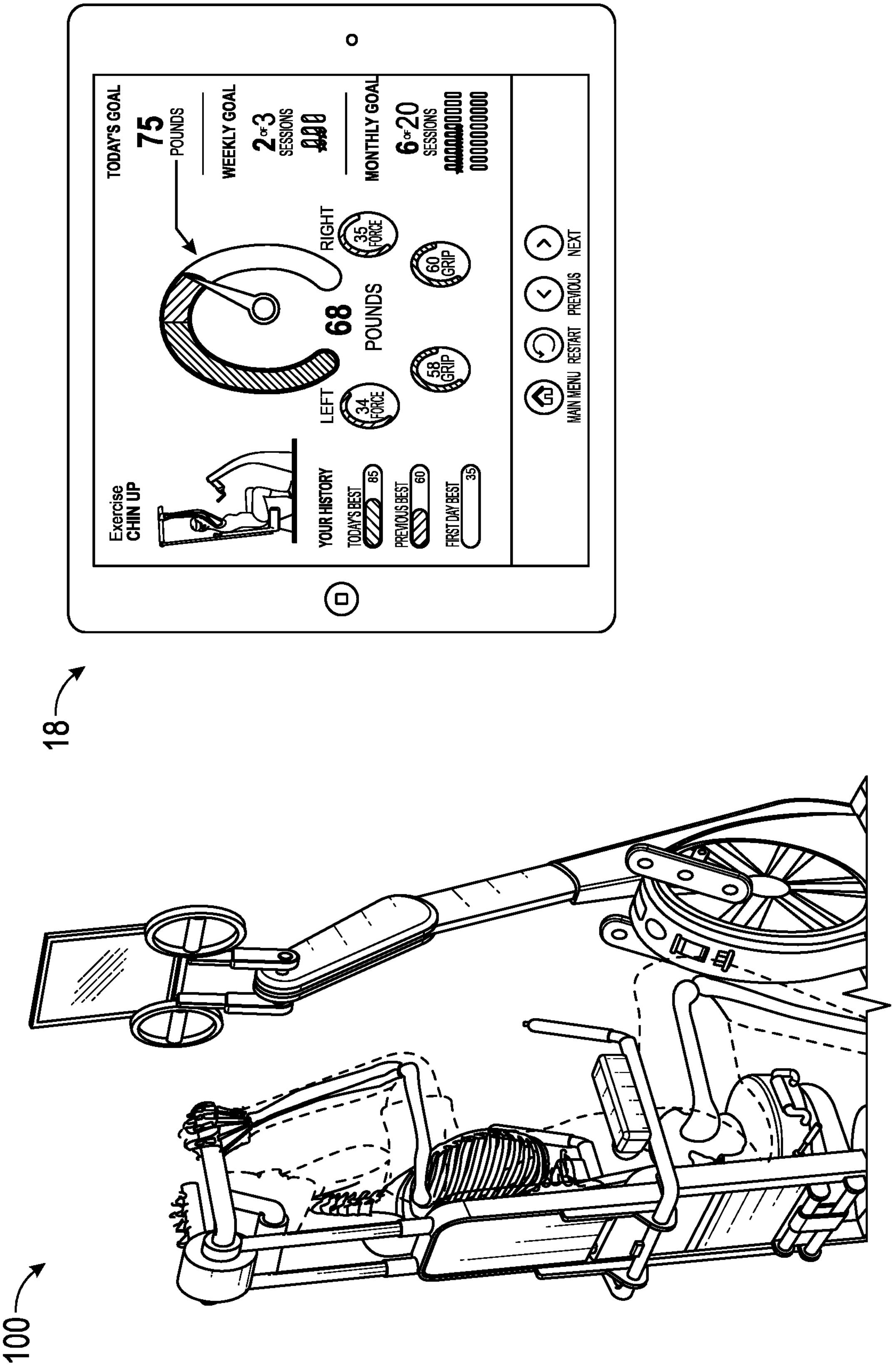
FIG. 15 illustrates a side view of the third embodiment of the isometric exercise and rehabilitation assembly with the user performing a pull-down-style exercise and a user interface presenting information to the user.

FIG. 15 illustrates a side view of the third embodiment of the isometric exercise and rehabilitation assembly 100 with the user performing a pull-down-style exercise and a user interface 18 presenting information to the user. The user interface 18 may present similar types of information as discussed above with regards to FIG. 10, but the information on the user interface 18 in FIG. 15 may be tailored for the pull-down-style exercise.

Figure 16:
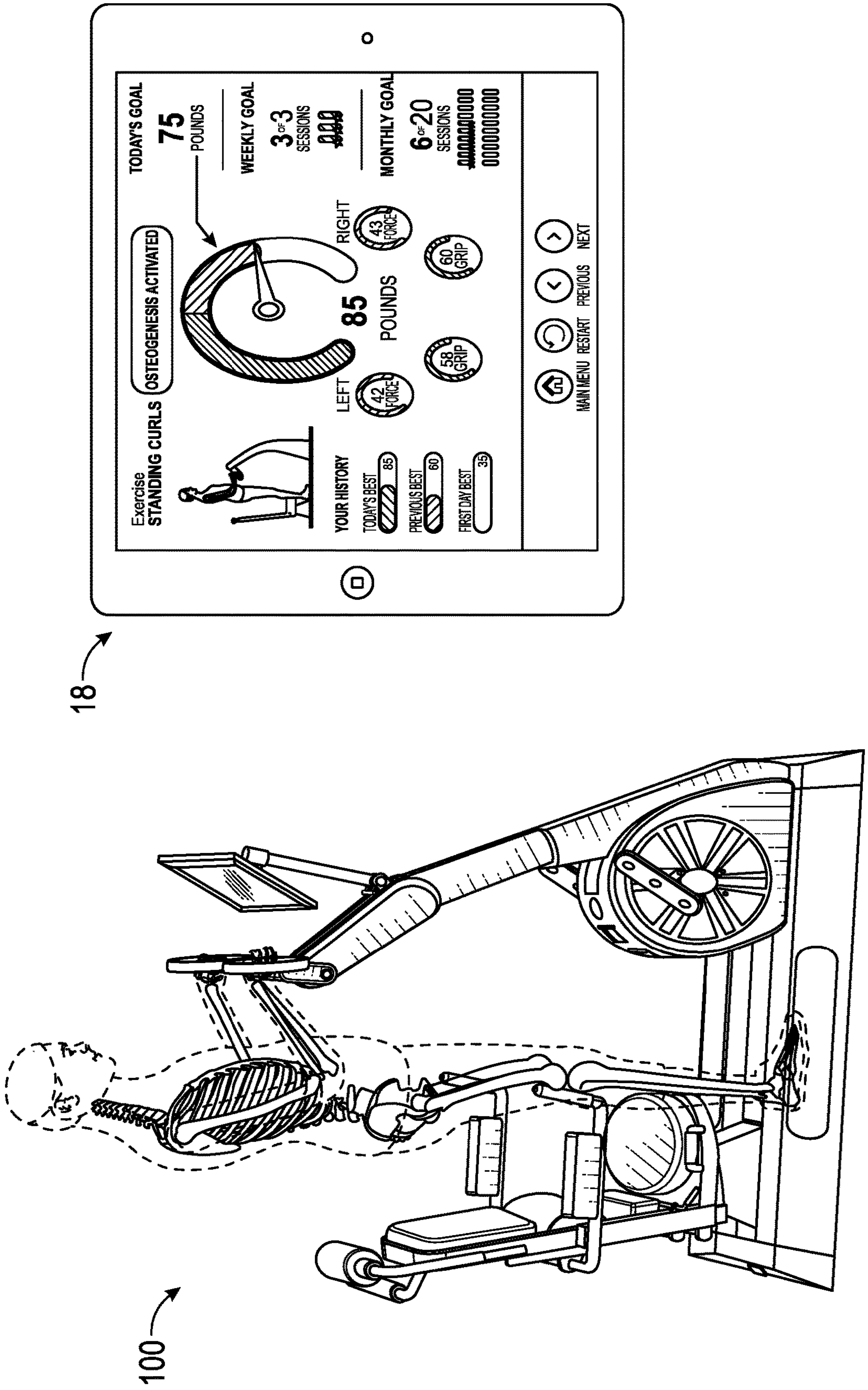
FIG. 16 illustrates a side view of the third embodiment of the isometric exercise and rehabilitation assembly with a user performing an arm-curl-style exercise and a user interface presenting information to the user.

FIG. 16 illustrates a side view of the third embodiment of the isometric exercise and rehabilitation assembly with a user performing an arm-curl-style exercise and a user interface 18 presenting information to the user. The user interface 18 may present similar types of information as discussed above with regards to FIG. 12.

Figure 17:
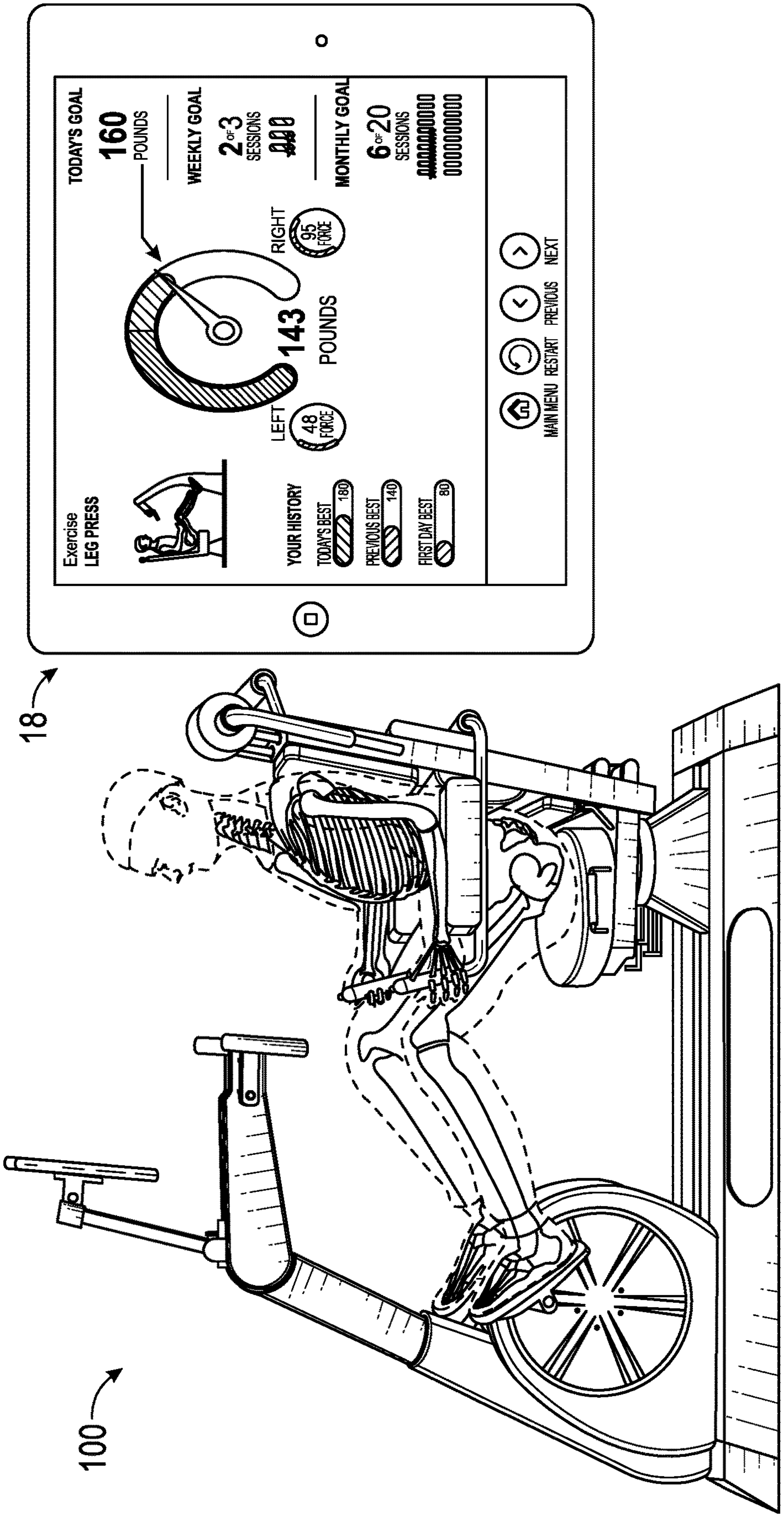
FIG. 17 illustrates a side view of the third embodiment of the isometric exercise and rehabilitation assembly with a user performing a leg-press-style exercise and a user interface presenting information to the user.

FIG. 17 illustrates a side view of the third embodiment of the isometric exercise and rehabilitation assembly 100 with a user performing a leg-press-style exercise and a user interface 18 presenting information to the user. The user interface 18 may present similar types of information as discussed above with regards to FIG. 13.

Figure 18:
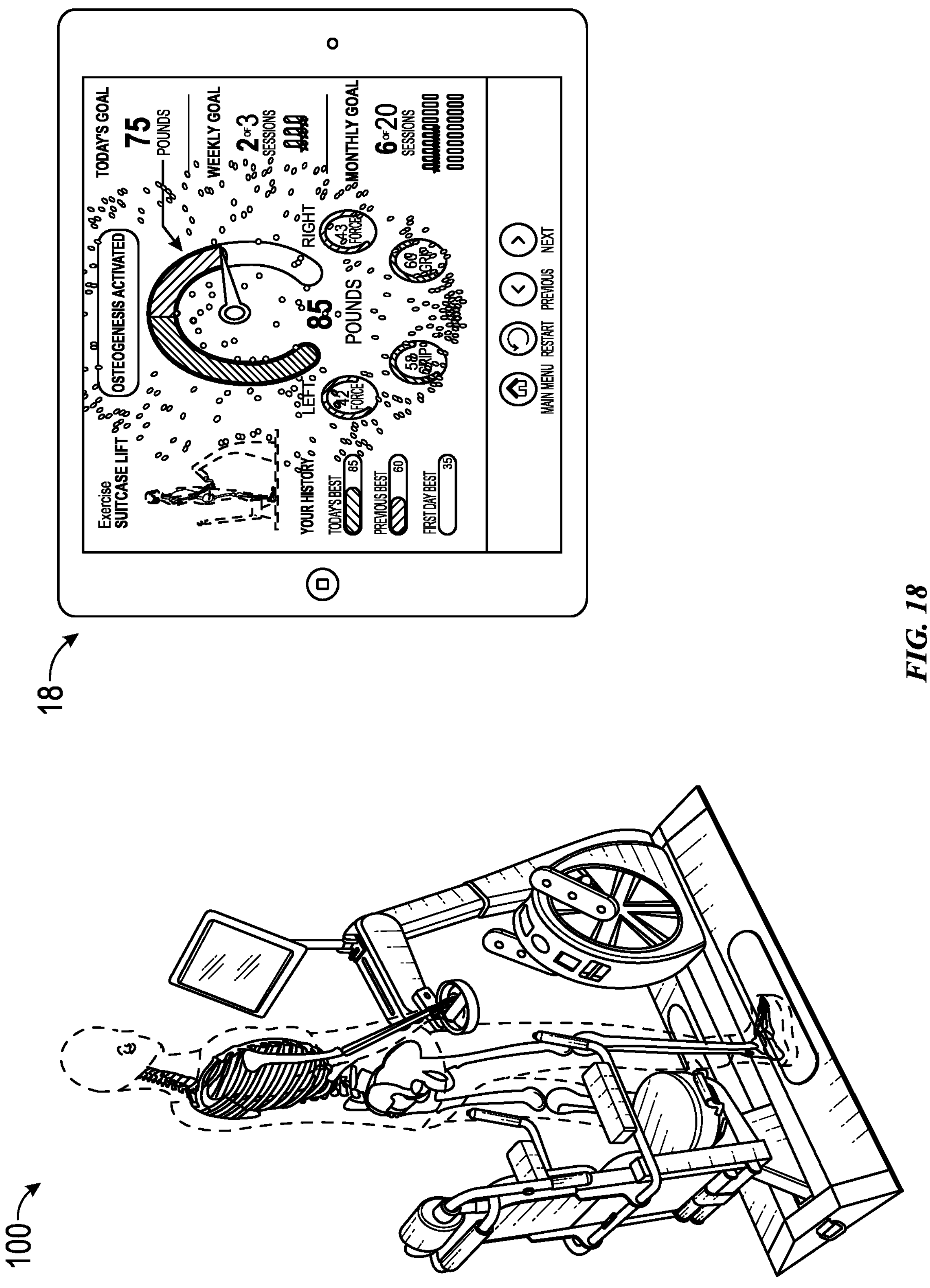
FIG. 18 illustrates a side view of the third embodiment of the isometric exercise and rehabilitation assembly with a user performing a suitcase-lift-style exercise and a user interface presenting information to the user.

FIG. 18 illustrates a side view of the third embodiment of the isometric exercise and rehabilitation assembly 100 with a user performing a suitcase-lift-style exercise and a user interface 18 presenting information to the user. The user interface 18 may present similar types of information as discussed above with regards to FIG. 11.

Figure 19:
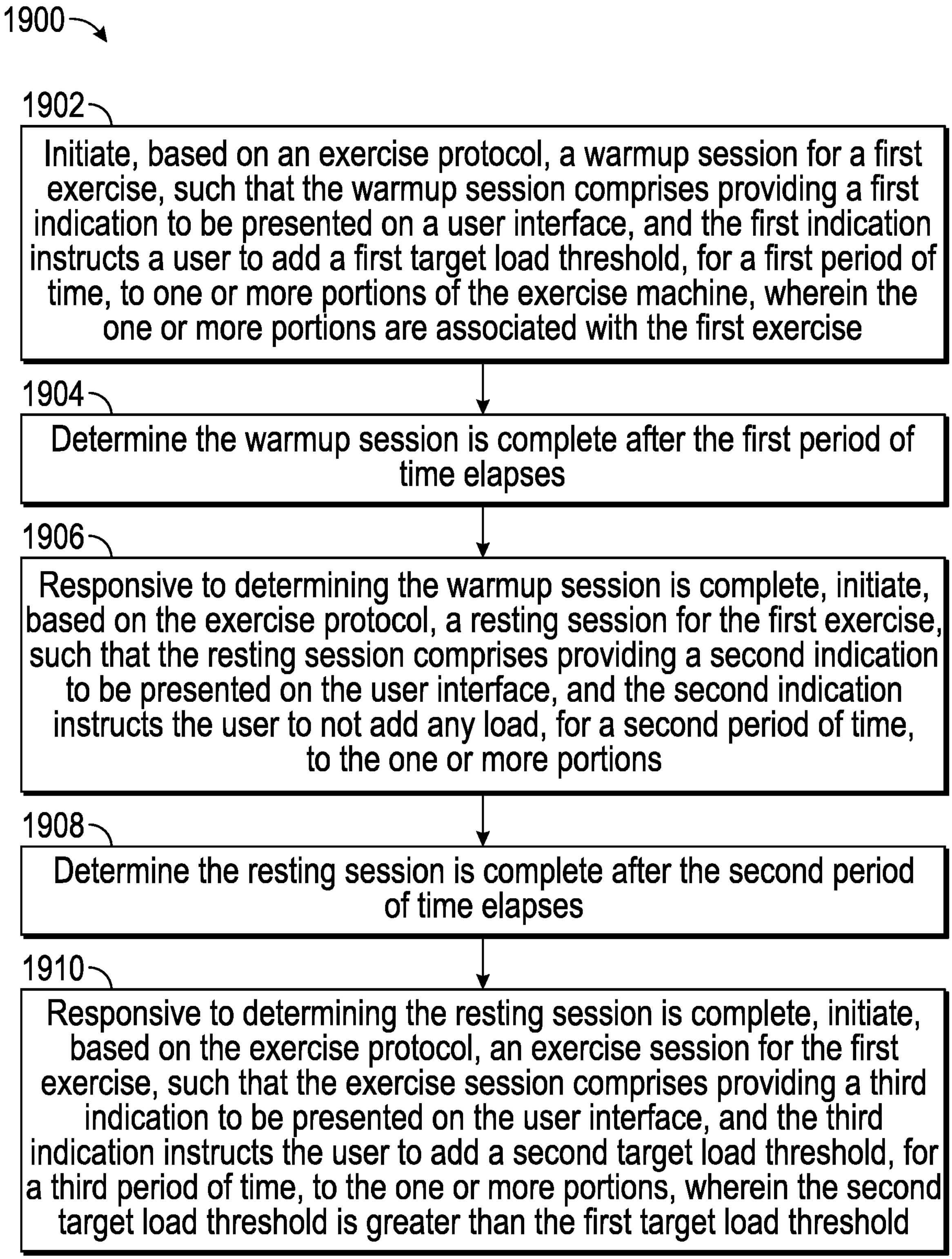
FIG. 19 illustrates example operations of a method for implementing an exercise protocol for osteogenesis and/or muscular hypertrophy.

FIG. 19 illustrates example operations of a method 1900 for implementing an exercise protocol for osteogenesis and/or muscular hypertrophy. The method 1900 may be performed by processing logic that may include hardware (circuitry, dedicated logic, etc.), firmware, software, or any combination of them. The method 1900 and/or each of their individual functions, subroutines, or operations may be performed by one or more processing devices of a control system (e.g., computing device 12 of FIG. 1) implementing the method 1900. The method 1900 may be implemented as computer instructions executable by a processing device of the control system. In certain implementations, the method 1900 may be performed by a single processing thread. Alternatively, the method 1900 may be performed by two or more processing threads, each thread implementing one or more individual functions, routines, METHODS (as capitalized and used in this instance in this list refers to the meaning of the term as used in object-oriented programming and computer science), subroutines, or operations of the METHODS. Various operations of the method 1900 may be performed by one or more of the cloud-based computing system 16, and/or the computing device 15 of FIG. 1.

In some embodiments, the processing device may determine, prior to initiating 1902 the warmup session of the exercise protocol, whether the exercise machine 100 has been properly adjusted to accommodate the user during the first exercise. This determination may be made during a configuration session for the exercise protocol. The processing device may use information pertaining to the user, such as height, weight, age, gender, etc. to determine, for the user, the proper adjustments to and/or positions of components associated with the first exercise. The processing device may present instructions on the user interface 18, where the instructions instruct the user to adjust the portions to the proper positions. The processing device may receive input from the user indicating that the portions have been adjusted and/or positioned as instructed.

In some embodiments, proper techniques for performing the first exercise may be used to determine the adjustments to and/or positions of the portions associated with the first exercise. For example, for a leg-press-style exercise, a technique may specify that the user sit in the chair and place their feet against feet plates with 30 degrees of knee flexion. Using the information of the user, the processing device may determine the adjustments to and/or positions of the feet plates, the seat, etc. to enable the 30 degrees of knee flexion.

At 1902, the processing device may initiate, based on the exercise protocol, a warmup session for a first exercise (e.g., chest press, leg press, arm curl, suitcase lift, or core pull). The first exercise may cause osteogenesis and/or muscular hypertrophy. The exercise protocol may be retrieved from a memory device of the computing device 12, received from the computing device 15, or received from the cloud-based computing system 16. The warmup session may include providing an indication to be presented on the user interface 18. The indication may, for a first period of time (e.g., 1-10 seconds), instruct the user to add to one or more portions of the exercise machine 100 a first target load threshold. The first period of time and the first target load threshold may be presented on the user interface 18. In one example, the first period of time may be 5 seconds. The one or more portions may be associated with the first exercise. In some embodiments, the first target load threshold may be a percentage (e.g., 30-70 percent) of a maximum force applied by the user when previously performing the first exercise.

If it is the first time the user is performing the first exercise, and the corresponding maximum force has not been stored for the user, the first indication may instruct the user to apply, to the one or more portions, a percentage of a maximum perceived force the user is capable of adding. That is, the maximum perceived force may be specified when there is no maximum force stored for the user. If it is not the first time the user is performing the first exercise, the indication may instruct the user to apply a percentage of the maximum force stored when the user previously performed the first exercise. In one example, for the warmup session, the percentage of the maximum force or the maximum perceived force may be 50 percent.

At 1904, after the first period of time elapses, the processing device may determine the warmup session is complete. At 1906, responsive to determining the warmup session is complete, the processing device may initiate a resting session for the first exercise. The resting session may be initiated based on the exercise protocol for the first exercise. The resting session may include providing an indication to be presented on the user interface 18. The indication may, for a second period of time (e.g., 20-60 seconds), instruct the user to not add to the one or more portions of the exercise machine 100 any load. In one example, the second period of time may be 30 seconds.

In some embodiments, the processing device may receive, during the resting session, one or more load measurements from one or more load cells 110 at the one or more portions associated with the first exercise. The processing device may provide an indication to be presented on the user interface 18. The indication may instruct the user to stop adding, at the one or more portions, loads to the one or more load cells 110.

At 1908, after the second period of time elapses, the processing device may determine the resting session is complete. At 1910, responsive to determining the resting session is complete, the processing device may initiate an exercise session for the first exercise. The exercise session may be initiated based on the exercise protocol for the first exercise. The exercise session may include providing an indication to be presented on the user interface. The indication may, for a third period of time (e.g., 1-10 seconds), instruct the user to add to the one or more portions a second target load threshold. The third period of time and the second target load threshold may be presented on the user interface 18. In one example, the third period of time may be 5 seconds. The second target load threshold may be greater than the first target load threshold. In some embodiments, the second target load threshold may be a percentage (e.g., 60-100 percent) of a maximum force applied by the user when previously performing the first exercise.

If it is the first time the user is performing the first exercise, and there is no maximum force recorded for the user, the indication may instruct the user to apply, to the one or more portions, a percentage of a maximum perceived force the user is capable of adding. If it is not the first time the user is performing the first exercise, the indication may instruct the user to apply a percentage of the maximum force stored when the user previously performed the first exercise. In one example, the percentage of the maximum force or the maximum perceived force may be 100 percent for the exercise session. That is, the indication may instruct and encourage the user to attempt to exceed for the exercise their previously stored maximum force.

During the exercise session, the processing device may receive one or more load measurements from the one or more load cells 110 located at the one or more portions associated with the first exercise. If it is the first time the user is performing the first exercise, the one or more load measurements (e.g., a right load measurement and/or a left load measurement) may be stored as the maximum forces for the user for the first exercise. For example, in some embodiments, the processing device may determine, during the exercise session, whether the one or more load measurements stopped increasing for a threshold period of time. Responsive to determining the one or more load measurements stopped increasing for the threshold period of time, the processing device may store the one or more load measurements as one or more maximum forces for the user for the first exercise. The one or more maximum forces may be used for the first exercise in a subsequent exercise session.

In some embodiments, if the user performs the first exercise again, the processing device may receive, during the exercise session, a load measurement from a load cell 110 at one of the one or more portions associated with the first exercise. The processing device may compare the load measurement to a third target load threshold in order to perform one of the following operations: (i) responsive to determining the load measurement is less than the third target load threshold, provide an indication to be presented on the user interface 18, where the indication specifies adding an additional load to the one of the one or more portions, and the additional load is needed to exceed the second target load threshold; or (ii) responsive to determining the load measurement exceeds the third target load threshold, provide an indication to be presented on the user interface 18, where the indication specifies the third target load threshold has been exceeded. In some embodiments, the third target load threshold may be a percentage (e.g., 30-80 percent) of a maximum force stored for the user for the first exercise. The percentage of the third target load threshold may be between the percentage of the first target load threshold and the percentage of the second target load threshold. In some embodiments, the percentage for the third target load threshold is 75 percent.

Further, based on the one or more load measurements, the processing device may determine whether the second target load threshold is exceeded. In some embodiments, the second target load threshold may be a percentage (e.g., 100 percent) of the maximum force stored for the user when the user previously performed the first exercise. That is, the second target load threshold may represent the maximum force stored for the user. If the second target load threshold has not been exceeded, the processing device may provide an indication to be presented on the user interface 18, where the indication encourages the user to add, during the exercise session, at least one additional load to at least one of the one of the one or more portions, such that the user achieves at least one new second target load threshold (e.g., maximum force) for the first exercise. The processing device may, each time the user performs an exercise, encourage the user to establish a new second target load threshold applied to the at least one of the one or more portions associated with each respective exercise. If the second target load threshold is exceeded by one load measurement, the processing device may store that load measurement as a new second target load threshold. If the second target load threshold is exceeded by more than one load measurements, the processing device may store a greatest of the more than one load measurements as a new second target load threshold. The processing device may also provide an indication to be presented on the user interface, where the indication specifies that the second target load threshold is exceeded and congratulates the user.

The processing device may determine the exercise session is complete after the third period of time elapses. Responsive to determining the exercise session is complete, the processing device may determine whether there is at least one exercise which has not been completed in a set of exercises, such set of exercises including the first exercise. Responsive to determining the at least one exercise, in the set of exercises, has not been completed, the processing device may provide an indication to be presented on the user interface 18. The indication may instruct the user to begin the at least one exercise. Responsive to determining all of the exercises in the set of exercises have been completed, the processing device may provide an indication to be presented on the user interface 18. The indication may specify all of the exercises in the set of exercises have been completed.

Figure 20:
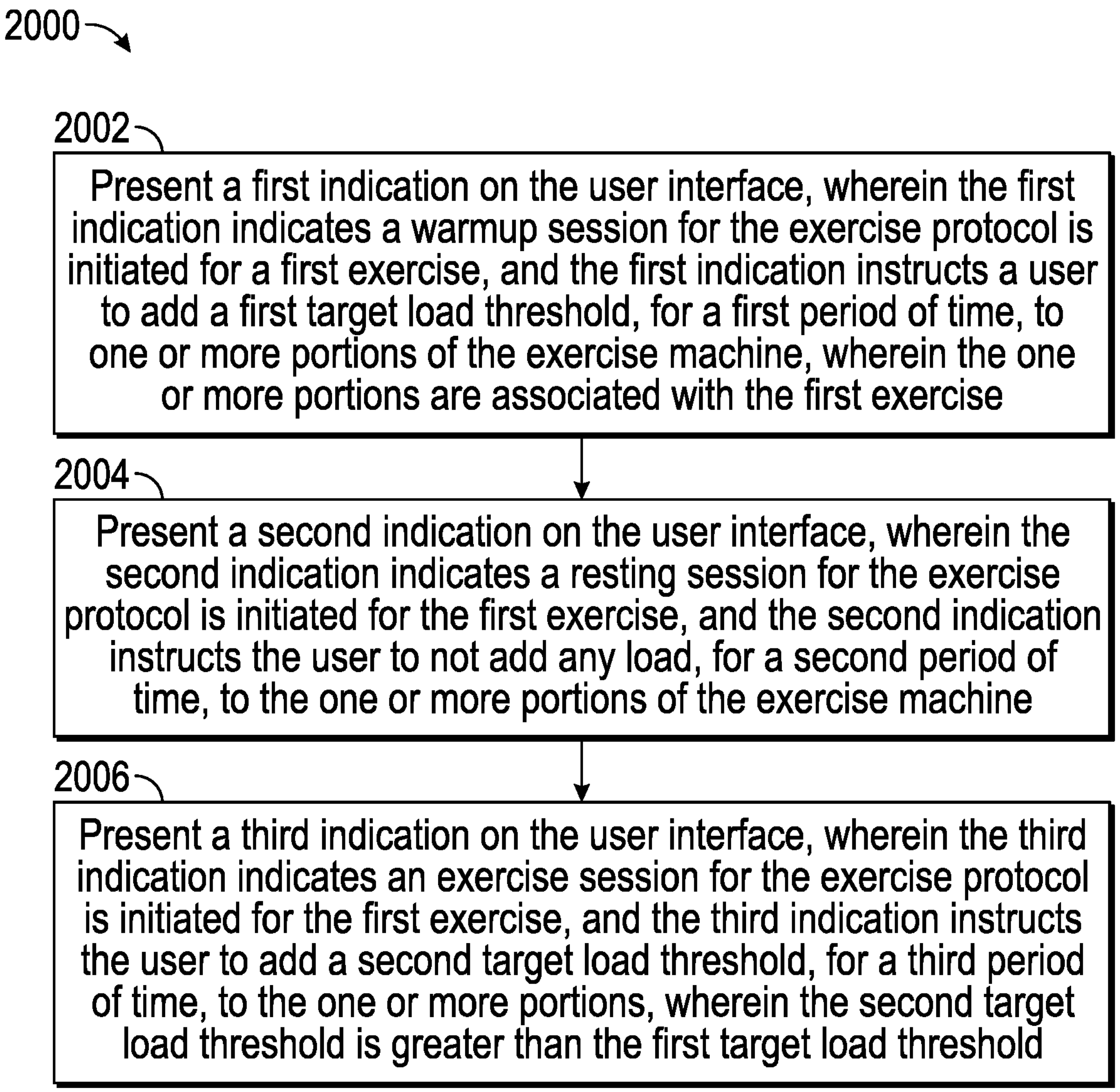
FIG. 20 illustrates example operations of another example method for implementing an exercise protocol for osteogenesis and/or muscular hypertrophy.

FIG. 20 illustrates example operations of another example method 2000 for implementing an exercise protocol for osteogenesis and/or muscular hypertrophy. Method 2000 includes operations performed by processing devices of the control system (e.g., computing device 12) of FIG. 1. In some embodiments, one or more operations of the method 2000 are implemented in computer instructions executable by a processing device of the control system. Various operations of the method 2000 may be performed by one or more of the computing device 15 and/or the cloud-based computing system 16. In regard to method 1900, the method 2000 may be performed in the same or a similar manner as described above.

At 2002, the processing device may present an indication on the user interface 18. The indication indicates a warmup session for the exercise protocol is initiated for a first exercise (e.g., leg press, arm curl, chest press, suitcase lift, core pull), and the indication instructs a user to add a first target load threshold, for a first period of time (e.g., 1-10 seconds), to one or more portions (e.g., handles, feet plates or platforms) of the exercise machine 100. The one or more portions may be associated with the first exercise. In one example, the first period of time may be 5 seconds. In some embodiments, the first target load threshold may be a percentage (e.g., 30-70 percent) of a maximum force applied by the user when previously performing the first exercise.

If it is the first time the user is performing the first exercise, and the corresponding maximum force has not been stored for the user, the indication may instruct the user to apply, to the one or more portions, a percentage of a maximum perceived force the user is capable of adding. In one example, for the warmup session, the percentage of the maximum force or the maximum perceived force may be 50 percent.

At 2004, the processing device may present an indication on the user interface 18. The indication may indicate a resting session for the exercise protocol is initiated for the first exercise, and the indication may instruct the user to not add any load, for a second period of time, to the one or more portions of the exercise machine.

At 2006, the processing device may present an indication on the user interface 18. The indication may indicate an exercise session for the exercise protocol is initiated for the first exercise, and the third indication may instruct the user to add a second target load threshold, for a third period of time (e.g., 1-10 seconds), to the one or more portions. The second target load threshold may be greater than the first target load threshold. In one example, the third period of time may be 5 seconds. In some embodiments, the second target load threshold may be a percentage (e.g., 60-100 percent) of a maximum force applied by the user when previously performing the first exercise.

If it is the first time the user is performing the first exercise, and there is no maximum force recorded for the user, the indication may instruct the user to apply, to the one or more portions, a percentage of a maximum perceived force the user is capable of adding. In one example, the percentage of the maximum force or the maximum perceived force may be 100 percent for the exercise session. That is, for each exercise, the indication may instruct and encourage the user to attempt to exceed their previously stored maximum force, which may be represented as the second load threshold.

During the exercise session, the processing device may receive one or more load measurements from one or more load cells 110 at the one or more portions associated with the first exercise. The processing device may determine at least one of the one or more load measurements is less than the second target load threshold. As a result of such a determination, the processing device may present, during the exercise session, an indication on the user interface 18. The indication may instruct the user to add at least one additional load to at least one of the one or more portions, such that the at least one additional load is needed to exceed the second target load threshold.

After the third period of time elapses, the processing device may present an indication on the user interface. The indication may indicate the first exercise is complete, and the indication may instruct the user to begin a second exercise. The second exercise may be different from the first exercise. The exercise protocol may be implemented while the user performs the second exercise and/or any other exercise in the exercise plan.

FIG. 21A-E illustrate example flowcharts 2100, 2110, 2120, 2130, and 2140 of techniques for various exercises included in the exercise protocol. The depicted sequence of performing the exercises may improve osteogenesis and/or muscular hypertrophy. However, other sequences of exercises are envisioned by the present disclosure. For example, the exercise protocol may be used with a single exercise to enhance osteogenesis and/or muscular hypertrophy.

To guide the user through the exercise protocol for a particular exercise, some or all of the technique information in each block presented in its respective flowchart may be presented on the user interface 18 and/or using auditory feedback. The blocks in the flowcharts may correspond to a technique in the exercise protocol to implement for the sessions. Various aspects of the technique information presented in the blocks may be implemented in computer instructions stored on a memory device and executable by a processing device (e.g., of the computing device 12). Note that the periods of time and percentages of maximum perceived force and/or maximum forces depicted in the blocks are examples: the disclosed techniques are not limited to the particular values or percentages.

Figure 21A:
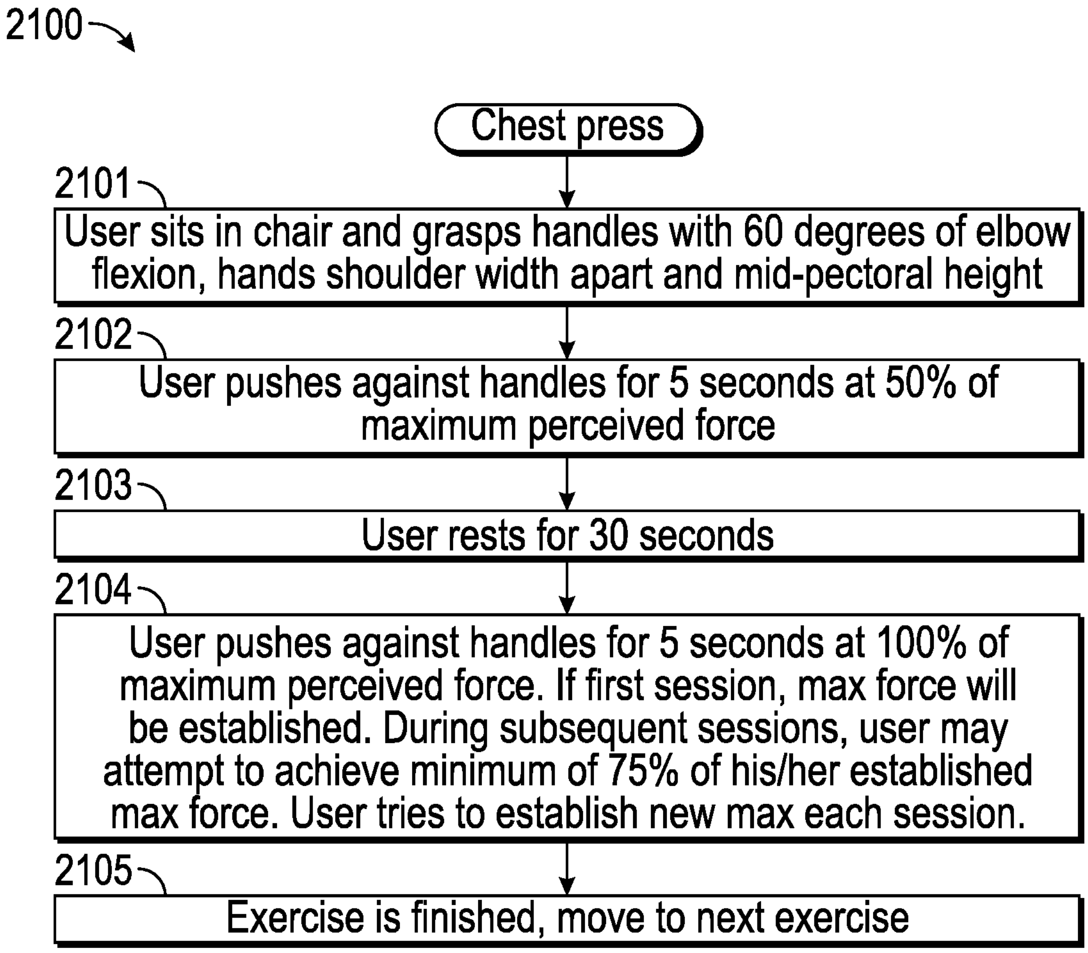
FIG. 21A-E illustrate example flowcharts of techniques included in the exercise protocol for various exercises.

Beginning with FIG. 21A, the flowchart 2100 presents proper techniques for performing a chest press to increase bone density and one-repetition isometric maximum strength. At block 2101, technique information for positioning a body of the user in the exercise machine is presented. For example, the technique information states, "User sits in chair and grasps handles with 60 degrees of elbow flexion, hands shoulder width apart and mid-pectoral height." Such technique information may be presented during a configuration session of the exercise protocol.

At block 2102, technique information for performing a warmup session of the exercise protocol is presented. For example, the technique information states, "User pushes against handles for 5 seconds at 50% of maximum perceived force." As previously discussed, the maximum perceived force may be specified when a maximum force has not yet been stored for the user. For example, the maximum force may not be stored when the user performs the exercise for the first time.

At block 2103, technique information for performing a resting session of the exercise protocol is presented. For example, the technique information states, "User rests for 30 seconds."

At block 2104, technique information for performing an exercise session of the exercise protocol is presented. For example, the technique information states, "User pushes against handles for 5 seconds at 100% of maximum perceived force. If first session, max force will be established. During subsequent sessions, user may attempt to achieve minimum of 75% of his/her established max force. User tries to establish new max each session." As previously discussed, the maximum perceived force may be specified when a maximum force has not yet been stored for the user. For example, the maximum force may not yet be stored when the user performs the exercise for the first time.

At block 2105, the technique information may guide the user to the next exercise. For example, the technique information states, "Exercise is finished, move to next exercise."

Figure 21B:
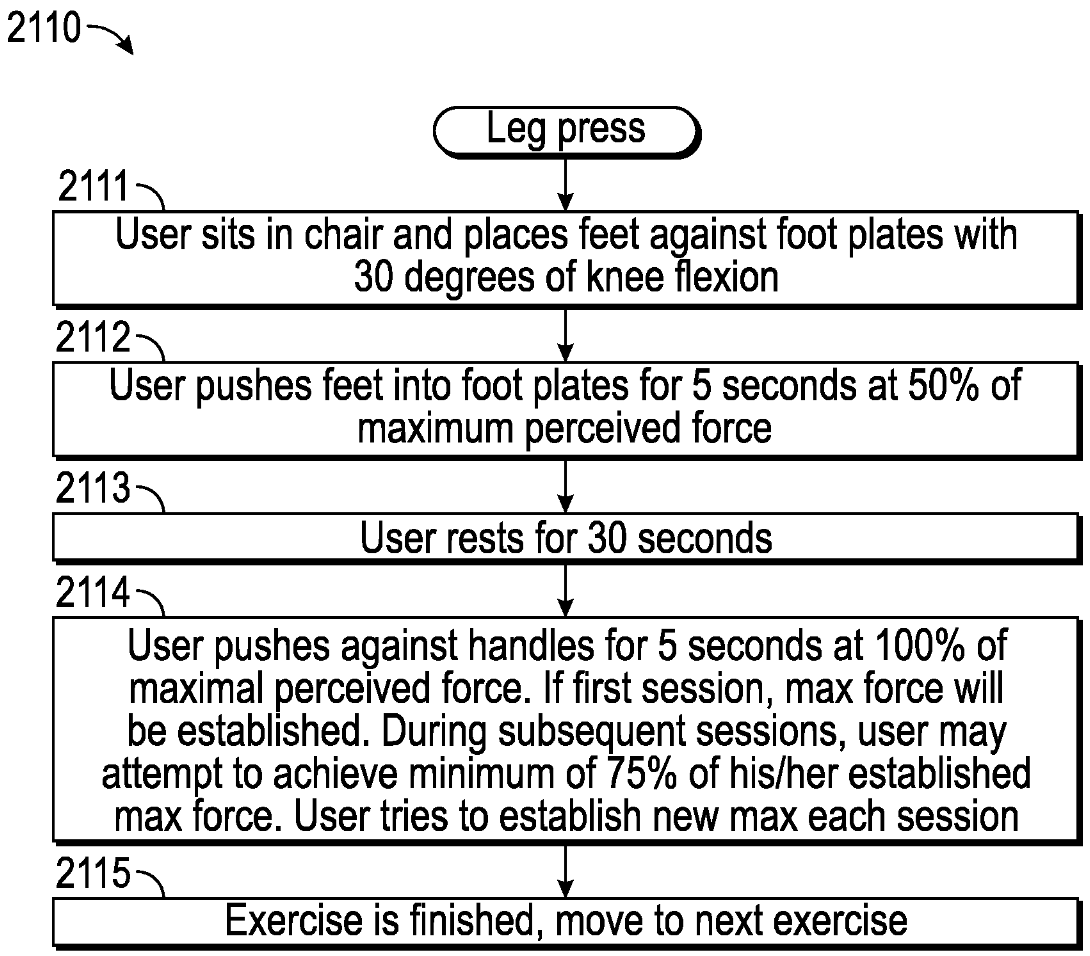

Turning now to FIG. 21B, the flowchart 2110 presents proper techniques for performing a leg press to increase bone density and one-repetition isometric maximum strength. At block 2111, technique information for positioning a body of the user in the exercise machine is presented. For example, the technique information states, "User sits in chair and places feet against foot plates with 30 degrees of knee flexion." Such technique information may be presented during a configuration session of the exercise protocol.

At block 2112, technique information for performing a warmup session of the exercise protocol is presented. For example, the technique information states, "User pushes against foot plates for 5 seconds at 50% of maximum perceived force."

At block 2113, technique information for performing a resting session of the exercise protocol is presented. For example, the technique information states, "User rests for 30 seconds."

At block 2114, technique information for performing an exercise session of the exercise protocol is presented. For example, the technique information states, "User pushes against foot plates for 5 seconds at 100% of maximum perceived force. If first session, max force will be established. During subsequent sessions, user may attempt to achieve minimum of 75% of his/her established max force. User tries to establish new max each session." At block 2115, the technique information may guide the user to the next exercise. For example, the technique information states, "Exercise is finished, move to next exercise."

Figure 21C:
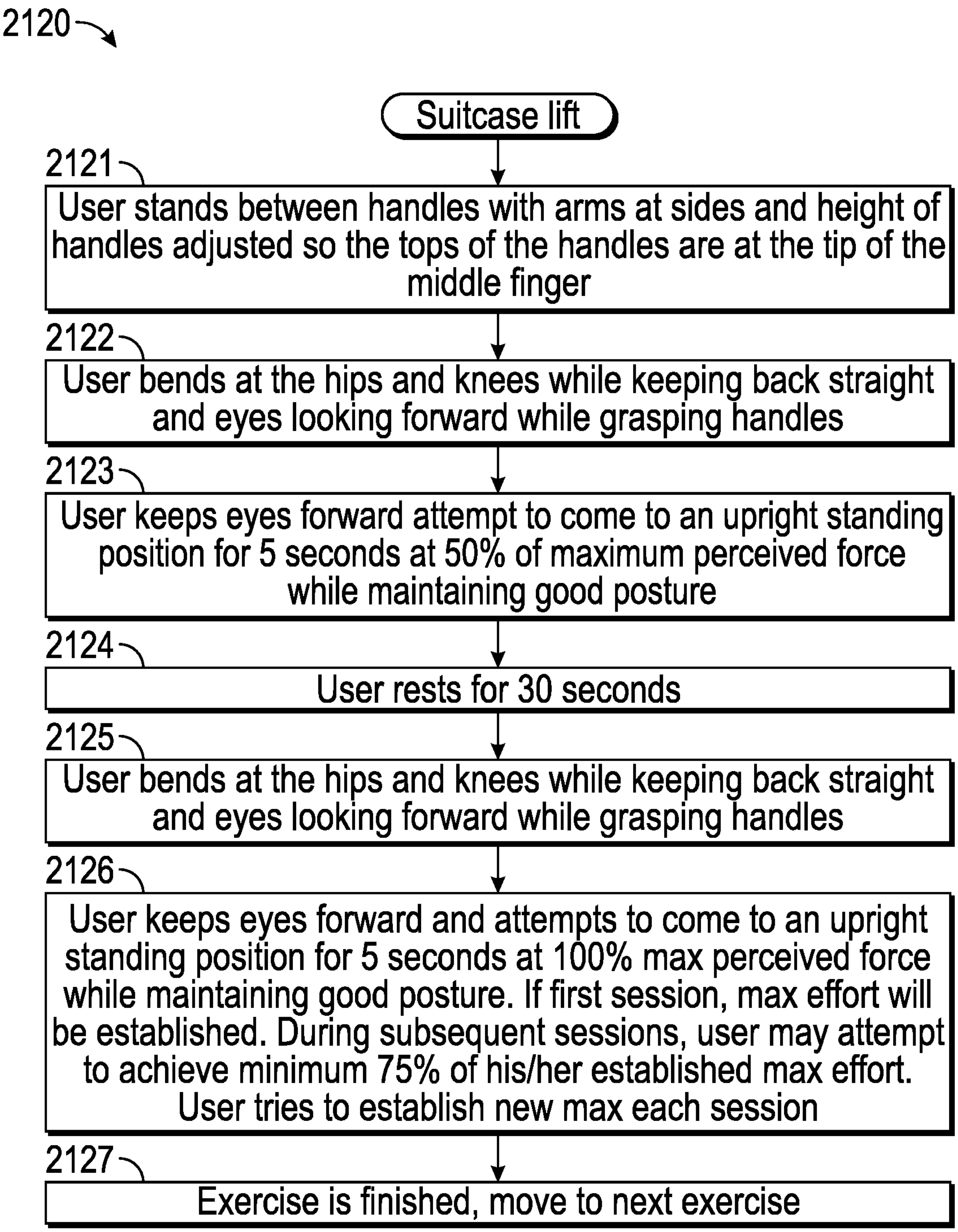

Turning now to FIG. 21C, the flowchart 2120 presents proper techniques for performing a suitcase lift to increase bone density and one-repetition isometric maximum strength. At blocks 2121 and 2122, technique information for positioning a body of the user in the exercise machine is presented. For example, at block 2121, the technique information states, "User stands between handles with arms at sides and height of handles adjusted so the tops of the handles are at the tip of the middle finger." At block 2122, the technique information states, "User bends at the hips and knees while keeping back straight and eyes looking forward while grasping handles." Such technique information may be presented during a configuration session of the exercise protocol.

At block 2123, technique information for performing a warmup session of the exercise protocol is presented. For example, the technique information states, "User keeps eyes forward attempting to come to an upright standing position for 5 seconds at 50% of perceived maximum effort while maintaining good posture."

At block 2124, technique information for performing a resting session of the exercise protocol is presented. For example, the technique information states, "User rests for 30 seconds."

At block 2125, technique information for positioning a body of the user in the exercise machine is presented. For example, at block 2125, the technique information states, "User bends at the hips and knees while keeping back straight and eyes looking forward while grasping handles."

At block 2126, technique information for performing an exercise session of the exercise protocol is presented. For example, the technique information states, "User keeps eyes forward and attempts to come to an upright standing position for 5 seconds at 100% of perceived maximum force while maintaining good posture. If first session, max force will be established. During subsequent sessions, user may attempt to achieve minimum of 75% of his/her established max force. User tries to establish new max each session." At block 2127, the technique information may guide the user to the next exercise. For example, the technique information states, "Exercise is finished, move to next exercise."

Figure 21D:
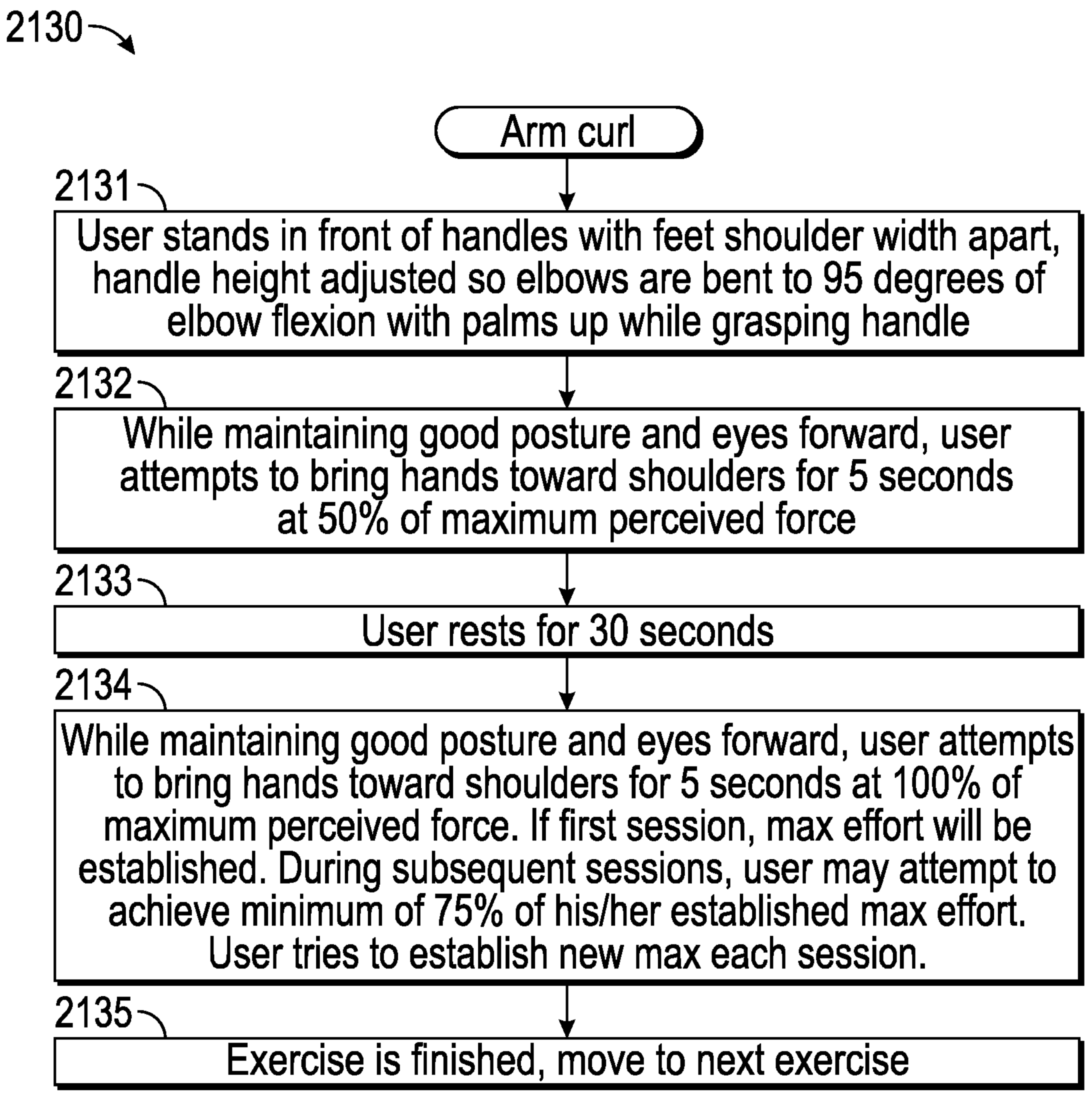

Turning now to FIG. 21D, the flowchart 2130 presents proper techniques for performing an arm curl to increase bone density and one-repetition isometric maximum strength. At block 2131, technique information for positioning a body of the user in the exercise machine is presented. For example, the technique information states, "User stands in front of handles with feet shoulder width apart, handle height adjusted so elbows are bent to 95 degrees of elbow flexion with palms up while grasping handles." Such technique information may be presented during a configuration session of the exercise protocol.

At block 2132, technique information for performing a warmup session of the exercise protocol is presented. For example, the technique information states, "While maintaining good posture and eyes forward, user brings hands toward shoulders for 5 seconds at 50% of maximum perceived force."

At block 2133, technique information for performing a resting session of the exercise protocol is presented. For example, the technique information states, "User rests for 30 seconds."

At block 2134, technique information for performing an exercise session of the exercise protocol is presented. For example, the technique information states, "While maintaining good posture and eyes forward, user attempts to bring hands toward shoulders for 5 seconds at 100% of maximum perceived force. If first session, max force will be established. During subsequent sessions, user may attempt to achieve minimum of 75% of his/her established max force. User tries to establish new max each session." At block 2135, the technique information may guide the user to the next exercise. For example, the technique information states, "Exercise is finished, move to next exercise."

Figure 21E:
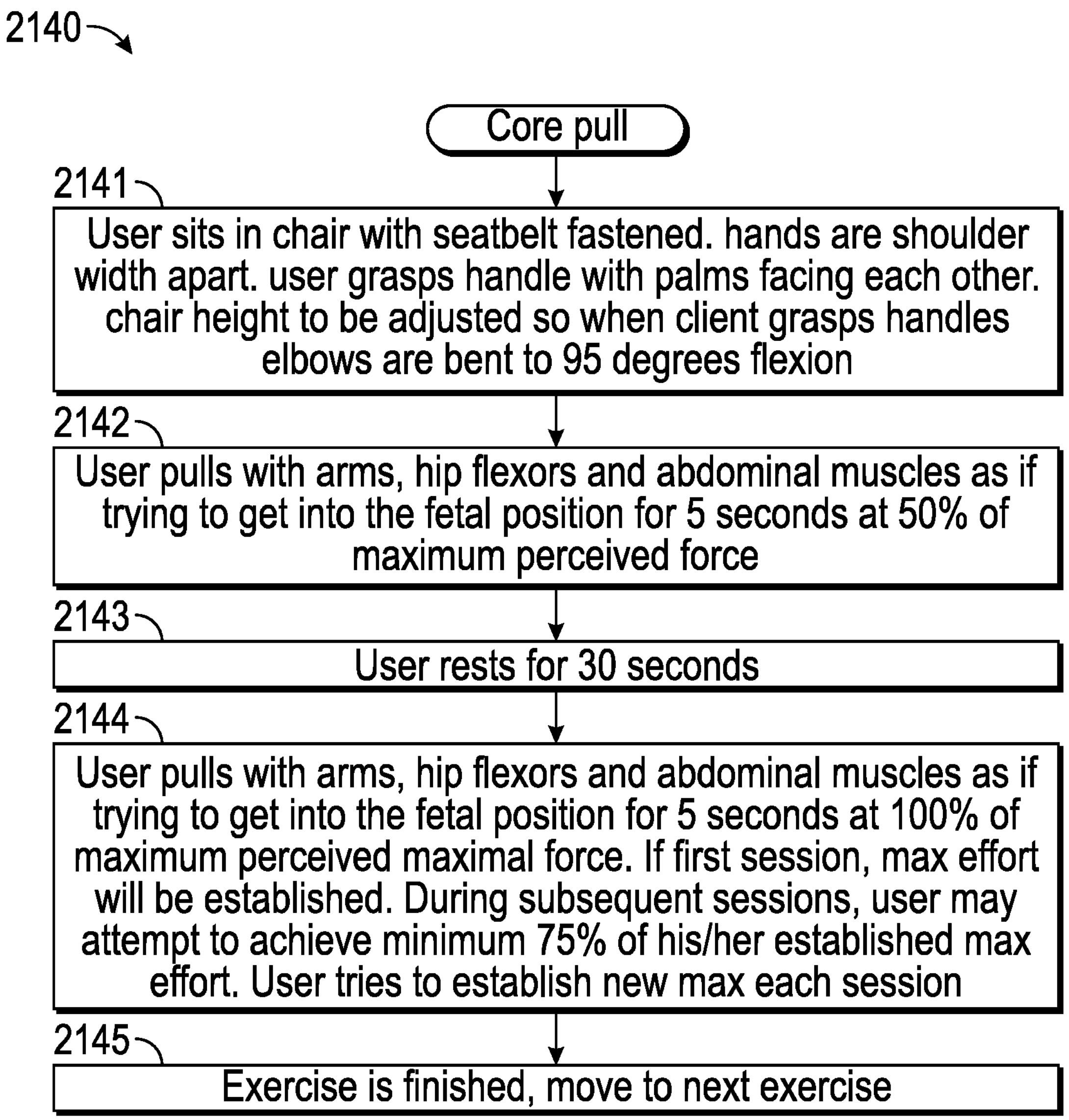

Turning now to FIG. 21E, the flow chart 2140 presents proper techniques for performing a core pull to increase bone density and one-repetition isometric maximum strength. At block 2141, technique information for positioning a body of the user in the exercise machine is presented. For example, the technique information states, "User sits in chair with seatbelt fastened. Hands are shoulder width apart. User grasps handle with palms facing each other. Chair height to be adjusted so when client grasps handles elbows are bent to 95 degrees flexion." Such technique information may be presented during a configuration session of the exercise protocol.

At block 2142, technique information for performing a warmup session of the exercise protocol is presented. For example, the technique information states, "User pulls with arms, hip flexors and abdominal muscles as if trying to get into the fetal position for 5 seconds at 50% of maximum perceived force."

At block 2143, technique information for performing a resting session of the exercise protocol is presented. For example, the technique information states, "User rests for 30 seconds."

At block 2144, technique information for performing an exercise session of the exercise protocol is presented. For example, the technique information states, "User pulls with arms, hip flexors and abdominal muscles as if trying to get into the fetal position for 5 seconds at 100% of maximum perceived force. If first session, max force will be established. During subsequent sessions, user may attempt to achieve minimum of 75% of his/her established max force. User tries to establish new max each session." At block 2145, the technique information may guide the user to the next exercise. For example, the technique information states, "Exercise is finished. All exercises completed."

Figure 22:
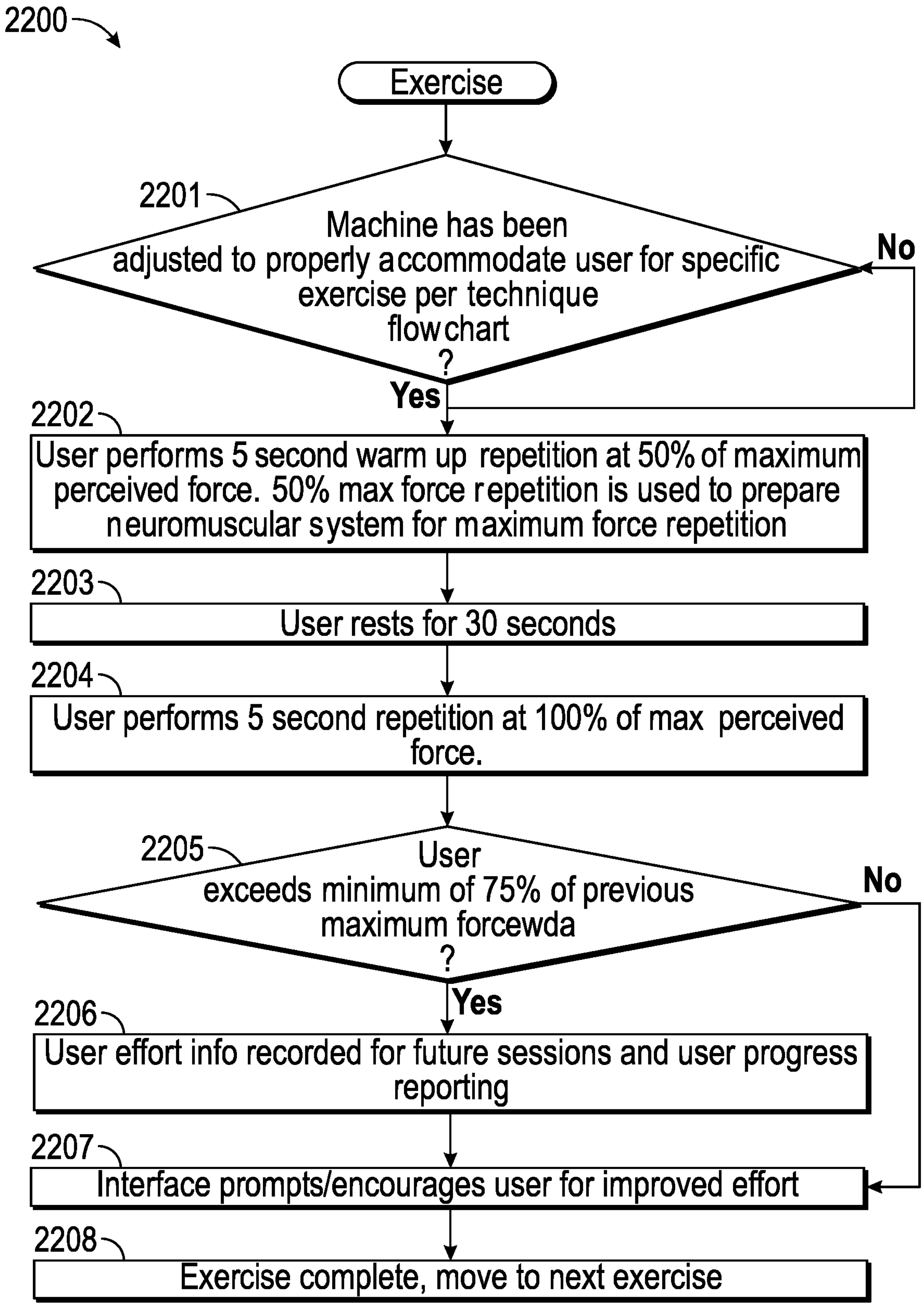
FIG. 22 illustrates an example flowchart of operations implemented by the exercise protocol.

FIG. 22 illustrates an example flowchart 2200 of operations implemented by the exercise protocol. As depicted, any exercise (e.g., chest press, leg press, suitcase lift, arm curl, core pull) may be performed using the operations of the exercise protocol in the flowchart 2200. One or more of the operations may correspond to one or more sessions for the exercise protocol. One or more of the operations may be implemented in computer instructions stored on a memory device and executed by a processing device (e.g., of the computing device 12). The operations may be represented by blocks 2201, 2202, 2203, 2204, 2205, 2206, 2207, and 2208. The periods of time and percentages of maximum perceived force and/or maximum forces depicted in the blocks are examples: the disclosed techniques are not limited to the particular values or percentages.

At block 2201, the processing device may determine whether the exercise machine 100 has been adjusted to properly accommodate the user for a specific exercise per the corresponding technique flowchart 2100, 2110, 2120, 2130, or 2140 in FIGS. 21A-E. Block 2201 may correspond to the configuration session of the exercise protocol. To make this determination, the processing device may in an example receive input from the user, where the input specifies if portions of the exercise machine 100 were adjusted and/or positioned as instructed for the particular exercise. If the processing device determines the exercise machine 100 is not properly adjusted, then the processing device returns to block 2201.

If the processing device determines the machine is properly adjusted, then at block 2202, the warmup session of the exercise protocol may be initiated. Initiating the warmup session may include the processing device providing an indication on the user interface 18. The indication may state, "User performs 5 second warmup rep at 50% of maximum perceived force. 50% max force repetition is used to prepare neuromuscular system for maximum force repetition."

The processing device may determine when the 5 seconds elapse, thereby completing the warmup session. At block 2203, responsive to the warmup session completing, the processing device may initiate the resting session of the exercise protocol. Initiating the resting session may include the processing device providing an indication on the user interface 18. The indication may state, "User rests for 30 seconds." The processing device may determine when the 30 seconds elapse, thereby completing the resting session.

At block 2204, responsive to the resting session completing, the processing device may initiate the exercise session of the exercise protocol. Initiating the exercise session may include the processing device providing an indication on the user interface 18. The indication may state, "User performs 5 second rep at 100% of max perceived force."

For each exercise, the indication may also present information pertaining to the areas of the user's body where isometric muscular strength may be improved by performing the maximum force repetition. For example, for a chest press, the indication may specify that the maximum force repetition may improve isometric muscular strength in pectorals, deltoids, triceps, and grip muscles. For a leg press, the indication may specify that the maximum force repetition may improve isometric muscular strength in gluteals, hamstrings, quadriceps, spinal extensors, and grip muscles. For a suitcase lift, the indication may specify that the maximum force repetition may improve isometric muscular strength in gluteals, hamstrings, quadriceps, spinal extensors, abdominals, upper back, and grip muscles. For an arm curl, the indication may specify that the maximum force repetition may improve isometric muscular strength in biceps, grip muscles, and trunk. For a core pull, the indication may specify that the maximum force repetition may improve isometric muscular strength in bicep, grip muscles, latissimus dorsi, hip flexors, and trunk.

For each exercise, the indication may also present information pertaining to the areas of the user's body where bone density increases as a result of the maximum force repetition. Further, the indication may indicate that potential fracture resistance may be improved in those areas. The following are non-limiting examples. For a chest press, the indication may specify that the maximum force repetition may increase bone density in the humerus, clavicle, radius, ulna, and rib. For a leg press, the indication may specify that the maximum force repetition may improve bone density in the femur. For a suitcase lift, the indication may specify that the maximum force repetition may improve bone density in the femur and spine. For an arm curl, the indication may specify that the maximum force repetition may improve bone density in the humerus, ribs, and spine. For a core pull, the indication may specify that the maximum force repetition may improve bone density in the ribs and spine.

The processing device may receive a load measurement (e.g., a right load measurement or a left load measurement) from a load cell 110 at a portion of the exercise machine 100. The portion may be associated with the exercise being performed. At block 2205, during the exercise session, the processing device may determine whether the load measurement exceeds a third target load threshold. The third target load threshold may include a percentage (75%) of the previous maximum force stored for the user for the respective exercise. At block 2206, responsive to determining the load measurement exceeds the third target load threshold, the processing device may store the load measurement for user progress reporting. Also, the processing device may determine whether the load measurement exceeds the previous maximum force (e.g., second target load threshold). If the load measurement exceeds the previous maximum force, then the processing device may set the load measurement as the maximum force (e.g., second target load threshold). The processing device may present, on the user interface 18, an indication congratulating or otherwise rewarding the user.

If the load measurement is less than the third target load threshold, then at block 2207, the processing device may present an indication on the user interface 18. The indication may encourage the user to add an additional load, such that the additional load is needed to exceed the third target load threshold. If the additional load causes the load measurement to exceed the third target load, then at block 2206, the processing device may store the load measurement for user progress reporting and/or subsequent exercise sessions.

When the 5 seconds elapse for the exercise session, at block 2208, the processing device may present an indication that the exercise is complete and instruct the user to begin the next exercise. If all exercises are completed, the indication may indicate that all exercises are completed.

Figure 23:
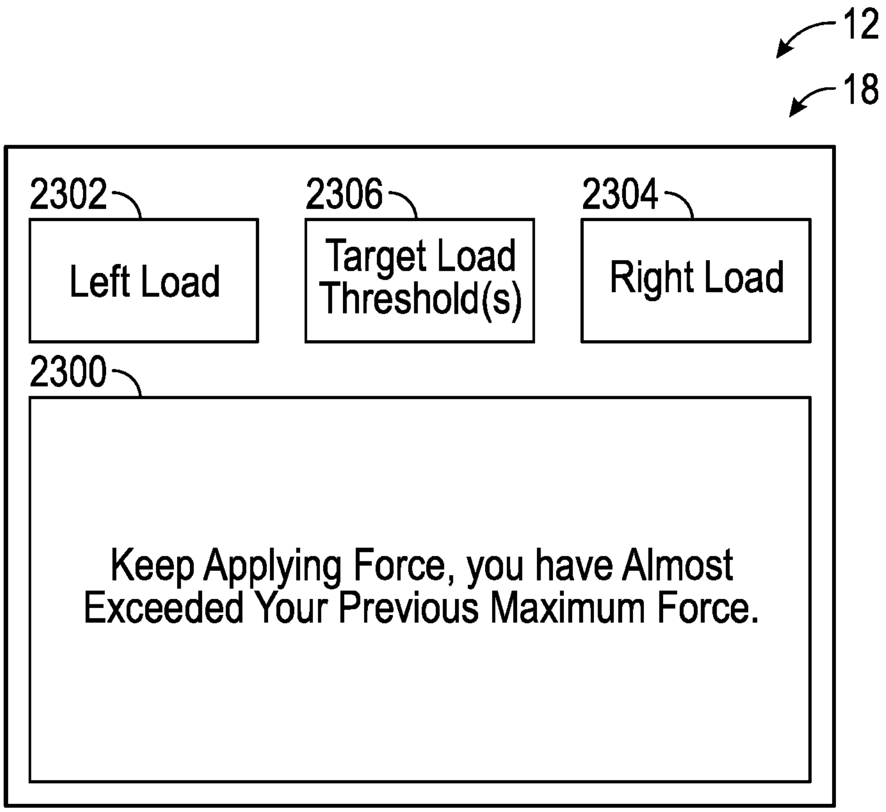
FIG. 23 illustrates an example user interface 18 presenting an indication 2300 that encourages the user to keep applying force to exceed a previous maximum force applied by the user.

FIG. 23 illustrates an example user interface 18 presenting an indication 2300 that encourages the user to keep applying force to exceed a previous maximum force applied by the user. For example, the indication 2300 states: "Keep applying force, you have almost exceeded your previous maximum force." The user interface 18 may present visual representations 2302 and/or 2304 for the left and right load measurements, respectively. In some embodiments, the visual representations 2202 and/or 2204 may be numerical values representing the respective load measurements. In some embodiments, the visual representation 2202 and/or 2204 may be bars on a bar chart, lines on a line chart, or any suitable visual representation.

Further, the user interface 18 may present one or more visual representations 2206 of target load thresholds. For example, the one or more target load thresholds may include a left target load threshold, a right target load threshold, or some combination thereof. In some embodiments, the target load thresholds may change depending on which session of the exercise protocol is being performed. For example, for the warmup session, there may be a first target load threshold that is a first percentage (e.g., 50%) of the previous maximum force of the user. For the exercise session, there may be a second target load threshold that is a second percentage (e.g., 100%) of the previous maximum force of the user. Presenting the visual representations 2206 of the target load thresholds concurrently with the real-time display of the load measurements in the visual representations 2202 and/or 2204 may enable the user to determine how close they are to exceeding the target load thresholds and/or when they exceed the target load thresholds.

Figure 24:
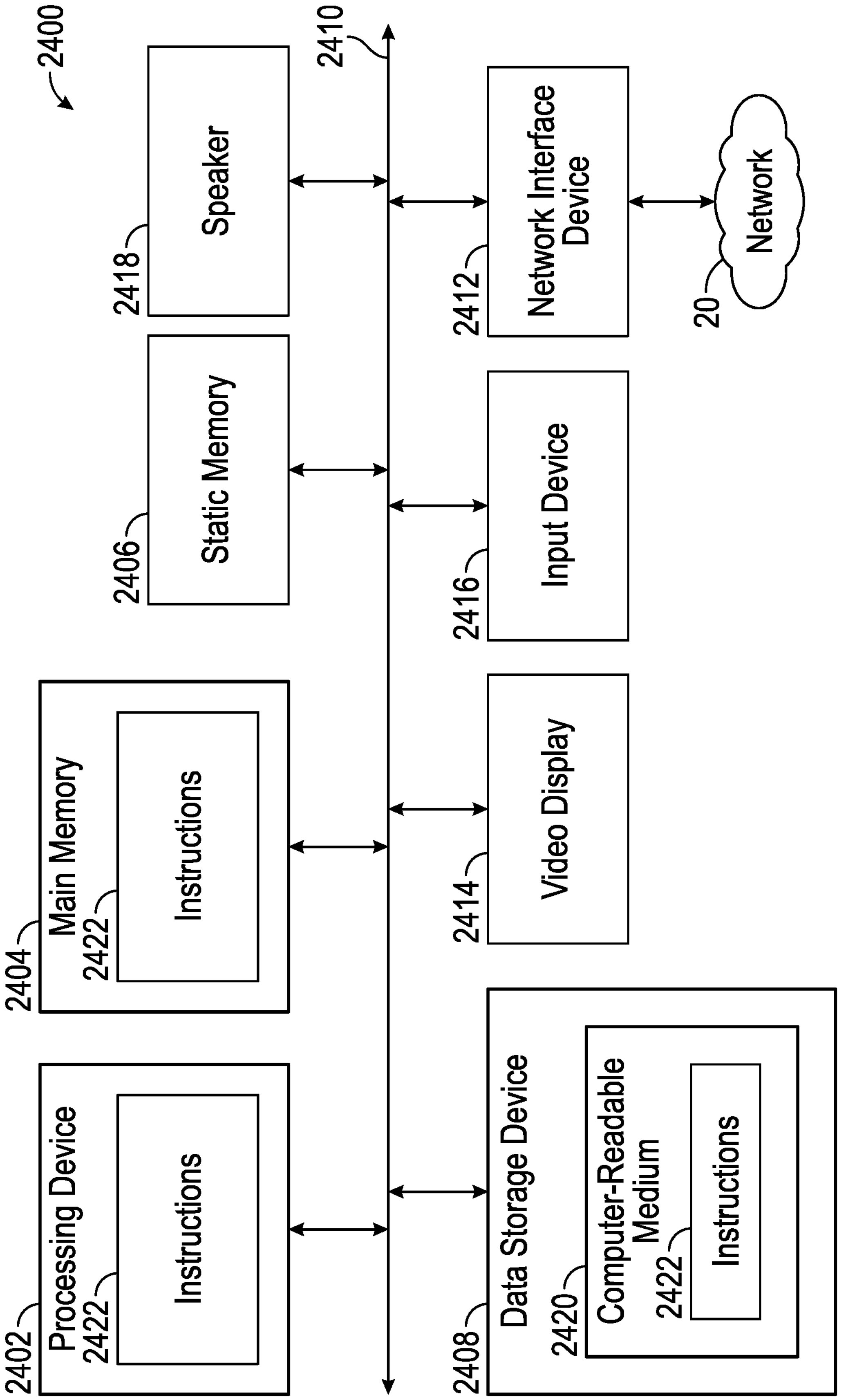
FIG. 24 illustrates an example computer system.

FIG. 24 illustrates an example computer system 2400, which can perform any one or more of the methods described herein. In one example, computer system 2400 may correspond to the computing device 12 (e.g., control system), the computing device 15, one or more servers 28 of the cloud-based computing system 16 of FIG. 1. The computer system 2400 may be capable of executing the application 17 and presenting the user interface 18 of FIG. 1, and/or the application 21 and presenting the user interface 22 of FIG. 1. The computer system 2400 may be connected (e.g., networked) to other computer systems in a LAN, an intranet, an extranet, or the Internet. The computer system 2400 may operate in the capacity of a server in a client-server network environment. The computer system 2400 may be a personal computer (PC), a tablet computer, a wearable (e.g., wristband), a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2400 includes a processing device 2402, a main memory 2404 (e.g., read-only memory (ROM), solid state drive (SSD), flash memory, dynamic random access memory (DRAM) such as synchronous DRAM (SDRAM)), a static memory 2406 (e.g., solid state drive (SSD), flash memory, static random access memory (SRAM)), and a data storage device 2408, which communicate with each other via a bus 2410.

Processing device 2402 represents one or more general-purpose processing devices such as a microprocessor, central processing unit, or the like. More particularly, the processing device 2402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2402 may also be one or more special-purpose processing devices such as an application specific integrated circuit (ASIC), a field programmable gate array (FPGA), a digital signal processor (DSP), network processor, or the like. The processing device 2402 is configured to execute instructions for performing any of the operations and steps discussed herein.

The computer system 2400 may further include a network interface device 2412. The computer system 2400 also may include a video display 2414 (e.g., a liquid crystal display (LCD) or a cathode ray tube (CRT)), one or more input devices 2416 (e.g., a keyboard and/or a mouse), and one or more speakers 2418 (e.g., a speaker). In one illustrative example, the video display 2414 and the input device(s) 2416 may be combined into a single component or device (e.g., an LCD touch screen).

The data storage device 2416 may include a computer-readable medium 2420 on which the instructions 2422 (e.g., implementing the application 17 or 21 executed by any device and/or component depicted in the FIGURES and described herein) embodying any one or more of the methodologies, functions, techniques, or operations described herein are stored. The instructions 2422 may also reside, completely or at least partially, within the main memory 2404 and/or within the processing device 2402 during execution thereof by the computer system 2400. As such, the main memory 2404 and the processing device 2402 also constitute computer-readable media. The instructions 2422 may further be transmitted or received over a network via the network interface device 2412.

While the computer-readable storage medium 2420 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

CLAUSES

1. A method for implementing an exercise protocol by using an exercise machine, the method comprising:
   initiating, based on the exercise protocol, a warmup session for a first exercise, such that the warmup session comprises providing a first indication to be presented in a user interface, and the first indication instructs a user to add a first target load threshold, for a first period of time, to one or more portions of the exercise machine, wherein the one or more portions are associated with the first exercise;
   determining the warmup session is complete after the first period of time elapses;
   responsive to determining the warmup session is complete, initiating, based on the exercise protocol, a resting session for the first exercise, such that the resting session comprises providing a second indication to be presented on the user interface, and the second indication instructs the user to not add any load, for a second period of time, to the one or more portions;
   determining the resting session is complete after the second period of time elapses; and responsive to determining the resting session is complete, initiating, based on the exercise protocol, an exercise session for the first exercise, such that the exercise session comprises providing a third indication to be presented on the user interface, and the third indication instructs the user to add a second target load threshold, for a third period of time, to the one or more portions, wherein the second target load threshold is greater than the first target load threshold.

2. The method of clause 1, further comprising:

determining the exercise session is complete after the third period of time elapses;

responsive to determining the exercise session is complete, determining whether there is at least one exercise which has not been completed in a plurality of exercises, such plurality of exercises including the first exercise; and responsive to determining the at least one exercise, in the plurality of exercises, has not been completed, providing a fourth indication to be presented on the user interface, wherein the fourth indication instructs the user to begin the at least one exercise.

3. The method of clause 1, further comprising:

determining the exercise session is complete after the third period of time elapses;

responsive to determining the exercise session is complete, determining whether there is at least one exercise which has not been completed in a plurality of exercises, such plurality of exercises including the first exercise; and responsive to determining all exercises in the plurality of exercises have been completed, providing a fourth indication to be presented on the user interface, wherein the fourth indication specifies all the exercises in the plurality of exercises have been completed.

4. The method of clause 1, further comprising:

receiving, during the exercise session, a load measurement from a load cell at one of the one or more portions associated with the first exercise;

comparing the load measurement to a third target load threshold in order to perform one of the following operations comprising:

responsive to determining the load measurement is less than the third target load threshold, providing a fourth indication to be presented on the user interface, wherein the fourth indication specifies adding to at least one of the one or more portions an additional load, and wherein the additional load is needed to exceed the third target load threshold; or responsive to determining the load measurement exceeds the third target load threshold, providing a fifth indication to be presented on the user interface, wherein the fifth indication specifies the third target load threshold has been exceeded.

5. The method of clause 1, further comprising:

receiving, during the resting session, one or more load measurements from one or more load cells at the one or more portions associated with the first exercise; and providing a fourth indication to be presented on the user interface, wherein the fourth indication instructs the user to stop adding load at the one or more portions to the one or more load cells.

6. The method of clause 1, further comprising:

receiving, during the exercise session, one or more load measurements from one or more load cells at the one or more portions associated with the first exercise;

determining whether the one or more load measurements exceed the second target load threshold; and responsive to determining the one or more load measurements exceed the second target load threshold, providing a fourth indication to be presented on the user interface, wherein the fourth indication specifies that the second target load threshold is exceeded and storing a greatest of the one or more load measurements as a new second target load threshold.

7. The method of clause 1, further comprising:

receiving, during the exercise session, one or more load measurements from one or more load cells at the one or more portions associated with the first exercise;

determining whether at least one of the one or more load measurements stopped increasing for a threshold period of time; and responsive to determining at least one of the one or more load measurements stopped increasing for the threshold period of time, storing the at least one of the one or more load measurements as a maximum force for the user for the first exercise, wherein the maximum force is used in a subsequent exercise session for the first exercise.

8. The method of clause 1, wherein during a previous performance of the first exercise, the first target load threshold is a first percentage of a maximum force applied to the one or more portions, by the user, and during the previous performance of the first exercise by the user, the second target load threshold is a second percentage of the maximum force applied to the one or more portions.

9. The method of clause 8, wherein the first percentage is less than 60 percent and the second percentage is greater than 60 percent.

10. The method of clause 1, further comprising, prior to initiating the warmup session, determining whether the exercise machine has been properly adjusted to accommodate the user during the first exercise.

11. The method of clause 1, wherein the first exercise causes osteogenesis, muscular hypertrophy, or some combination thereof.

12. A method for presenting a user interface to facilitate performance of an exercise protocol by using an exercise machine, the method comprising:

presenting a first indication on the user interface, wherein the first indication indicates a warmup session for the exercise protocol is initiated for a first exercise, and the first indication instructs a user to add a first target load threshold, for a first period of time, to one or more portions of the exercise machine, wherein the one or more portions are associated with the first exercise;

presenting a second indication on the user interface, wherein the second indication indicates a resting session for the exercise protocol is initiated for the first exercise, and the second indication instructs the user to not add any load, for a second period of time, to the one or more portions of the exercise machine; and presenting a third indication on the user interface, wherein the third indication indicates an exercise session of the exercise protocol is initiated for the first exercise, and the third indication instructs the user to add a second target load threshold, for a third period of time, to the one or more portions, wherein the second target load threshold is greater than the first target load threshold.

13. The method of clause 12, further comprising:

presenting a fourth indication on the user interface, wherein the fourth indication indicates the first exercise is complete, and the fourth indication instructs the user to begin a second exercise.

14. The method of clause 12, further comprising:

presenting, during the exercise session, a fourth indication on the user interface, wherein the fourth indication instructs the user to add at least one additional load to at least one of the one or more portions, such that the at least one additional load is needed to exceed the second target load threshold.

15. The method of clause 12, wherein the first target load threshold is a first percentage of a maximum force applied by the user to the one or more portions during a previous performance of the first exercise, and the second target load threshold is a second percentage of the maximum force applied by the user to the one or more portions during the previous performance of the first exercise.

16. The method of clause 12, further comprising:

presenting, during the exercise session, a fourth indication on the user interface, wherein the fourth indication specifies adding at least one additional load to at least one of the one or more portions, and wherein the at least one additional load is needed to exceed a third target load threshold.

17. A system, comprising:

a memory device storing instructions; and a processing device operatively coupled to the memory device, wherein the processing device is configured to execute the instructions to:

initiate, based on an exercise protocol, a warmup session for a first exercise, such that the warmup session comprises providing a first indication to be presented in a user interface, and the first indication instructs a user to add a first target load threshold, for a first period of time, to one or more portions of the exercise machine, wherein the one or more portions are associated with the first exercise;

determine the warmup session is complete after the first period of time elapses;

responsive to determining the warmup session is complete, initiate, based on the exercise protocol, a resting session for the first exercise, such that the resting session comprises providing a second indication to be presented on the user interface, and the second indication instructs the user to not add any load, for a second period of time, to the one or more portions;

determine the resting session is complete after the second period of time elapses; and responsive to determining the resting session is complete, initiate, based on the exercise protocol, an exercise session for the first exercise, such that the exercise session comprises providing a third indication to be presented on the user interface, and the third indication instructs the user to add a second target load threshold, for a third period of time, to the one or more portions, wherein the second target load threshold is greater than the first target load threshold.

18. The system of clause 17, wherein the processing device is configured to:

determine the exercise session is complete after the third period of time elapses; and responsive to determining the exercise session is complete, determine whether there is at least one exercise which has not been completed in a plurality of exercises, such plurality of exercises including the first exercise; and responsive to determining the at least one exercise, in the plurality of exercises, has not been completed, provide a fourth indication to be presented on the user interface, wherein the fourth indication instructs the user to begin the at least one exercise.

19. The system of clause 17, wherein the processing device is configured to:

receive, during the exercise session, a load measurement from a load cell at one of the one or more portions associated with the first exercise;

compare the load measurement to the second target load threshold; and responsive to determining the load measurement is less than the second target load threshold, provide a fourth indication to be presented on the user interface, wherein the fourth indication instructs the user to add an additional load to the one of the one or more portions, wherein the additional load is needed to exceed the second target load threshold.

20. The system of clause 17, wherein the processing device is configured to:

receive, during the exercise session, a load measurement from a load cell at one of the one or more portions associated with the first exercise;

determine whether the load measurement has stopped increasing for a threshold period of time; and responsive to determining the load measurement has stopped increasing for the threshold period of time, store for the user the load measurement as a maximum force for the first exercise, wherein the maximum force is used in a subsequent exercise session for the first exercise.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The invention claimed is:

1. A method for implementing an exercise protocol by using an exercise machine, the method comprising:

initiating, based on the exercise protocol, a warmup session for a first exercise, such that the warmup session comprises providing a first indication to be presented in a user interface, and the first indication instructs a user to add a first target load threshold, for a first period of time, to one or more portions of the exercise machine, wherein the one or more portions are associated with the first exercise;

determining the warmup session is complete after the first period of time elapses;

responsive to determining the warmup session is complete, initiating, based on the exercise protocol, a resting session for the first exercise, such that the resting session comprises providing a second indication to be presented on the user interface, and the second indication instructs the user to not add any load, for a second period of time, to the one or more portions;

determining the resting session is complete after the second period of time elapses; and responsive to determining the resting session is complete, initiating, based on the exercise protocol, an exercise session for the first exercise, such that the exercise session comprises providing a third indication to be presented on the user interface, and the third indication instructs the user to add a second target load threshold, for a third period of time, to the one or more portions, wherein the second target load threshold is greater than the first target load threshold.

2. The method of claim 1, further comprising:

determining the exercise session is complete after the third period of time elapses;

responsive to determining the exercise session is complete, determining whether there is at least one exercise which has not been completed in a plurality of exercises, such plurality of exercises including the first exercise; and responsive to determining the at least one exercise, in the plurality of exercises, has not been completed, providing a fourth indication to be presented on the user interface, wherein the fourth indication instructs the user to begin the at least one exercise.

3. The method of claim 1, further comprising:

determining the exercise session is complete after the third period of time elapses;

responsive to determining the exercise session is complete, determining whether there is at least one exercise which has not been completed in a plurality of exercises, such plurality of exercises including the first exercise; and responsive to determining all exercises in the plurality of exercises have been completed, providing a fourth indication to be presented on the user interface, wherein the fourth indication specifies all the exercises in the plurality of exercises have been completed.

4. The method of claim 1, further comprising:

receiving, during the exercise session, a load measurement from a load cell at one of the one or more portions associated with the first exercise;

comparing the load measurement to a third target load threshold in order to perform one of the following operations comprising:

responsive to determining the load measurement is less than the third target load threshold, providing a fourth indication to be presented on the user interface, wherein the fourth indication specifies adding to at least one of the one or more portions an additional load, and wherein the additional load is needed to exceed the third target load threshold; or responsive to determining the load measurement exceeds the third target load threshold, providing a fifth indication to be presented on the user interface, wherein the fifth indication specifies the third target load threshold has been exceeded.

5. The method of claim 1, further comprising:

receiving, during the resting session, one or more load measurements from one or more load cells at the one or more portions associated with the first exercise; and providing a fourth indication to be presented on the user interface, wherein the fourth indication instructs the user to stop adding load at the one or more portions to the one or more load cells.

6. The method of claim 1, further comprising:

receiving, during the exercise session, one or more load measurements from one or more load cells at the one or more portions associated with the first exercise;

determining whether the one or more load measurements exceed the second target load threshold; and responsive to determining the one or more load measurements exceed the second target load threshold, providing a fourth indication to be presented on the user interface, wherein the fourth indication specifies that the second target load threshold is exceeded and storing a greatest of the one or more load measurements as a new second target load threshold.

7. The method of claim 1, further comprising:

receiving, during the exercise session, one or more load measurements from one or more load cells at the one or more portions associated with the first exercise;

determining whether at least one of the one or more load measurements stopped increasing for a threshold period of time; and responsive to determining at least one of the one or more load measurements stopped increasing for the threshold period of time, storing the at least one of the one or more load measurements as a maximum force for the user for the first exercise, wherein the maximum force is used in a subsequent exercise session for the first exercise.

8. The method of claim 1, wherein during a previous performance of the first exercise, the first target load threshold is a first percentage of a maximum force applied to the one or more portions, by the user, and during the previous performance of the first exercise by the user, the second target load threshold is a second percentage of the maximum force applied to the one or more portions.

9. The method of claim 8, wherein the first percentage is less than 60 percent and the second percentage is greater than 60 percent.

10. The method of claim 1, further comprising, prior to initiating the warmup session, determining whether the exercise machine has been properly adjusted to accommodate the user during the first exercise.

11. The method of claim 1, wherein the first exercise causes osteogenesis, muscular hypertrophy, or some combination thereof.

12. A method for presenting a user interface to facilitate performance of an exercise protocol by using an exercise machine, the method comprising:

presenting a first indication on the user interface, wherein the first indication indicates a warmup session for the exercise protocol is initiated for a first exercise, and the first indication instructs a user to add a first target load threshold, for a first period of time, to one or more portions of the exercise machine, wherein the one or more portions are associated with the first exercise;

presenting a second indication on the user interface, wherein the second indication indicates a resting session for the exercise protocol is initiated for the first exercise, and the second indication instructs the user to not add any load, for a second period of time, to the one or more portions of the exercise machine; and presenting a third indication on the user interface, wherein the third indication indicates an exercise session of the exercise protocol is initiated for the first exercise, and the third indication instructs the user to add a second target load threshold, for a third period of time, to the one or more portions, wherein the second target load threshold is greater than the first target load threshold.

13. The method of claim 12, further comprising:

presenting a fourth indication on the user interface, wherein the fourth indication indicates the first exercise is complete, and the fourth indication instructs the user to begin a second exercise.

14. The method of claim 12, further comprising:

presenting, during the exercise session, a fourth indication on the user interface, wherein the fourth indication instructs the user to add at least one additional load to at least one of the one or more portions, such that the at least one additional load is needed to exceed the second target load threshold.

15. The method of claim 12, wherein the first target load threshold is a first percentage of a maximum force applied by the user to the one or more portions during a previous performance of the first exercise, and the second target load threshold is a second percentage of the maximum force applied by the user to the one or more portions during the previous performance of the first exercise.

16. The method of claim 12, further comprising:

presenting, during the exercise session, a fourth indication on the user interface, wherein the fourth indication specifies adding at least one additional load to at least one of the one or more portions, and wherein the at least one additional load is needed to exceed a third target load threshold.

17. A system, comprising:

a memory device storing instructions; and a processing device operatively coupled to the memory device, wherein the processing device is configured to execute the instructions to:

initiate, based on an exercise protocol, a warmup session for a first exercise, such that the warmup session comprises providing a first indication to be presented in a user interface, and the first indication instructs a user to add a first target load threshold, for a first period of time, to one or more portions of the exercise machine, wherein the one or more portions are associated with the first exercise;

determine the warmup session is complete after the first period of time elapses;

responsive to determining the warmup session is complete, initiate, based on the exercise protocol, a resting session for the first exercise, such that the resting session comprises providing a second indication to be presented on the user interface, and the second indication instructs the user to not add any load, for a second period of time, to the one or more portions;

determine the resting session is complete after the second period of time elapses; and responsive to determining the resting session is complete, initiate, based on the exercise protocol, an exercise session for the first exercise, such that the exercise session comprises providing a third indication to be presented on the user interface, and the third indication instructs the user to add a second target load threshold, for a third period of time, to the one or more portions, wherein the second target load threshold is greater than the first target load threshold.

18. The system of claim 17, wherein the processing device is configured to:

determine the exercise session is complete after the third period of time elapses; and responsive to determining the exercise session is complete, determine whether there is at least one exercise which has not been completed in a plurality of exercises, such plurality of exercises including the first exercise; and responsive to determining the at least one exercise, in the plurality of exercises, has not been completed, provide a fourth indication to be presented on the user interface, wherein the fourth indication instructs the user to begin the at least one exercise.

19. The system of claim 17, wherein the processing device is configured to:

receive, during the exercise session, a load measurement from a load cell at one of the one or more portions associated with the first exercise;

compare the load measurement to the second target load threshold; and responsive to determining the load measurement is less than the second target load threshold, provide a fourth indication to be presented on the user interface, wherein the fourth indication instructs the user to add an additional load to the one of the one or more portions, wherein the additional load is needed to exceed the second target load threshold.

20. The system of claim 17, wherein the processing device is configured to:

receive, during the exercise session, a load measurement from a load cell at one of the one or more portions associated with the first exercise;

determine whether the load measurement has stopped increasing for a threshold period of time; and responsive to determining the load measurement has stopped increasing for the threshold period of time, store for the user the load measurement as a maximum force for the first exercise, wherein the maximum force is used in a subsequent exercise session for the first exercise.

* * * * *